US006583712B1

(12) United States Patent
Reed et al.

(10) Patent No.: US 6,583,712 B1
(45) Date of Patent: Jun. 24, 2003

(54) SUPERVISOR AND SUBORDINATE LOCK SYSTEM

(75) Inventors: Tim Reed, Lexington, KY (US); Gerald L. Dawson, New Port Richey, FL (US); Adrian Schaefer, Largo, MD (US); Will Miracle, Lexington, KY (US)

(73) Assignee: Kaba Mas Corporation, Lexington, KY (US)

(*) Notice: Subject to any disclaimer, the term of this patent is extended or adjusted under 35 U.S.C. 154(b) by 0 days.

(21) Appl. No.: 09/478,703

(22) Filed: Jan. 6, 2000

Related U.S. Application Data

(60) Provisional application No. 60/114,994, filed on Jan. 6, 1999.

(51) Int. Cl.[7] ............................ G05B 19/00; G66F 7/04

(52) U.S. Cl. .................... 340/5.21; 340/5.25; 340/5.27; 340/5.65; 340/5.28

(58) Field of Search ............................... 340/5.25, 5.21, 340/5.27, 5.65, 5.73, 5.28, 5.5, 5.24; 235/382.5

(56) References Cited

U.S. PATENT DOCUMENTS

| | | | | |
|---|---|---|---|---|
| 3,970,010 A | | 7/1976 | Cantley | |
| 5,389,919 A | * | 2/1995 | Warren et al. | 340/825.31 |
| 5,774,058 A | * | 6/1998 | Henry et al. | 340/825.31 |

FOREIGN PATENT DOCUMENTS

| | | |
|---|---|---|
| EP | 0276929 | 8/1988 |
| JP | 58117011 | 7/1983 |
| WO | WO 9314571 | 7/1993 |

OTHER PUBLICATIONS

PCT International Search Report dated May 19, 2000.

* cited by examiner

*Primary Examiner*—Michael Horabik
*Assistant Examiner*—Vernal Brown
(74) *Attorney, Agent, or Firm*—Arent Fox Kintner Plotkin & Kahn, PLLC

(57) ABSTRACT

The electronic supervisor and subordinate lock system employs an electronic lock as a supervisor lock and at least one other electronic lock as a subordinate lock. The supervisor lock controls and/or authorizes the opening of one or more subordinate locks.

5 Claims, 72 Drawing Sheets

CENCON FOR CASSETTE LOCKER
ROUTE SERVICE MENU

CENCON FOR CASSETTE LOCKER
SUPERVISOR MENU

CENCON FOR CASSETTE LOCKER
REPORTS MENU

* INDICATES CLDs AUTHORIZED, OPENED, AND BAD ATTEMPTED FOR EACH CALL DISPATCHED
** INDICATES NUMBER OF CLDs CONTROLLED AND CLDs AUTHORIZED IF LOCK IS OPEN (LIST SPECIFIC LOCK ONLY)

CENCON FOR CASSETTE LOCKER
ID AND KEY MAINTENANCE MENU

CENCON FOR CASSETTE LOCKER
REASSIGN A SERVICE CALL (FLM AND ROUTE)

CENCON FOR CASSETTE LOCKER
GET LAST COMBINATION (FLM AND ROUTE)

CHECK FOR AN UNRESOLVED OPEN RECORD
IF A RECORD FOR THE KEY-TYPE IS STILL 'OPEN'...
DISPLAY THE 'CLOSE-SEAL' (FOR FLM & ROUTE KEYS ONLY),
THEN PERFORM APPROPRIATE HOUSEKEEPING.

'LOCK-OUT' PROCESSING

CHECK FOR:

1* CHECK FOR 'LOCK-OUT' IN PROGRESS --> IF NOT RETURN
2* CHECK IF 'LOCK-OUT' IS FOR THIS USER --> IF NOT, PROCESS NEW/2ND USER*
3* CHECK IF 'LOCK-OUT' TIME HAS EXPIRED --> IF SO, CLEAR FLAG & RETURN
4* CONTINUE...

START NEW:

1* WRITE NEW 'LOCK-OUT' RECORD AND RESTART LOCK
2* DISPLAY 'LOCK-OUT' MESSAGE AND RESTART LOCK

CALCULATE DAY/HOUR FOR USER'S KEY

CHECK:
* TIME-WINDOW'S NEEDED FOR...
  - NEITHER USER, RETURN OK
  - ONLY ONE USER OF 2, ERROR
  * 1ST OR BOTH USERS, CALC. CURRENT DAY/HOUR

CALCULATE:
* LAST-SUNDAY-MIDNIGHT (RE-SAVE NEW VALUE TO TIC)
* CURRENT DAY-OF-WEEK
* CURRENT TENTH OF HOUR-INTO-DAY

PRE-PROCESS KEY'S 'TIME-WINDOW'(S)

CHANGE VALUES FOR EACH:

* 'START-OF-WINDOW', DURATION-OF-WINDOW, DAY-OF-WEEK TO...
... 'START-OF-WINDOW', END-OF-WINDOW, DAY-OF-WEEK, PLUS

ADD WINDOWS FOR EACH:

... ADDITIONAL ROLLED-OVER 'TIME-WINDOW'S AS NEEDED

STORE TO TEMP:

* PRE-PROCESSED 'TIME-WINDOWS' TO TEMP INDIRECT RAM

BEST 2 OF 3
GET THE BEST 2 OF 3
SEED VALUE, MASTER VALUE, CLOSE SEAL AND SEAL COUNT [SMCS]
FOR KEY-TYPE FROM EEPROM 3x TABLE

GET SMCS(x)
RETRIEVE THE 'x'TH
SEED/MASTER/CLOSE-SEAL/SEAL-COUNT
RECORD FROM EEPROM

COMPARE 'CURRENT' (IN RAM) TO BUFFERED SMCS VALUES SETTING OK FLAGS AS WE GO

AUTHORIZE CLD ACCESS ON USER TM KEY:
AFTER ALL COMBO CHECKING ETC. AND BEFORE THE CENCON LOCK IS ALLOWED TO BE OPENED, WRITE THE USER'S CLD AUTHORIZATIONS TO THE USER'S TM KEY

EE AUDIT SAVE
ALL AUDIT RECORDS SAVES ARE PROCESSED HERE!

(SET/)CHANGE BANK USER'S COMBINATION

==> ENTER HERE VIA PRESSING '#8' AT THE 'EC' PROMT...
 * ENTER CURRENT COMBINATION AT 'EcC' PROMPT, CONTINUE...
==> ENTER HERE VIA A NEW USER ENTERING THE FACTORY COMBO AT THE 'EC' PROMPT...
 * ENTER NEW COMBINATION AT 'EnC' PROMT,
 * COMFIRM (VIA RE-ENTERING) NEW COMBINATION AT 'CnC' PROMT,
 * TURN DIAL AT THE END-OF-PROCEDURE ('EOP') PROMPT

CHANGE FACTORY COMBINATION

==> ENTER HERE VIA PRESSING '#8' AT THE '+EC' PROMT... (WHERE '+' = KEY SYMBOL)

* ENTER CURRENT FACTORY COMBINATION AT 'EcC' PROMPT, CONTINUE...
* ENTER NEW FACTORY COMBINATION AT 'EnF' PROMT,
* CONFIRM (VIA RE-ENTERING) NEW FACTORY COMBINATION AT 'CnF' PROMT,
* REMOVE 'CHANGE-KEY' AT 'POC' PROMT,
* TURN DIAL AT THE END-OF-PROCEDURE ('EOP') PROMPT TO RESTART LOCK

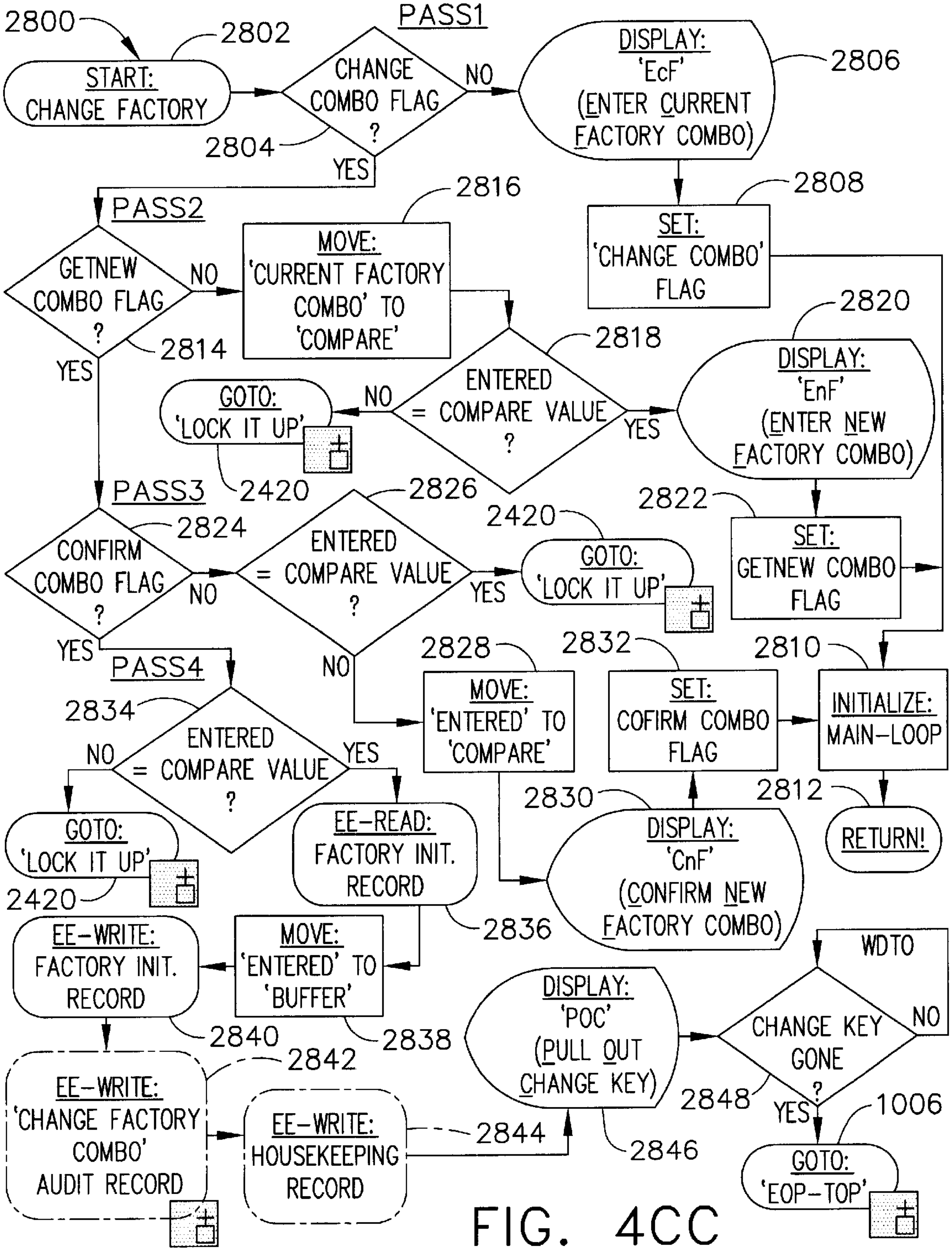

FIG. 4CC

CHANGE KEY IS IN:
* CHECK FOR FACT. MODE & NEW COMBO
– PROCESS 'CHANGE' FACT. COMBO
* CHECK FOR PRE–CONDITIONS
* DISPLAY PROMPT ACCORDING TO KEY–TYPE,
* PROCESS SA KEY–TYPE,
* SAVE APPROPRIATE AUDIT & HOUSEKEEPING RECORD

SEED LOCK (1)

SEED LOCK (2)

SEED LOCK (3)

SUPERVISOR AND SUBORDINATE LOCK SYSTEM

This application claims the benefit of Provisional application No. 60/114,994 filed Jan. 6, 1999.

FIELD OF THE INVENTION

This invention relates generally to the field of electronic locks and more specifically to an electronic lock system where a supervisor lock can permit or enable the operation of one or more electronic subordinate locks.

BACKGROUND OF THE INVENTION

A single security lock is often used to limit access to a secure area to personnel who have the proper access code or combination. When a single lock is used, the entry of a single code will permit access to the entire area. Some areas located inside or even outside the secure area, however, may require access control. Currently, the only available method of limiting access to smaller areas is through the use of additional independent locks. An example of a secure area where it is desirable to provide additional security measures for smaller internal areas is an Automated Teller Machine.

Automated Teller Machines, ATMs as they are commonly referred to or ABMs (for Automated Banking Machines in Canada), are devices which dispense currency to holders of valid bank cards and other identifying information among other functions. For ease, both ATMs and ABMs will be referred to as ATMs. The machines may also be used to dispense other negotiable instruments such as scrip, coupons, tickets and other items that are reprinted or may be printed to create high value negotiable instruments. The currency storage (used to describe storage of any negotiable instrument) within the ATM vault is accomplished in currency cassettes or cash cassettes typically holding up to 2,000 bills each. The cassettes are inserted into a rack which typically includes a sheet feed and transport mechanism for picking and transporting the bills from the currency cassettes to a dispensing opening in the ATM structure.

The cassette rack is typically mounted in such a manner that it may be pulled out of the vault to access the various portions of the currency rack and bill picking and transport mechanism in order to permit the maintenance and repair of the device as well as to clear bill feed jams which may occur in the bill feeding and transporting mechanism. Once the ATM vault, which is simply a secure safe or similar container, is opened, the cassettes and the cassette rack are accessible even when the purpose for opening the vault is unrelated to accessing the cassettes. Due to the security afforded by the vault, most of the losses from ATMs are due to insider theft. Authorized opening of the vault grants access to large sums of cash or other instruments and presents and opportunity to the person opening the vault to commit an unobserved act of dishonesty and steal some or all of the contents of the cassettes.

Therefore there is a need for a lock system which secures the vault and provides additional access controls to smaller areas within the vault. Consequently, only the organization responsible for the money in an ATM would have access to the cash cassettes while granting vault access alone would permit maintenance and service work without the service personnel having access to the stored currency supply. There is also a need for a lock system, which secures the main vault and provides access controls to areas outside the vault or to alternative vault access points. This lock system may permit and/or authorize access to these other locks without the operator opening the main vault.

SUMMARY OF THE INVENTION

The use of an electronic supervisor and subordinate lock system provides a security system for controlling access to secure areas controlled by the supervisor and/or subordinate locks. This system may be useful when many of the personnel that access the secure area controlled by the supervisor lock do not need to have access to all the areas within the secure area. Thus, a second level of access control may be provided to these areas within the secure area. Additionally, this system may even be utilized when many of the personnel only require access to an area controlled by a subordinate lock that is outside the area controlled by the supervisor lock.

The electronic supervisor and subordinate lock system employs an electronic lock as a supervisor lock and at least one other electronic lock as a subordinate lock. The supervisor lock controls and/or authorizes the opening of one or more subordinate locks. The electronic supervisor and subordinate lock system may use an electronic combination lock that requires both an electronic key and a valid combination for the electronic combination lock. The electronic key and/or combination may provide information to the electronic supervisor lock relating to which locks the user is authorized to open. After operating, but not necessarily opening, the supervisor lock, the electronic key or the operator may receive the access codes for the subordinate locks from the supervisor lock. The subordinate lock(s) may open after use of an electronic key; a combination or code entered with a dial or keypad; and/or electronic key and a code/combination.

The foregoing section provides only a summary and a more detailed understanding of the invention may be derived from the attached drawings together with the detailed description provided below.

DRAWINGS

The accompanying drawings incorporated in and forming part of the specification illustrate several aspects of the present invention in the drawings.

Figure 1:
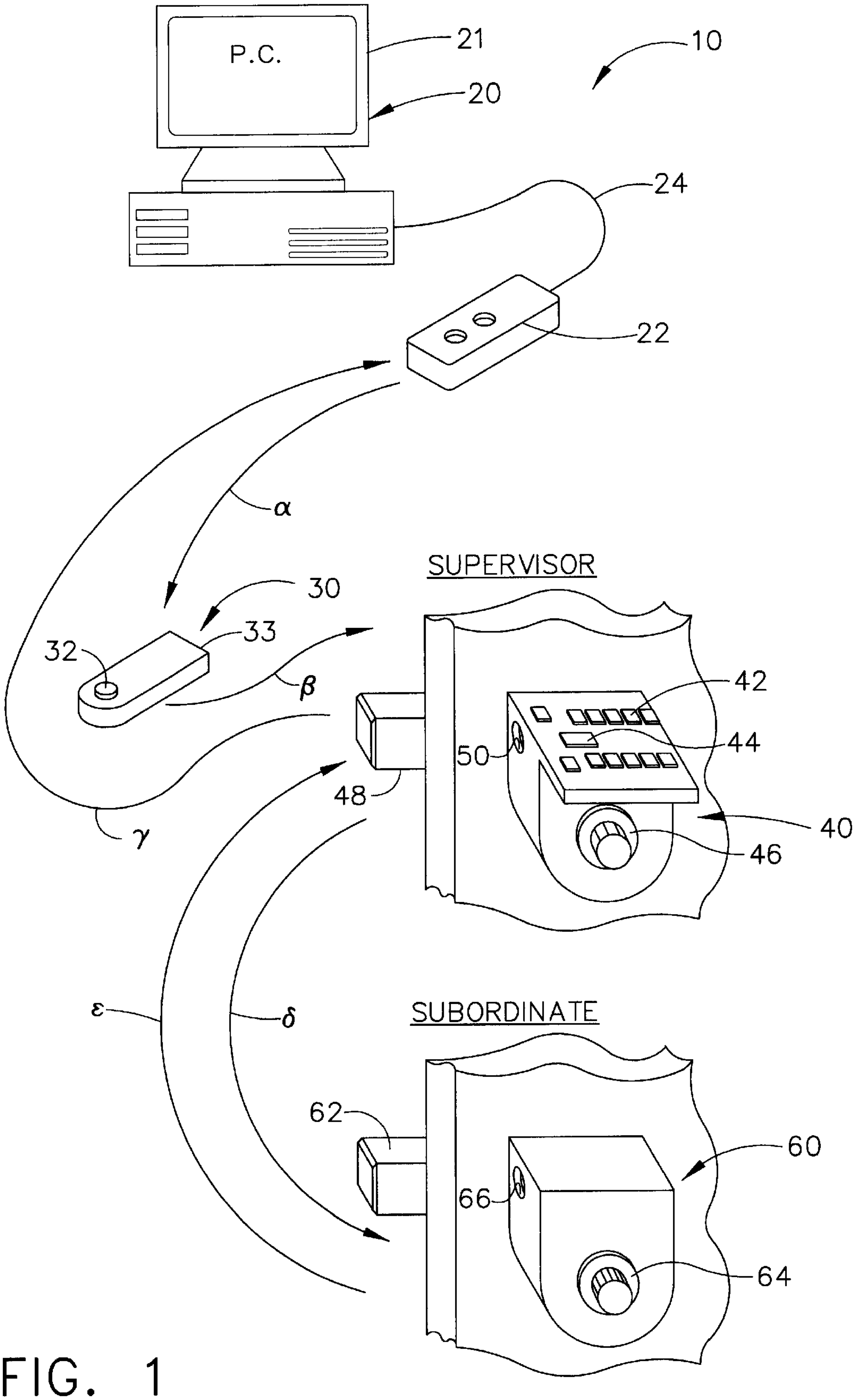
FIG. 1 is an illustration of the electronic supervisor and subordinate lock system in accordance with the present invention.
Figure 2A:
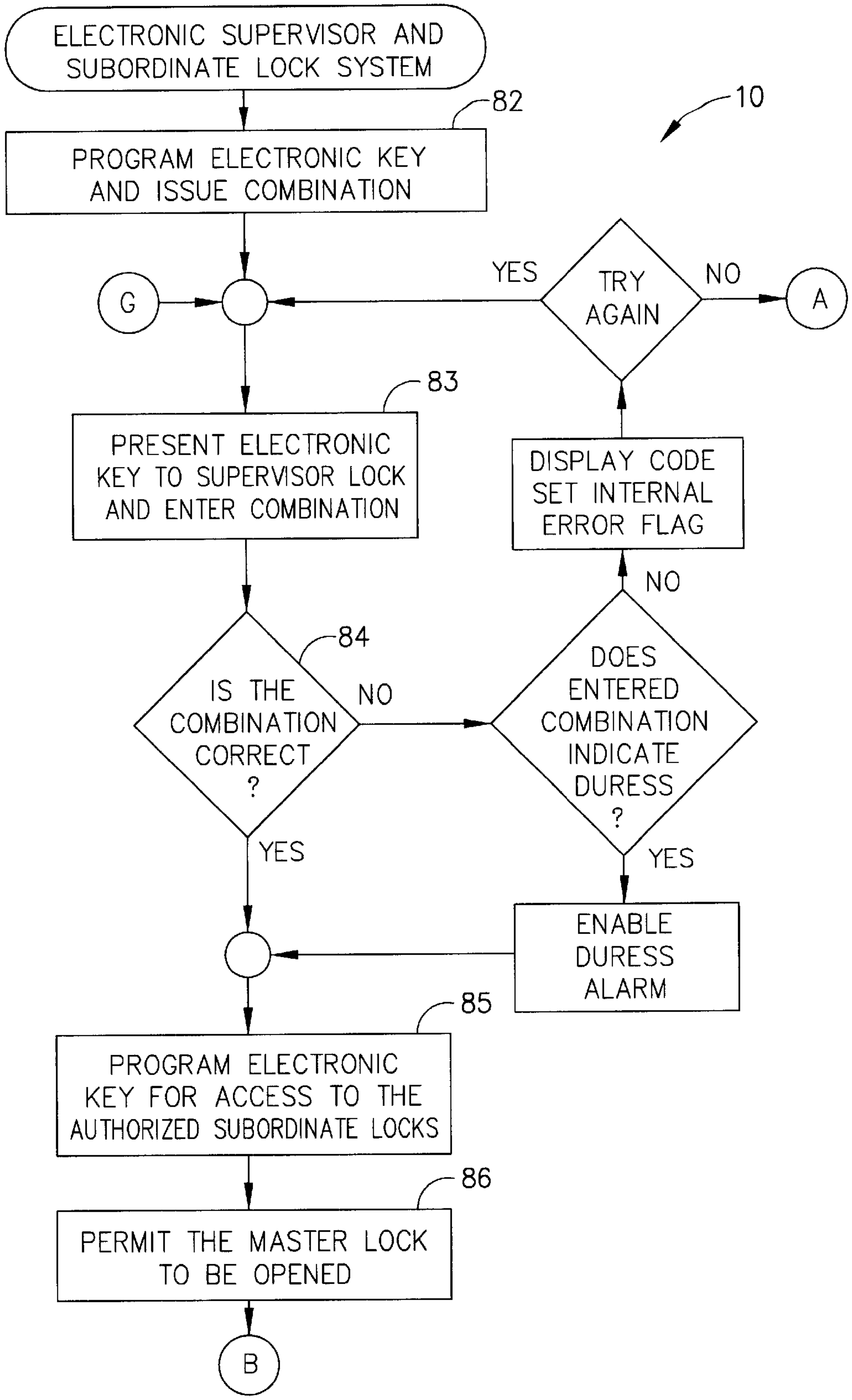
FIGS. 2A–2D is a process diagram for the electronic supervisor and subordinate lock system shown in FIG. 1.
Figure 2B:
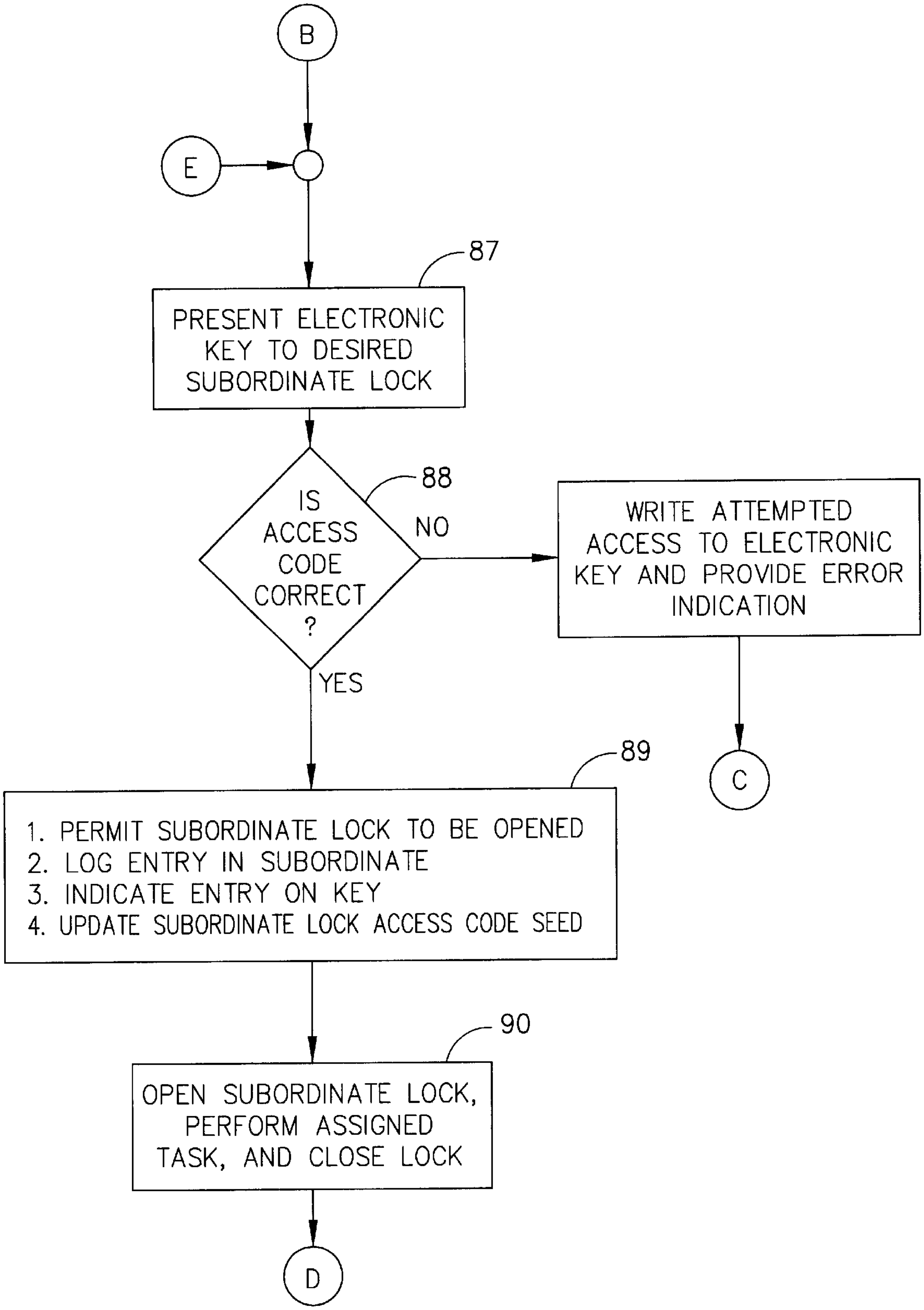
Figure 2C:
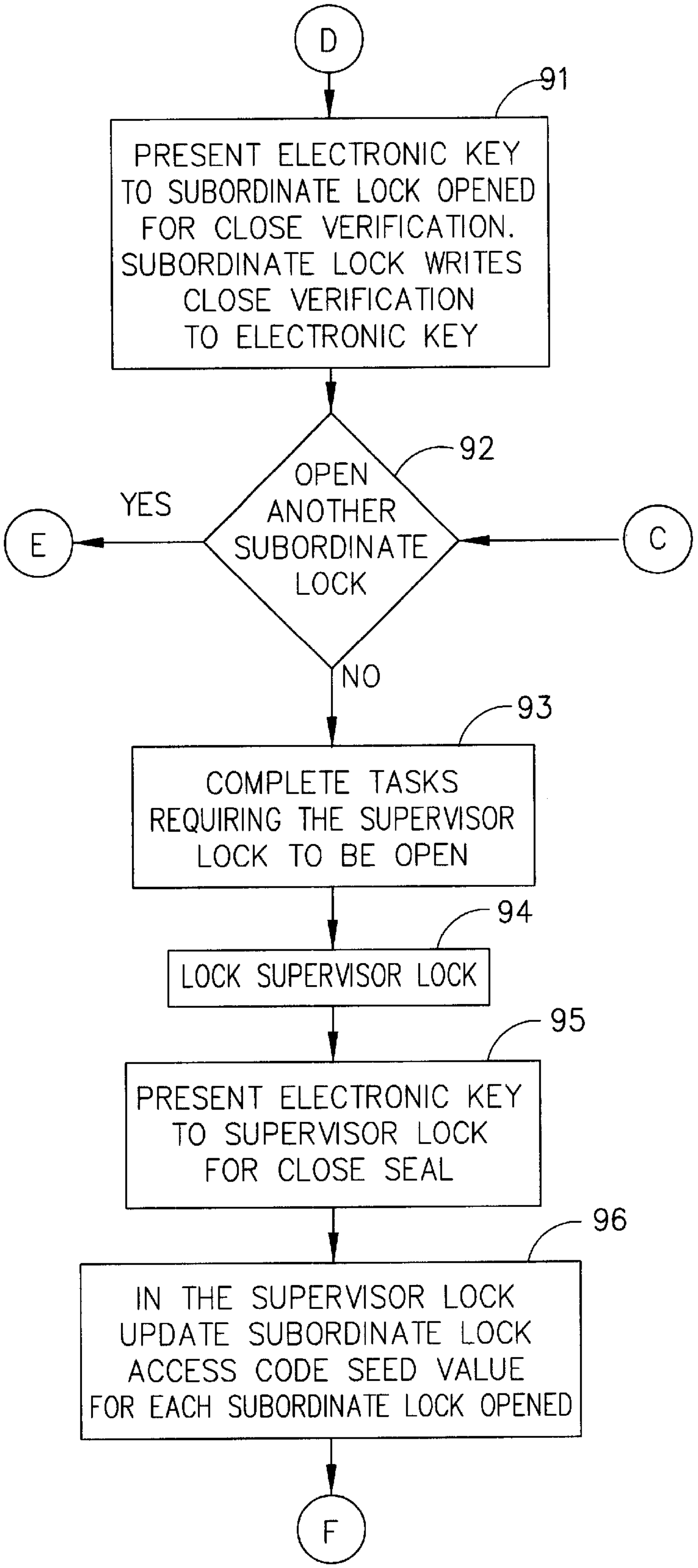
Figure 2D:
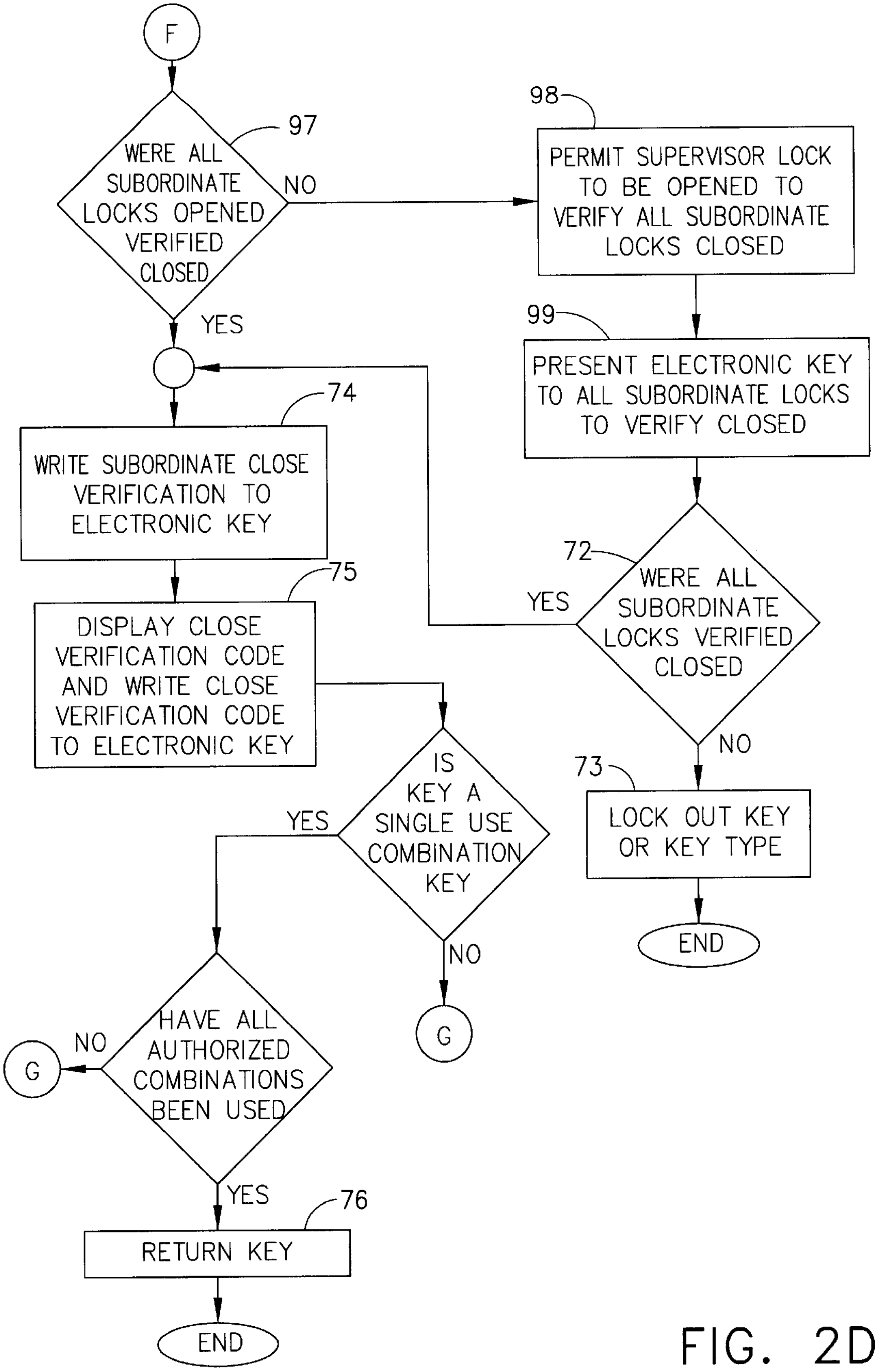

FIGS. 4A–4LL are logic flowcharts of the firmware used in the preferred embodiment of the electronic supervisor lock shown in FIG. 1.

FIGS. 5A–5L are flowcharts of the firmware used in the preferred embodiment of the electronic subordinate lock shown in FIG. 1.

Reference will now be made in detail to the present preferred embodiment to the invention, examples of which are illustrated in the accompanying drawings.

DETAILED DESCRIPTION

Overview

The electronic supervisor and subordinate lock system may be installed where it is desirable to have a secure area that contains one or more smaller areas where it is required or desired to have additional access controls or otherwise limit access. Alternatively, this lock system may be installed in an area where it is desirable to control and/or authorize one or more subordinate locks from a supervisor lock, with the subordinate lock(s) controlling access to areas inside or outside the area controlled by the supervisor lock. This system employs a first electronic lock as a supervisor lock and at least one other electronic lock as a subordinate lock. In some embodiments both the supervisor lock and the subordinate lock may be the same type of lock with different configurations. In other configurations the subordinate lock may have a different configuration. The use of a second configuration may reduce the cost of the system. The supervisor lock controls and/or authorizes access to one or more subordinate locks.

The supervisor lock provides the user, who entered a proper access code and/or combination into the supervisor lock, with the access code or combination to the subordinate locks that the user is authorized to open. There are a number of different methods that could be utilized to provide the access code or combination to the supervisor lock and subordinate lock.

One embodiment employs both an electronic key and a combination to open the supervisor lock. After entry of the proper combination and presenting the key, the supervisor lock could write the access code(s), if any, for the subordinate locks that the user is authorized to open. The user could then use the electronic key to open the authorized subordinate locks. An exemplary electronic key was disclosed in U.S. Pat. No. 5,091,771, Compact Package for Electronic Module, Bolan et al., Feb. 25, 1992. When the supervisor and subordinate locks utilize a seed number that changes after each use, it may be necessary to update the supervisor lock as to which subordinate locks were actually opened so that the supervisor lock will only increment/update the seed valves for the subordinate locks actually accessed. To increase the security and provide the ability to track/audit the use of both the supervisor and subordinate locks it may be desirable that the user obtain a closed verification from each subordinate lock opened and a closed verification from the supervisor lock. This closed verification and/or seal, however, could easily be made optional or eliminated if desired. If the closed seal on the supervisor lock was optional, some other method of updating the seed values for the supervisor lock could be used.

There are other methods that could be used as an alternative to the electronic key and combination/electronic key method disclosed above. The alternatives include: (1) combination/combination; (2) electronic key/electronic key; (3) electronic key/combination; (4) combination/electronic key; (5) electronic key/combination and electronic key; or (6) electronic key and combination/electronic key and combination. Each of these alternatives will be discussed briefly below.

When using the combination/combination method the user utilizes either a single or multiple use combination at the supervisor lock. After operating, but not necessarily opening, the supervisor lock and selecting one of the authorized subordinate locks for access the supervisor lock could issue the access code or combination for the selected subordinate lock if the combination entered indicated that the user was authorized to open the selected subordinate lock. After opening and closing the selected subordinate lock the user may have to enter a code to update the seed value for the subordinate lock opened at the supervisor lock, if a single use combination was utilized for the subordinate lock. Similarly, if a single use combination was used for the supervisor lock, the program used to issue the combination may also have to be updated.

Alternatively, an electronic key could be used to open the supervisor lock. When the electronic key was presented to the supervisor lock, the supervisor lock verifies that the user was authorized to open that particular supervisor lock and determines which, if any, of the subordinate locks that the user was authorized to open. The supervisor lock writes the access code or combination to the electronic key for the subordinate lock the key holder is authorized to open. The user then uses the electronic key to open one or more of the authorized subordinate locks. Similar to the combination/combination system described above, if the subordinate lock uses a single use combination/access code then the electronic key could be used to update the seed values for the subordinate locks actually opened at the supervisor lock. The supervisor lock seed values for the subordinate locks could be updated by presenting the electronic key to the supervisor lock. Similarly, if the supervisor lock used single use access codes or combinations, then the seed value used to issue the electronic key could be updated by the electronic key or by the key holder calling the key dispatcher with the close out code (close seal) from the supervisor lock.

The use of an electronic key to open the supervisor lock and a combination issued by the supervisor lock to open the subordinate lock could also be used in the present invention. Alternatively a combination could be employed to open the supervisor lock and an electronic key with an access code written by the supervisor lock could be used to open the subordinate lock. Either of these methods could be accomplished by mixing the elements disclosed above for the combination/combination or electronic key/electronic key methods.

The use of an electronic key to open the supervisor lock and both an electronic key and a combination to open an authorized subordinate lock could also be accomplished. The electronic key would open the supervisor lock and receive an access code for any subordinate locks authorized. The supervisor lock could then issue a single combination that together with the electronic key could be used to open any authorized subordinate lock. Alternatively, a separate combination could be issued by the supervisor lock for each authorized subordinate lock.

The use of both an electronic key and a combination could also be used to open both the supervisor as well as any authorized subordinate locks. This method of operation would combine the combination/combination and electronic key/electronic key methods discussed above. This method may provide the highest level of security for the areas controlled, however, this extra security would increase the cost of the locks used and reduce the ease of system use. The extra cost of the locks would result from the extra computing power and firmware required in both the supervisor and subordinate locks. Thus, the embodiment as discussed in detail utilizes a combination and electronic key to open the supervisor lock and only an electronic key to open any authorized subordinate locks as providing a cost-effective level of security.

Combination & Electronic Key/Electronic Key Embodiment

FIG. 1 illustrates one embodiment of the electronic supervisor and subordinate lock system 10. There is a key and combination control device 20 with the proper hardware and software; a key 30; a supervisor lock 40 and at least one subordinate lock 60.

Key and Combination Control Device

The key and combination control device generally indicated at 20 may be a general purpose personal computer 21 running software that can be used to program or transfer data to different types of electronic keys 30. Within the computer 21 is a lock I/O card that contains a microprocessor running the same/similar function as that running in the lock.

Additionally, the software would be used to issue the proper combination to be used with each key 30. Connected to one of the input/output ports of the computer 21 with cable 24 is key interface 22. One example of a key and combination control device 20 is described in U.S. Pat. No. 5,488,660, Electronic Combination Lock Utilizing One Timer Use Combination, Dawson et al., Jan. 30, 1996, herein incorporated by reference.

Key interface 22 together with cable 24 permits the computer 21 to read data from, write data to and/or program key 30. Typically, key interface 22 is connected with cable 24 to a communication port on computer 21. Alternatively, cable 24 may be connected to a parallel, a USB, or any other I/O port or connection to the computer 21.

As discussed above, the key and combination control device 20 may be a personal computer 21 connected to a key interface 22. Alternatively, control device 20 may be a custom built device that is capable of reading the contents of key 30 and writing the proper data an/or programming key 30 to permit the key holder after entering the proper combination to open the supervisor lock 40. Control device 20 may also write and/or program key 30 with which, if any, of the subordinate locks 40 that the key holder is authorized to open. Additionally, control device 20 may output the authorized combination for supervisor lock 40.

Figure 3A:
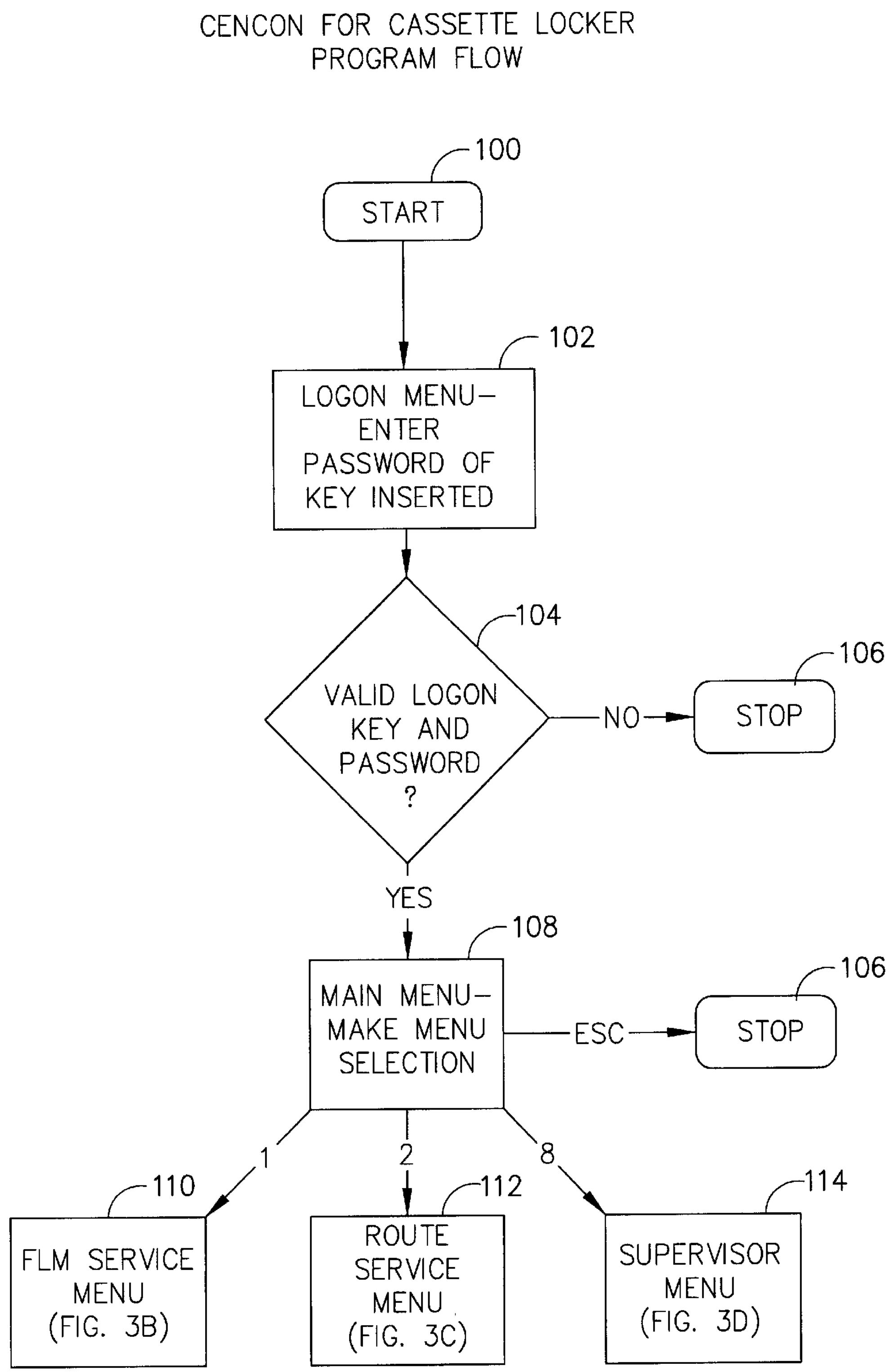
FIGS. 3A–3R are logic flowcharts of the personal computer software used in the preferred embodiment of the invention illustrated in FIG. 1.
Figure 3B:
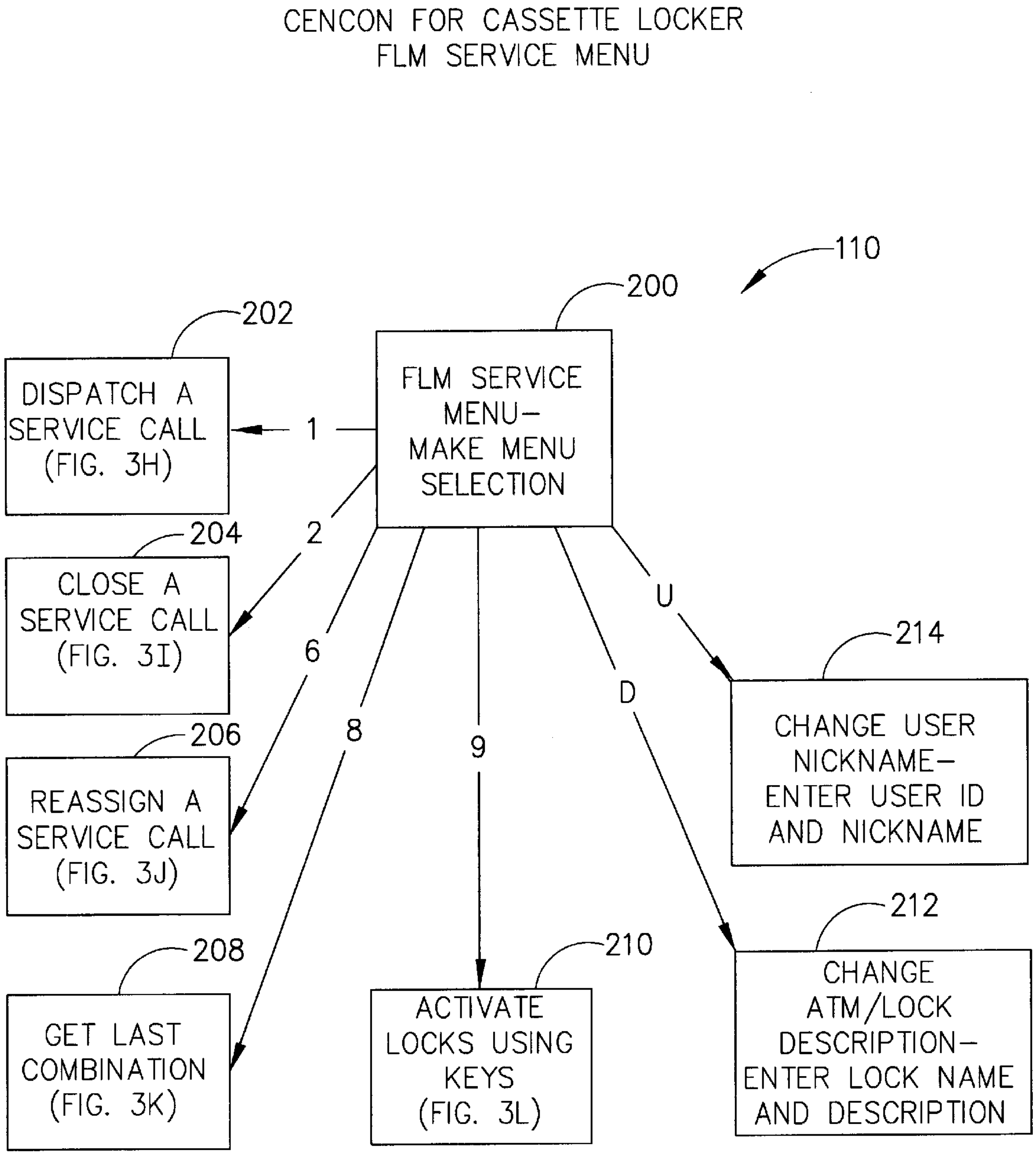
Figure 3C:
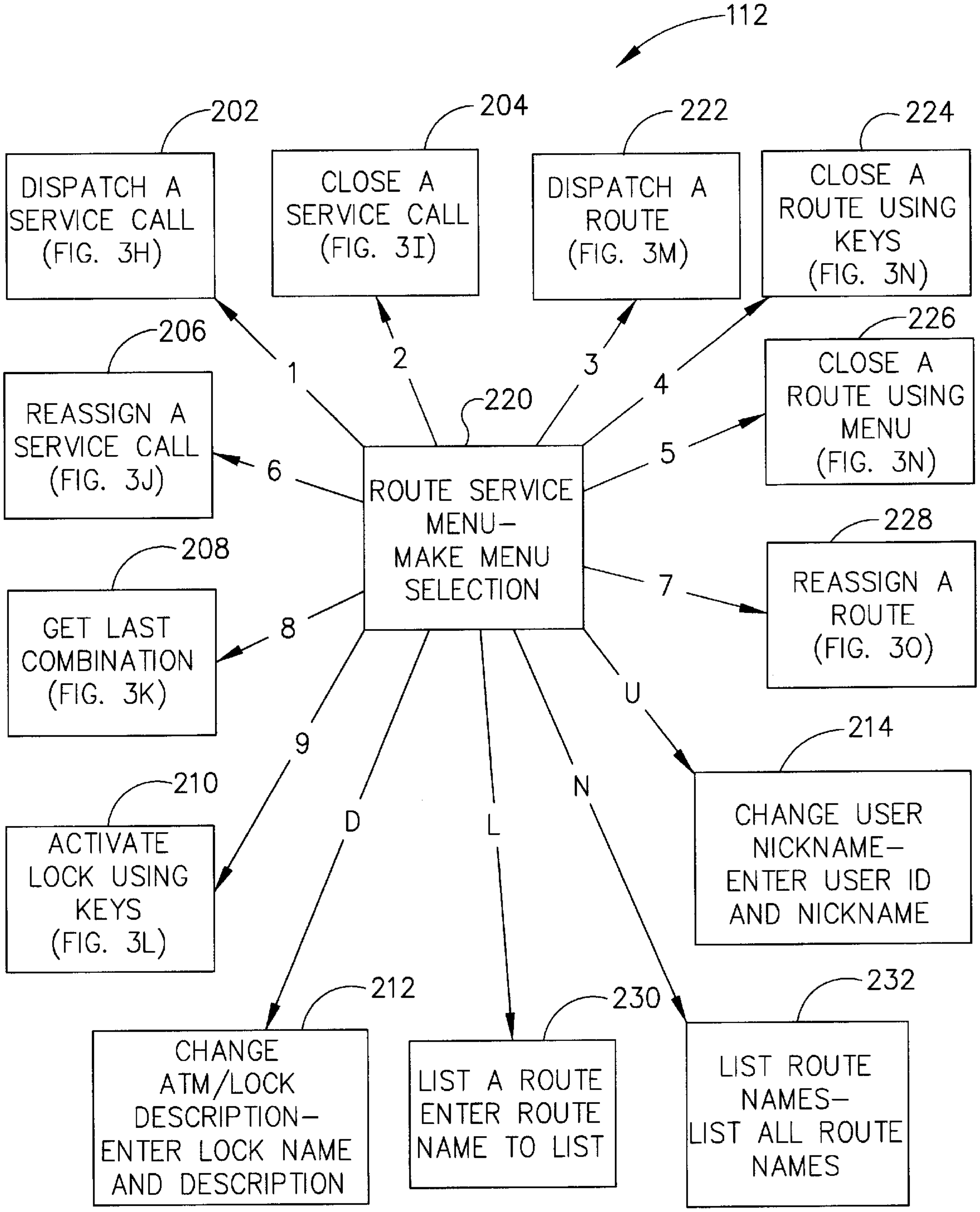
Figure 3D:
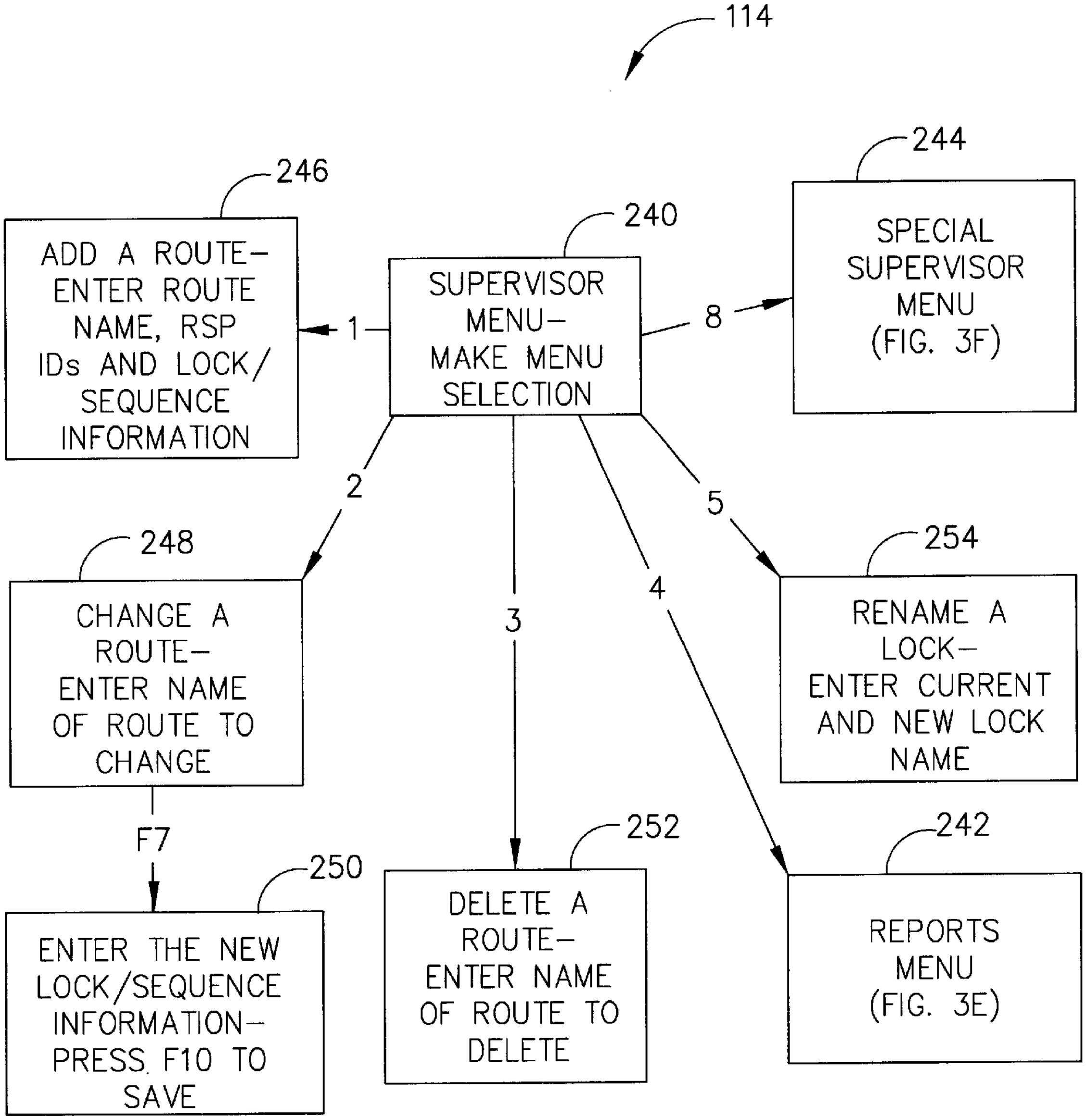
Figure 3E:
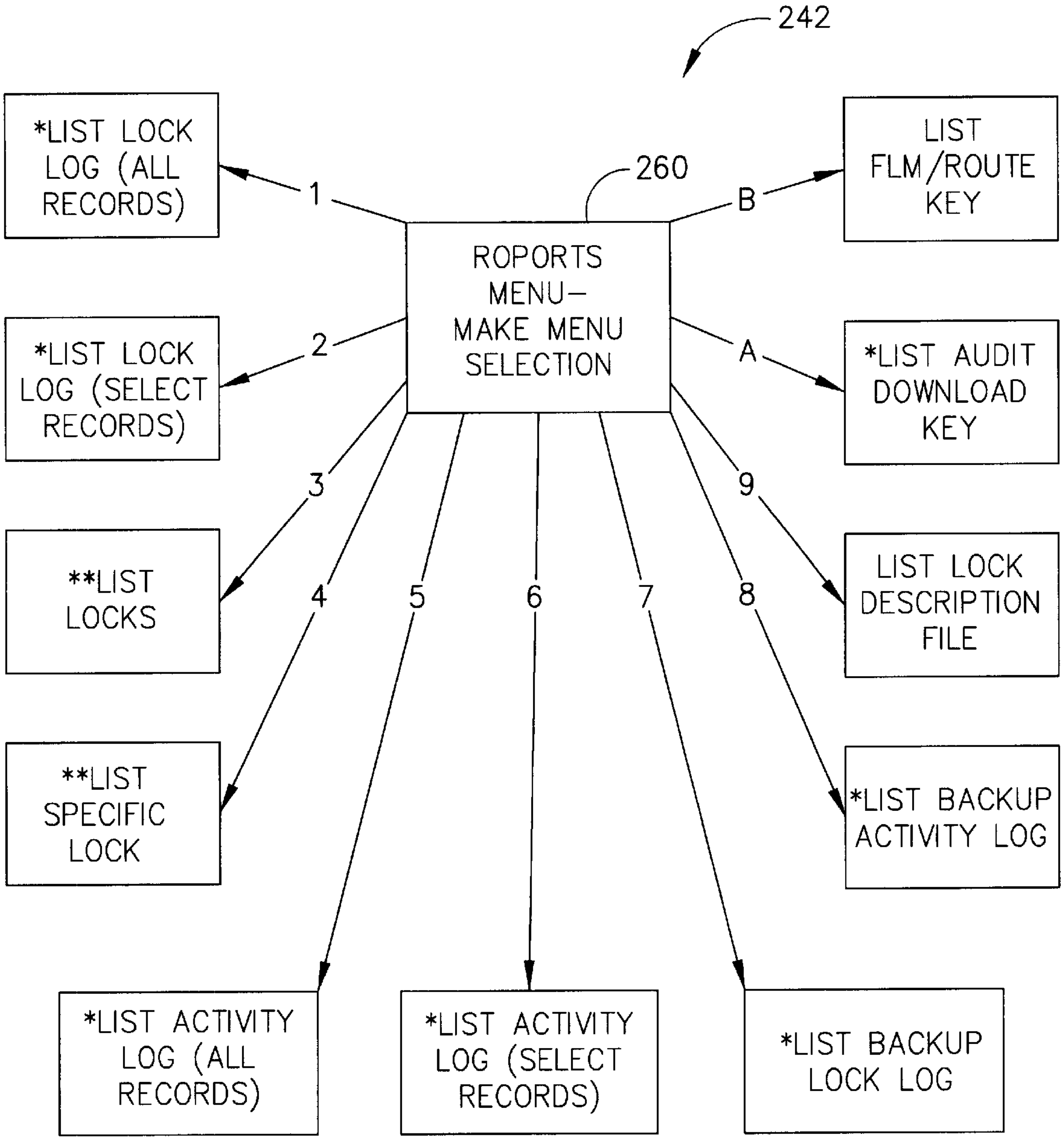
Figure 3F:
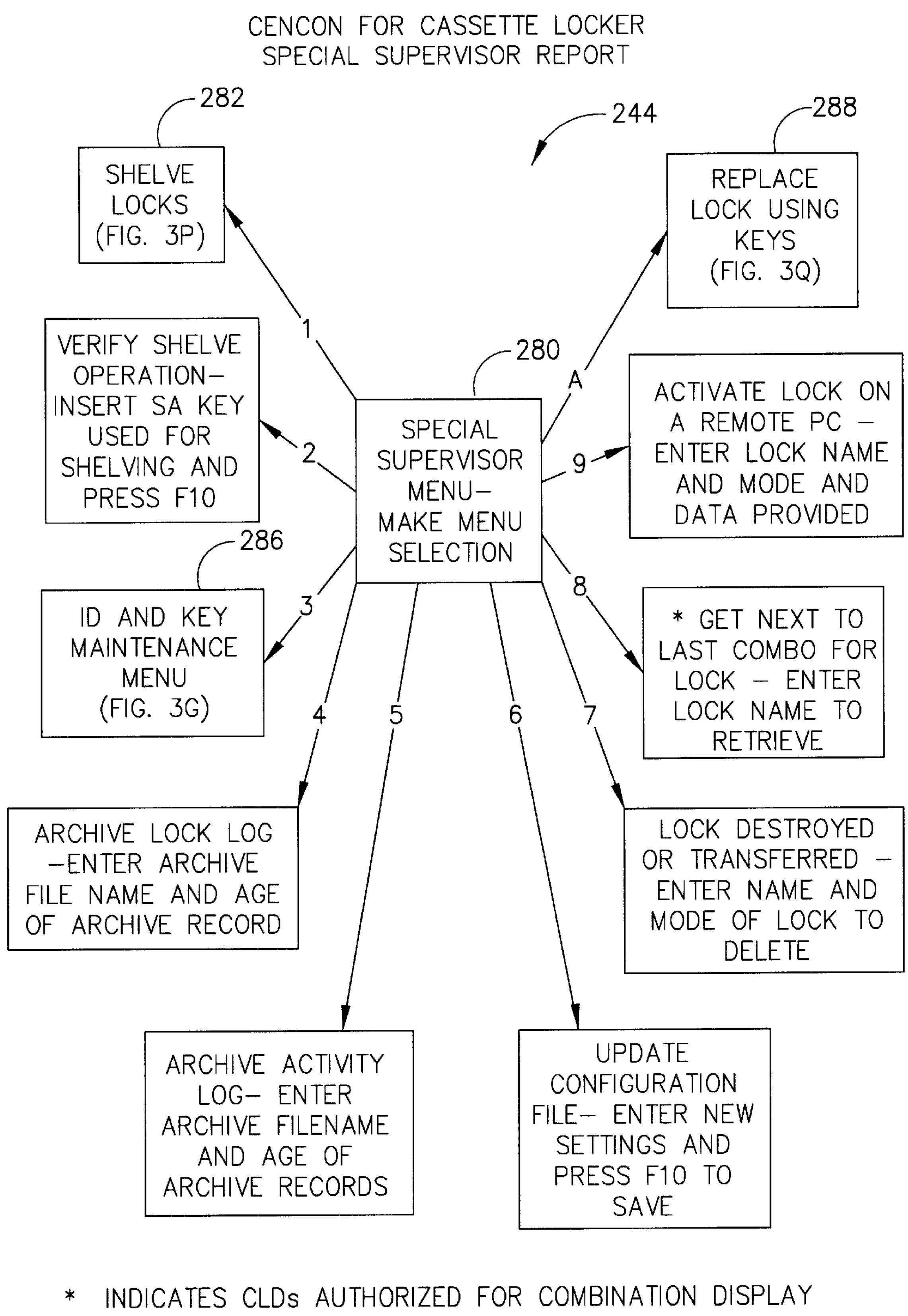
Figure 3G:
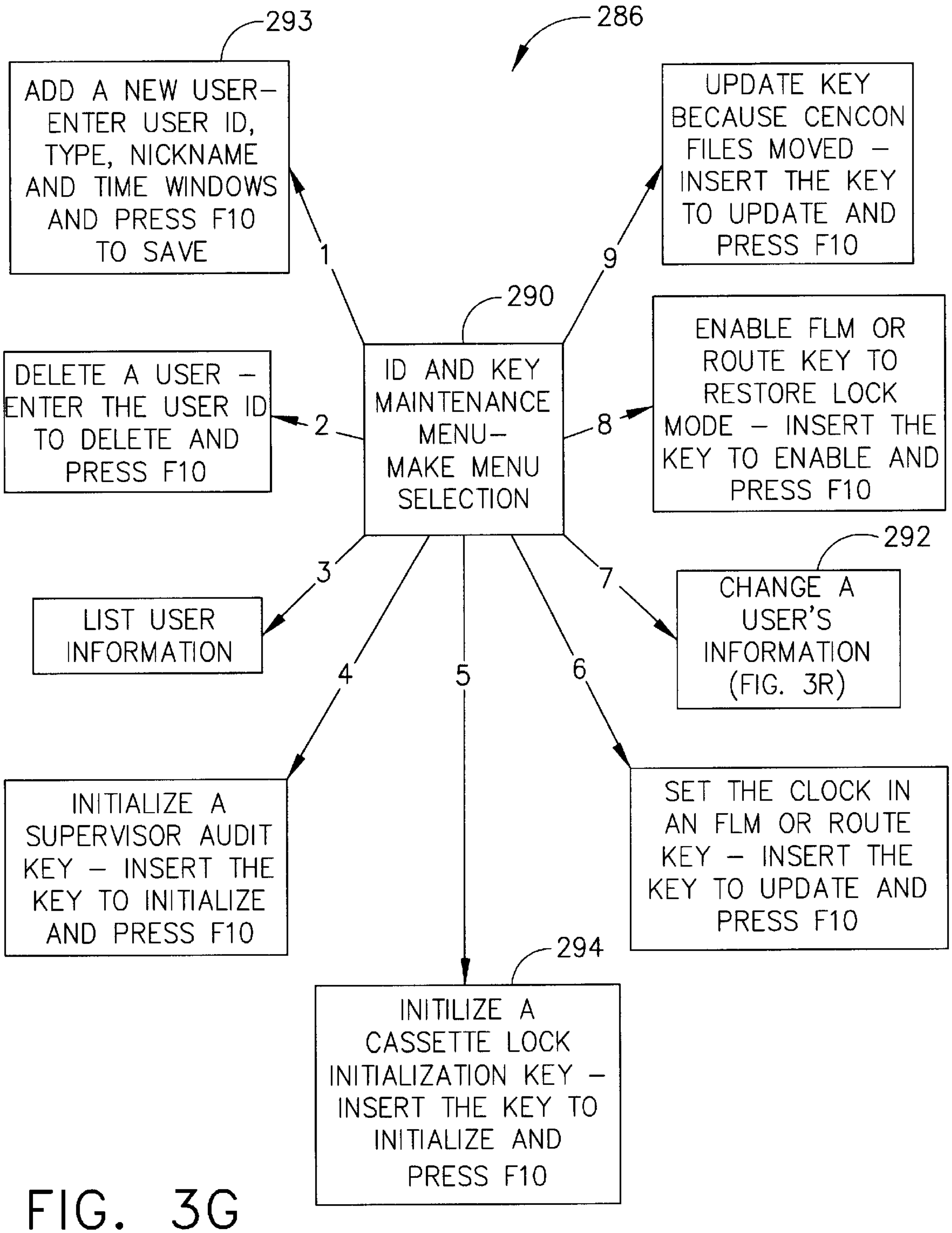
Figure 3H:
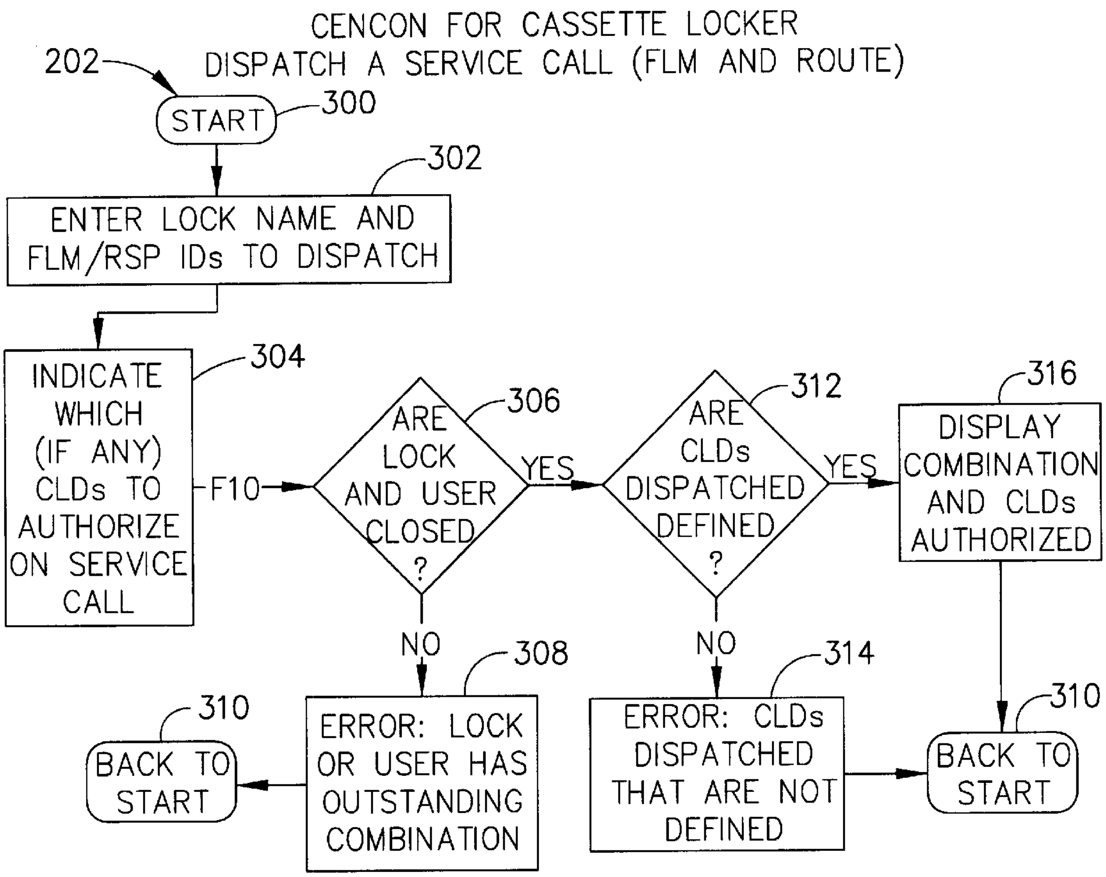
Figure 3I:
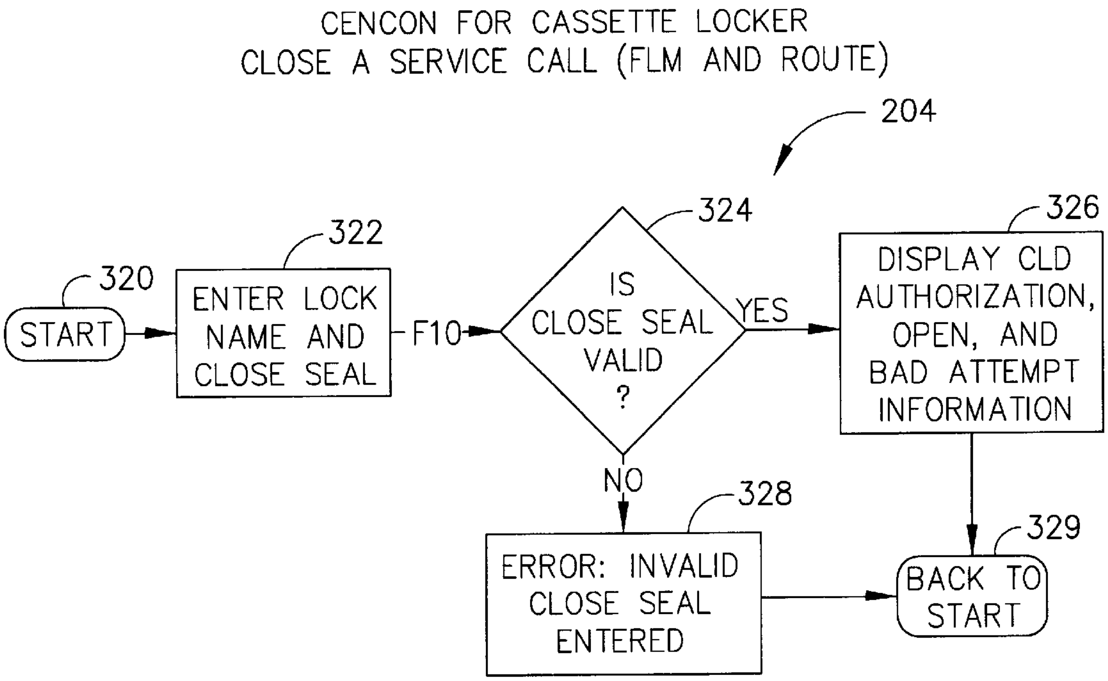
Figure 3J:
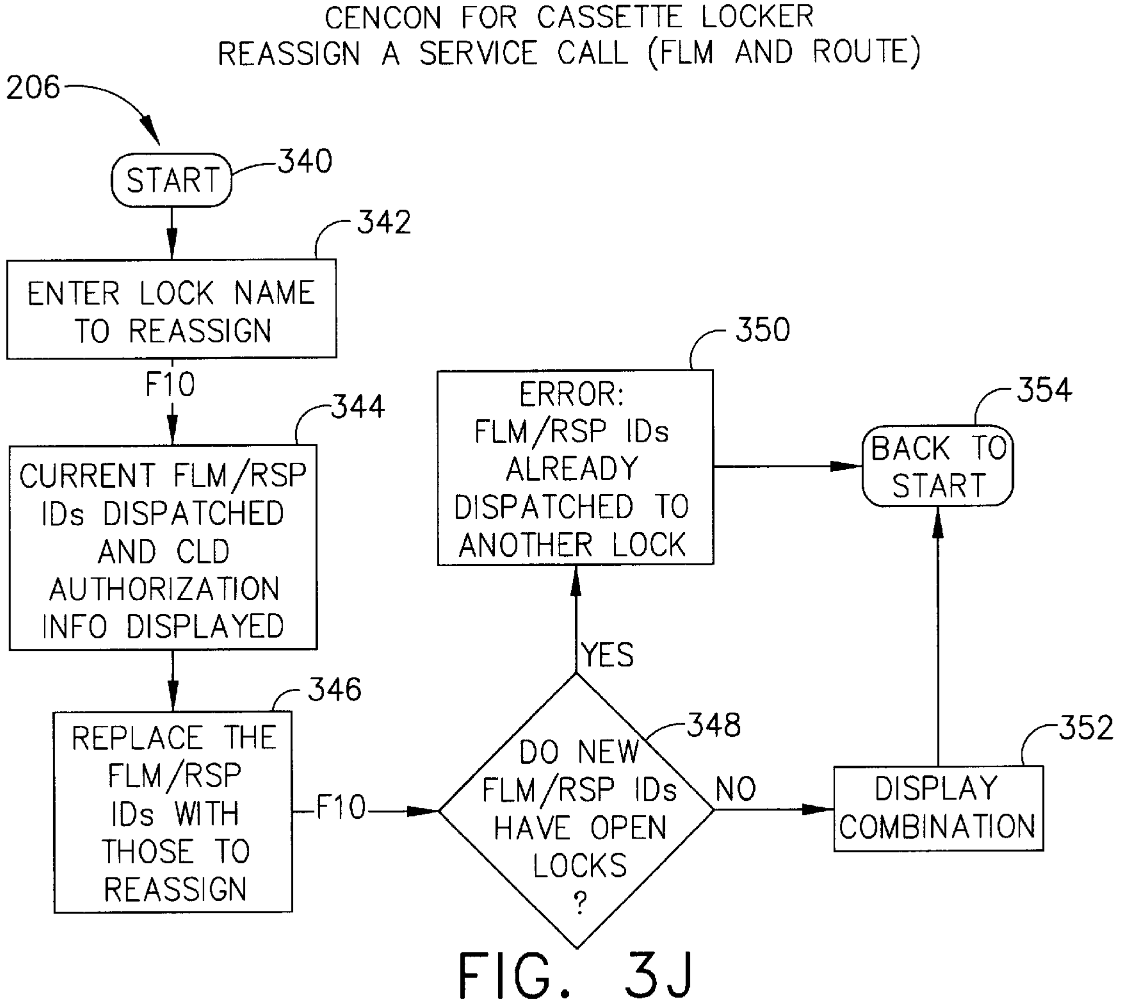
Figure 3K:
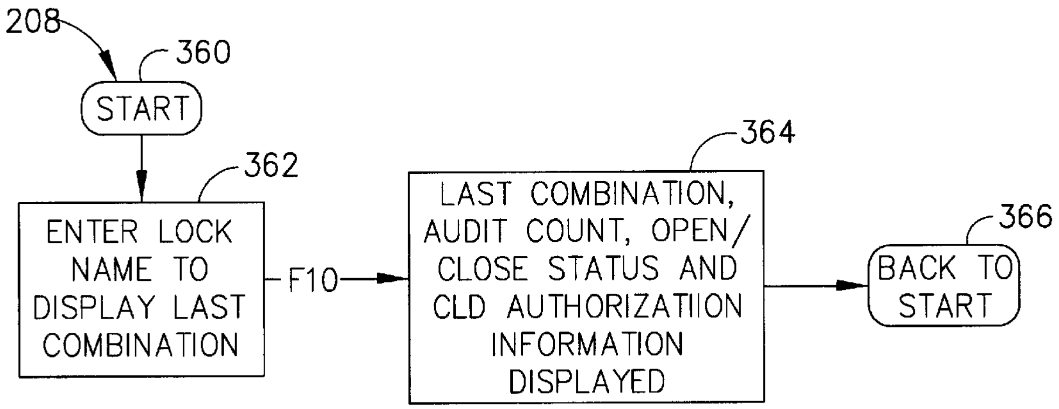
Figure 3L:
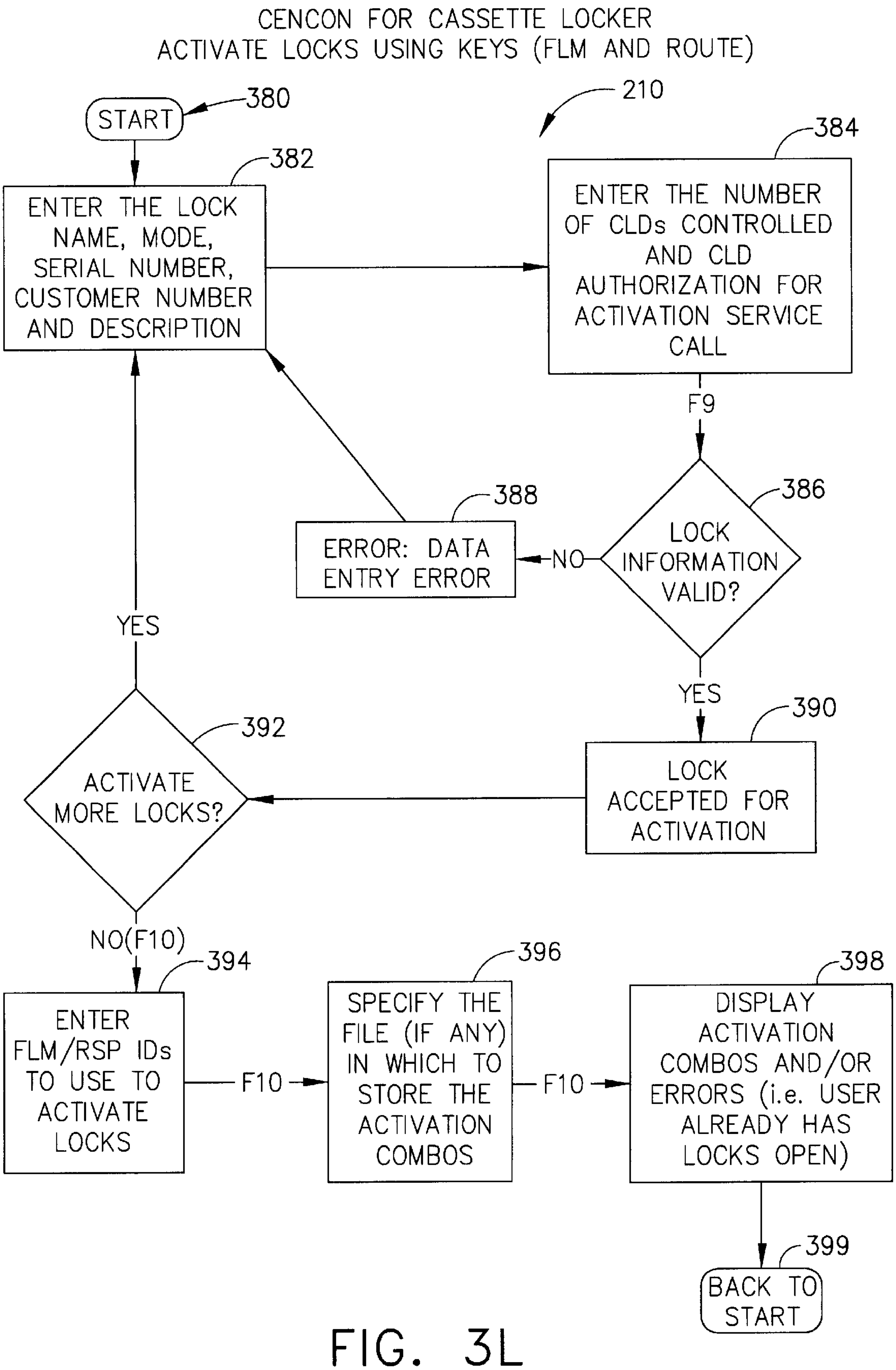
Figure 3M:
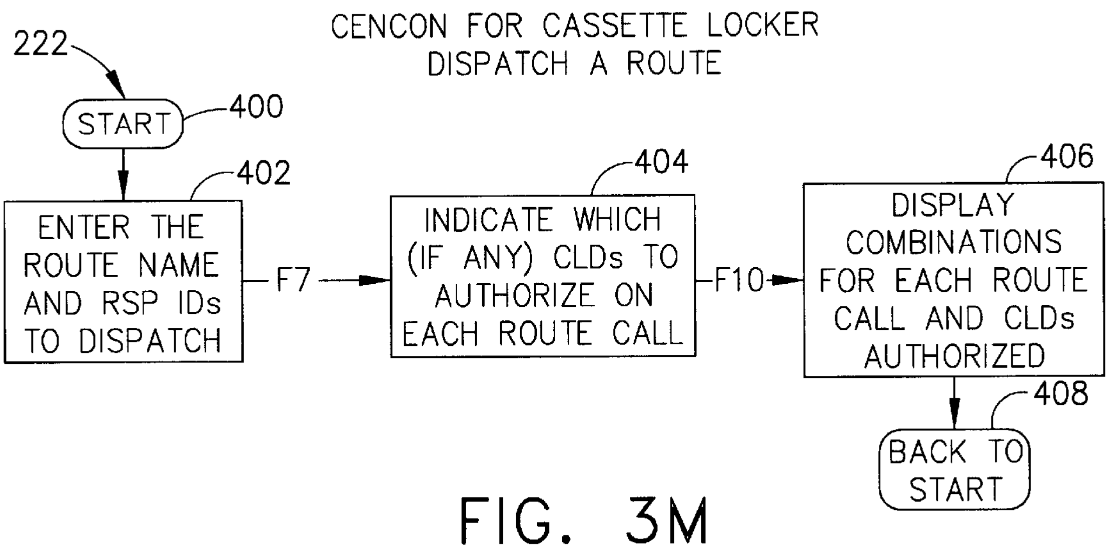
Figure 3N:
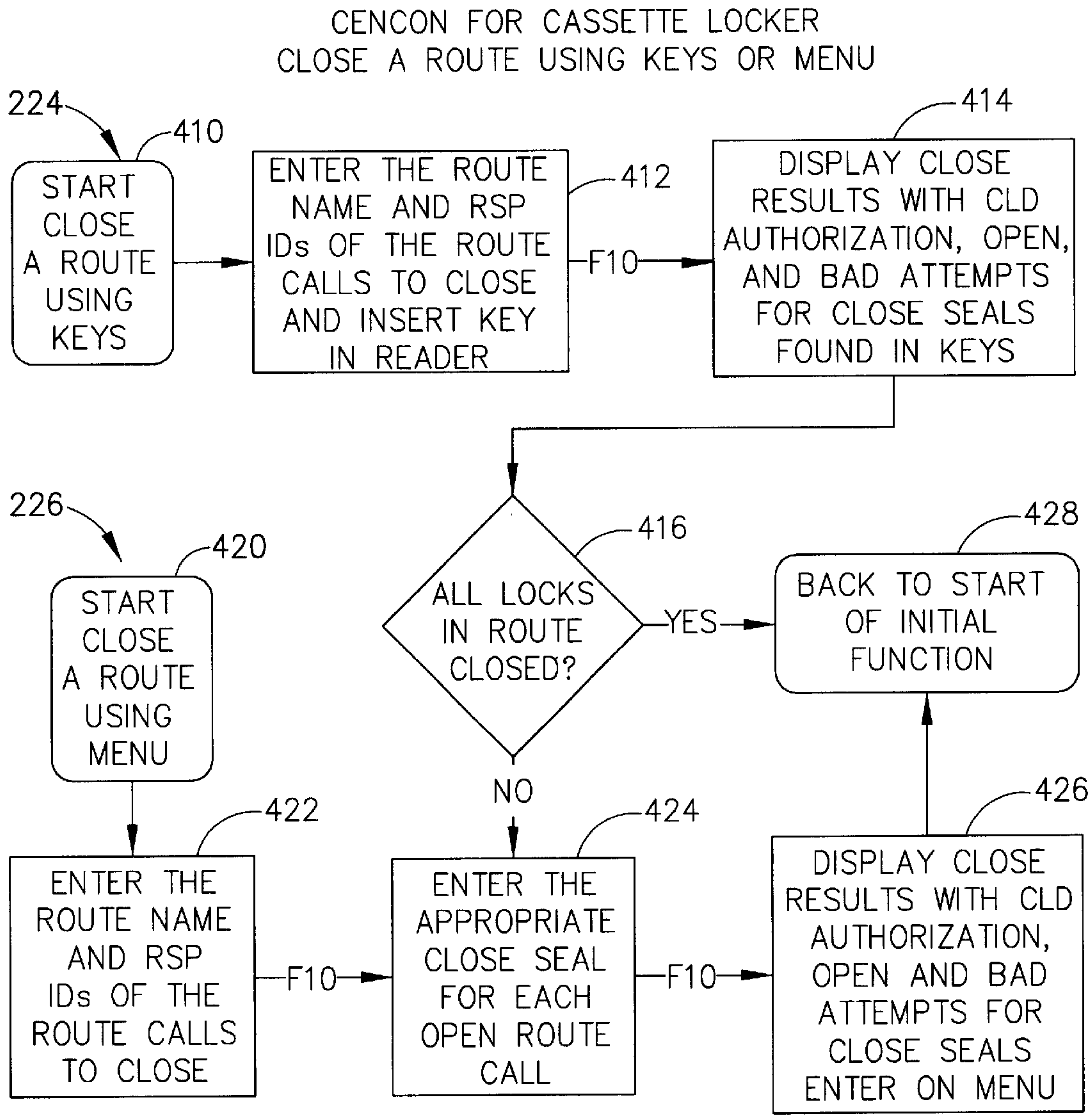
Figure 30:
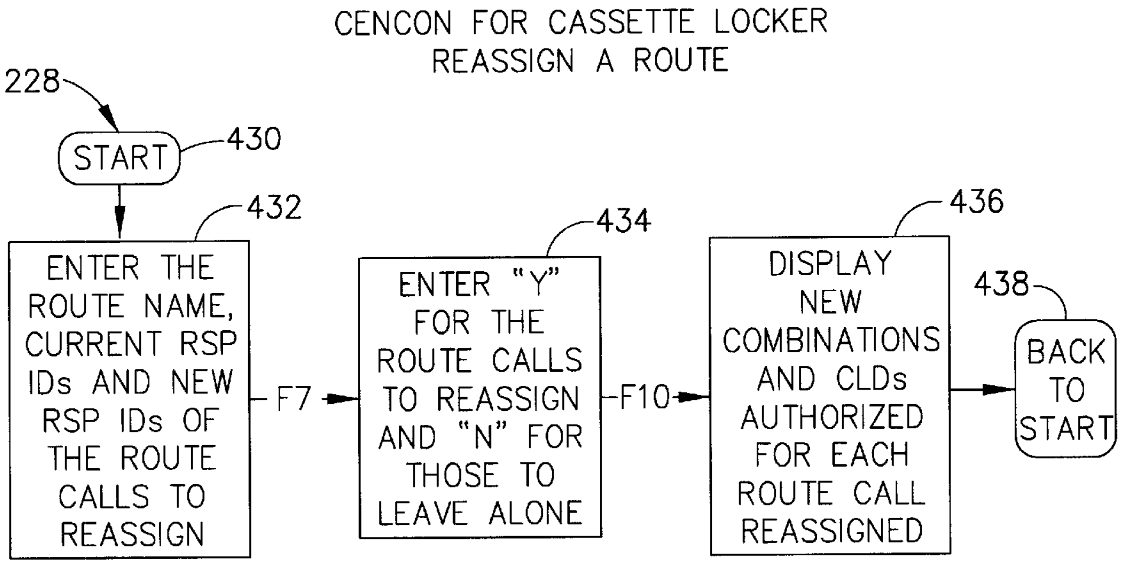
Figure 3P:
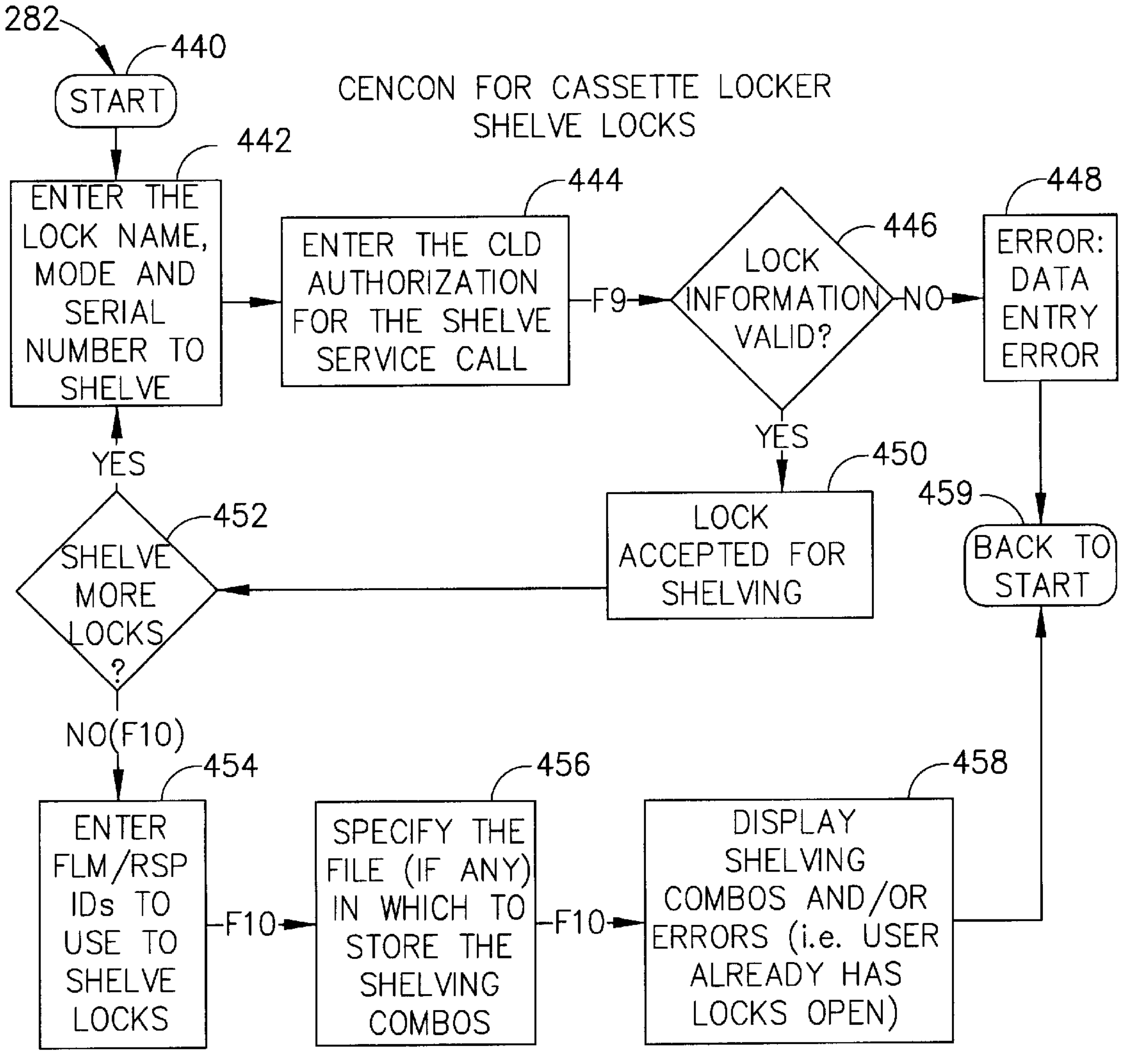
Figure 3Q:
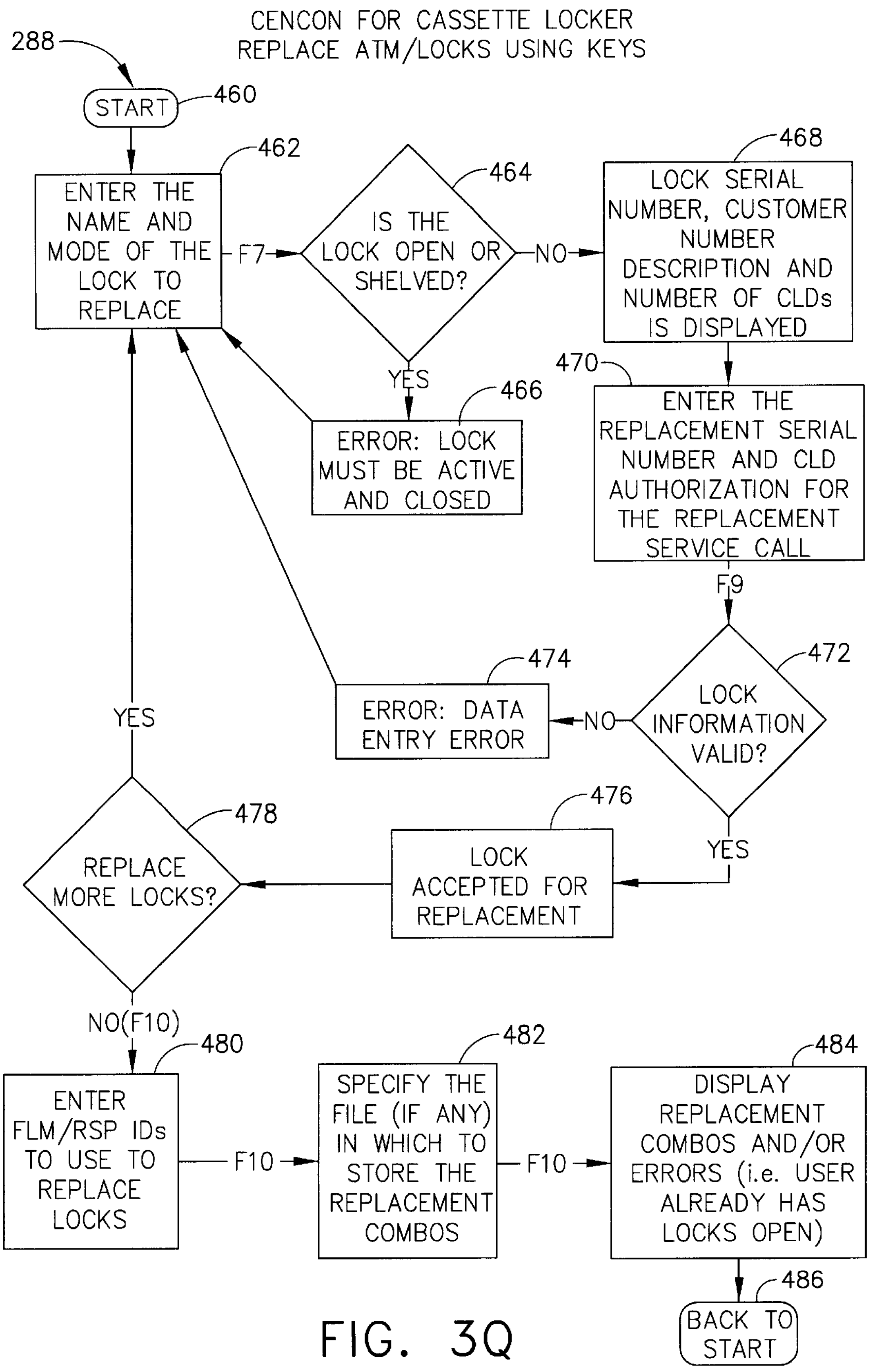
Figure 3R:
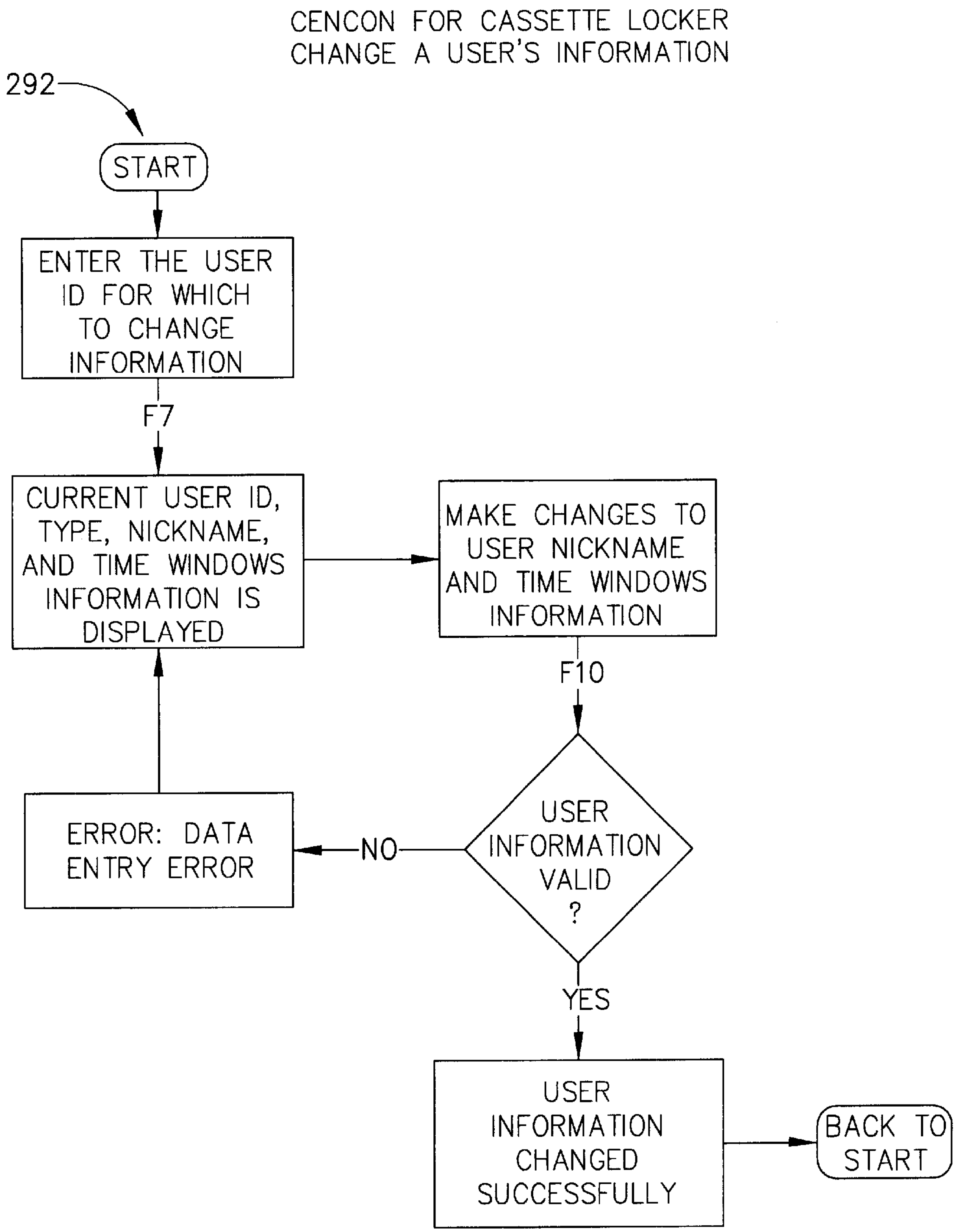

One example of this software is illustrated by the functional flowcharts shown in FIGS. 3A–3R. The illustrated software was written in the C programming language and designed to run on an MS-DOS based computer. It is expected that it is within the ordinary skill in the art of computer programming for a computer programmer to utilize the flowcharts in writing a program in any other programming language that would be capable of running on other operating systems, including but not limited to the MAC OS, Windows, Windows '95. Windows 98, Windows NT, or Unix. FIGS. 3A–3R provide functional flowcharts for the entire computer program. The features that are not required for and do not utilize the senior subordinate lock combination may not be discussed in detail.

In FIG. 3A, the exemplary program flow begins at terminator 100. After the program begins, a login menu is displayed where the user would be prompted to enter the password associated with the particular key 30 inserted in key holder 22 in password block 102. Thereafter, the program would verify the key 30 and password in decision 104. If the key 30 and password were not valid, the program terminates at terminator 106. When the key 30 and password are valid, the main menu may be displayed in block 108.

The main menu provides the operator the ability to select an FLM service menu in block 110 by pushing a key, for example, the number "1" key. Throughout this disclosure commands are described in terms of keystrokes, however, it is to be understood that an operator may select an icon/menu/button/symbol on a display as an alternative method for directing computer action. If the operator desired to enter the route service menu, the operator presses a second key, for example, the "2" key. After pressing the "2" key, the program directs the program flow to block 112. Additionally, the operator may access the supervisor menu block 114 by pressing a third key, for example, the 8 key. At any time in the main menu selection that the operator desired to terminate the program, he could do so by pressing a preselected key, for example, the escape key. The escape key terminates the program in block 106.

FIG. 3B illustrates an exemplary FLM service subroutine 200 and is an example of a subroutine that may be accessed in block 110. The FLM service menu subroutine shown in FIG. 3B permits the operator to dispatch a service technician to a lock. The FLM service menu subroutine 200 shown permits the operator to select one of seven subroutines or features. When the operator desires to dispatch a service call to a particular supervisor lock, the operator may use the subroutine illustrated by block 202. The dispatch service call subroutine 202 may be accessed by pressing a predetermined key, for example, "1." Alternatively, if a mouse or other pointing device were employed an icon or other symbol on the screen could be selected instead of pressing a key. The operator can close a service call in block 204 typically by pressing a predetermined key, for example, the number "2" key. A service call may be reassigned in block 206 by pressing the "6" key. If a combination is lost or the service technician incorrectly remembered the combination, the operator may retrieve the last combination issued in block 208 by pressing a predetermined key, for example, the "8" key. The operator may also activate a new lock using a key in block 210 by pressing a predetermined key, for example, the "9" key. The FLM service menu in block 200 also permits the PC operator to change the lock description in block 212 by pressing a predetermined key, for example, "D" and to change the user nickname by pressing a predetermined key, for example, the letter "U" to access block 214. Some program embodiments may not require all seven menu choices. One alternative embodiment may employ the dispatch call subroutine 202, the close call subroutine 204 and the activate locks subroutine 210 in the supervisor—subordinate lock system.

FIG. 3C illustrates the subroutines that may be called from within the route service subroutine 112. The route service menu selection menu 220 permits the PC operator to perform all of the functions as performed in the FLM service menu subroutine of block 110. In addition, the menu provides additional functionality by permitting the operator to dispatch a route using the subroutine of block 222. This feature may be accessed by pressing a predetermined key, for example, the number "3" key. The operator can close a route using keys by pressing a predetermined key, for example, the number "4" and accessing the subroutine of block 224 or close a route using a menu by accessing the subroutine shown in block 226 by pressing a predetermined key, for example, the number "5" key. Furthermore, the operator may reassign a route using the subroutine of block 228 which is accessed by pressing a predetermined key, for example, the "7" key on the keyboard. Additionally, the PC operator can list the locks in a particular route by pressing a predetermined key, for example, the L key in block 230 and can list all the route names by pressing a predetermined key, for example, the M key and accessing block 232. Alternatively, if a mouse or other pointing device were employed an icon or other symbol on the screen may be selected instead of pressing a key.

By using a route, the operator may issue one or more combinations for one or more respective locks. Thus, a service technician may make a single phone call and receive access authorization and combinations to several locks which would save the operator time by being able to go perform his work at several locks.

FIG. 3D provides the details of the supervisor menu block 114 shown in FIG. 3A. The supervisor menu selection is indicated at block 240 which permits the user to access two additional submenus, the reports menu indicated at block 242 which may be accessed by pressing a predetermined key, for example, the "4" key and the special supervisor menu indicated at block 244 that may be accessed by pressing a predetermined key, for example, the "8" key.

Additionally, the supervisor menu selection 240 permits an authorized operator to add a route in block 246 usually by pressing a predetermined key, for example, the "1" key or to change a route typically by pressing a predetermined key, for example, the "2" key in block 248. After entering the route name, the operator could press a predetermined key, for example, the F7 key and enter the new lock/sequence information in block 250. Thereafter, the operator could press a predetermined key, for example, the F10 key to save this information. Furthermore, an operator may delete a route by entering the route name in block 252 after pressing a predetermined key, for example, the "3" key, and rename a lock in block 254 by pressing a predetermined key, for example, the "5" key. Some program embodiments may not require all the features shown in FIG. 3D. As discussed above, a pointing device and symbols or icons on the screen may be utilized instead of pressing a key.

With reference now to FIG. 3E showing a detail of the reports menu subroutine 242. The reports menu subroutine 242 may call the reports menu selection screen indicated at block 260. From this screen depending on which key the user presses, the user may obtain the different reports listed providing information on the supervisory locks and subordinate or CLD locks. This information can include a listing of all lock records, a listing of selected records, a list of activity and current status of one or more locks, descriptions of the locks, and other information. As discussed above, a pointing device and symbols or icons on the screen may replace pressing a predetermined key.

With reference now to FIG. 3F showing in detail the special supervisor menu 244. When the special supervisor menu 244 subroutine is called, a special supervisor menu selection screen may be displayed as indicated in block 280. Of the multitude of menu choices available on the special supervisor menu selection 280 of particular interest is the shelved locks subroutine 282 which may be accessed by pressing a predetermined key, for example, "1", the ID and key maintenance menu subroutine 286 accessed by pressing a predetermined key, for example, "3", and the replace lock using keys subroutine 288 that may be accessed by pressing a predetermined key, for example, the letter "A."

The shelved locks subroutine 282 permits the operator to take a lock out of service. A lock may be shelved when a lock is no longer being utilized and typically prior to storage. The ID and key maintenance menu 286 permits the special supervisor to perform additional maintenance on the key, together with adding or deleting users from the system. The replace lock using key subroutine 288 permits one lock to be replaced with another in the system and permits that new lock to be initialized. Some program embodiments may not require all the functionality illustrated in FIG. 3F.

The ID and key maintenance menu subroutine 286 shown in detail in FIG. 3G, calls an ID and key maintenance menu selection screen indicated at block 290. In addition to the other menu selection items, the operator can initialize a key that could be used in reinitializing both the senior and subordinate locks, typically by pressing a predetermined key, for example, the "5" key and accessing block 294. After initializing the key 30 in block 294, a lock technician could use this key 30 to reinitialize the senior lock with one or more subordinate locks. This function, while optional, prevents the lock technician from having to reinitialize all the subordinate locks to a single supervisor lock if there is trouble with one or more subordinate locks. Additionally, by pressing a predetermined key, for example, the "7" key the user could access the subroutine 292 used to change the user's information. The details of the subroutine are shown in FIG. 3R. The other menu choices may be access by pressing the key associated with that particular function required or requested. Additionally, these functions may also be accessed using symbols or icons on the screen.

With reference now to FIG. 3H which illustrates an exemplary functional flowchart for dispatching a service call from either the FLM service selection menu 200 or the route service selection menu 220. After starting the subroutine at block 300, the operator may enter the lock name or other lock identifiers and the ID of the key or person used to access that lock in block 302. Thereafter, the operator enters which, if any, subordinate or CLD locks that key or person was authorized to enter in block 304. After this entry was complete, the operator may press the F10 key or otherwise indicate that the entry was complete. The flow may then move to decision block 306 where the system may check to see whether the lock and the user have an outstanding combination or for any other predetermined reason not to issue a combination for a user or lock. If either the lock or the user has an outstanding condition, an error screen may be shown in block 308. Thereafter, the program flow may return to the start of the subroutine at block 310.

When both the lock and the user are available, the program flow typically moves to decision 312 where the subroutine verifies that the subordinate or CLD locks to be dispatched are defined in the system. If the subordinate or CLD locks requested have not been defined, then an error screen may be shown in block 314. If the subordinate locks to be dispatched are defined in decision 312, the software may obtain and display the authorized combination together with the subordinate locks if any that the key 30 would be authorized to enter. Thereafter, the program flow from either block 314 or block 316 would be back to the start to dispatch the next service call at block 310. This permits the user to easily dispatch a second service call. In the event that another function or subroutine would be required, the operator would press a predetermined key, for example, the escape key, to move back one menu screen. Alternatively, the operator could select the appropriate symbol and/or icon on the screen.

With reference now to FIG. 3I which illustrates an exemplary subroutine 204 that may be utilized to close a service call from either the FLM or route menus. The illustrated subroutine was written for utilization by a lock system employing one-time and/or single use combinations. These systems may utilize a close seal or other close code to update seed or other values utilized to generate or select a combination.

The sample subroutine starts at block 320. Thereafter, a screen is provided where the operator can enter the lock name or lock identifier and the close seal obtained by the technician after closing and/or operating the supervisor lock after closing any subordinate lock opened in block 322. After entering the appropriate information into the computer, the operator would typically presses a predetermined key, for example, F10, to indicate that the data entry was complete. Thereafter, the program flow is to decision block 324 where the software checks the closed seal to see if it is a valid closed seal. If the closed seal is invalid, an error screen may be displayed in block 328, and thereafter, the program may return to the start of the subroutine at block 329. When the closed seal is valid in decision 324, the program flow may move to block 326 where the subordinate locks authorized to be opened together with the subordinate locks actually opened and any bad or erroneous attempts to open unauthorized subordinate locks could be displayed. Thereafter, the program typically returns back to the start in block 319 to enable the operator to easily close the next service call. When the operator desires to return to the previous menu screen, typically the escape key is pressed. Alternatively, the operator could select an icon symbol, or menu choice on the screen in lieu of pressing a key.

With reference now to FIG. 3J, which illustrates the flowchart for the exemplary subroutine utilized to reassign a service call from one service person to a second person. This feature may be accessed from the FLM menu 200 or the route service selection menu 220. The reassigned service call subroutine 206 illustrated begins with block 340. Thereafter, the operator is prompted to enter the lock name or other lock identifier to reassign in block 342. The operator presses a predetermined key, for example, the F10 key, after entering the proper data. Thereafter, in block 344 the current key or service technician's ID may be displayed together with the subordinate or CLD locks authorized for entry. Thereafter, in block 346 the operator replaces the ID with the new ID to which the call is reassigned. After pressing a predetermined key, for example, the F10 key, the software may verify in decision block 348 that the new ID did not have any open locks or other outstanding condition that may prevent the call from being assigned to the new ID. If there were an open lock or other problem, an error screen could be displayed in block 350 which may indicate the problem. When the new ID does not have any problems in decision 348, the program flow moves to block 352 where a combination would be displayed. Thereafter, the flow from either block 352 or block 350 could be to block 354 where the subroutine would restart to permit other calls to be reassigned if desired. Again, as in prior subroutines when the subroutine is no longer desired, the operator may return to the menu which called the subroutine by pressing a predetermined key, for example, the escape key. As discussed above, screen icons or symbols could replace keystrokes.

With reference now to FIG. 3K that provides an exemplary flowchart for the subroutine that enables the operator to retrieve the last combination issued for a particular lock. The get last combination subroutine 208 illustrated may be called from either the FLM service selection menu 200 or the route service selection menu 220. The illustrated subroutine starts at block 360. Thereafter, in block 362 the operator enters the lock name or other identification of the lock which the operator desired the last combination. After entering this information and pressing a predetermined key, for example, the F10 key, the program would perform a search of the appropriate data records and obtain the last combination and display this combination in block 364. Thereafter, the subroutine would return to start 360 in block 366. As discussed above, screen icons or symbols could replace keystrokes.

With reference now to FIG. 3L showing an exemplary flowchart for the subroutine used to activate locks using key 30. This subroutine may be accessed from the FLM selection menu 200, the route service selection menu 220 or other desired menu. The illustrated subroutine begins with block 380. Thereafter, the user may be prompted to enter the lock name, mode, serial number, customer number, and/or description in block 382. Alternatively, the user may enter any other data required/desired to identify a particular lock. Thereafter, the computer user may be prompted to enter the number of subordinate locks controlled and which subordinate locks or CLDs will be authorized for activation on this service call in block 384. Thereafter, the user presses a predetermined key or selects an icon, for the F9 key indicating that all the data had been entered. The program flow then checks in decision block 386 whether the lock information appears valid. If the lock information entered appeared invalid, the program flow may be to block 388 where an error screen would be displayed. Thereafter, the program flow could return to block 382 where the user could reenter the lock information. When the lock information appears valid in decision block 386, the lock may be accepted for activation in block 390. Thereafter, the user would be asked if they wished to activate more locks in decision block 392. If the user wishes to activate more locks, the program flow could return to the data entry block 382. When the user has completed activating locks, the user could press a predetermined key, or select an icon on the screen, for example, the F10 key, and the program flow could move to block 394 where the ID used to activate the locks would be entered. Typically, the operator would press a predetermined key or select an icon on the display, for example, the F10 key, after entering the ID. Optionally, in block 396 the operator has the ability to specify which file to store the activation combinations. If no file was selected, then these combinations may not be saved and the operator could press a predetermined key or select an icon on the display, for example, F10 key again, to obtain and display the activation combinations or errors in block 398. The program may obtain the activation combination from the lock I/O card. Thereafter, the program flow could return to start 380 at block 399.

With reference now to FIG. 3M, which illustrates an exemplary functional flowchart for the subroutine that may be used to dispatch a route from the route service selection menu 220. The illustrated subroutine starts at block 400. Thereafter, the operator is prompted to enter the route name, or other route identification and the ID for route service key 30 and/or the lock technician's ID that is dispatched in block 402. After entering this information, the operator typically will press a predetermined key or select an icon on the display, for example, F7. Thereafter, the operator would be prompted to indicate which, if any, of the subordinate or CLD locks are authorized to be opened for each supervisor lock in the route in block 404. The operator presses a predetermined key or select an icon on the display, for example, F10 key, and the program in block 406 obtains the combination for each lock in the route. The program may modify the combination provided, to embed in the combination for the supervisor lock, the subordinate or CLD locks authorized to be opened. Thereafter, the program flow moves to block 408, which returns the subroutine program flow back to start 400.

With reference now to FIG. 3N illustrating exemplary logic flow for the close route using key 224 or menu 226 subroutines. The close route subroutine is typically entered from the route service selection menu 220. When the subroutine is entered from block 224 of FIG. 3C, the subroutine may start at block 410. Thereafter, the operator could be prompted in block 412 to enter the route name or other route identifier and the ID of the route key 30 or service technician to close. The key 30, if used, could be inserted in the key reader 22. Thereafter, the operator may press a predetermined key or select an icon on the display, for example, the F10 key, indicating that the operator was ready for the program to continue to block 414 where the close results could be displayed. Thereafter, the program flow moves to decision 416 where the logic checks and verifies that all locks on the route were closed. If all locks on the route were closed in decision 416, the flow moves back to the start of the subroutine 410 at block 428. If all locks on the route were not indicated as closed, the program logic moves to block 424 where the operator could be prompted to enter the appropriate close seal for each open route call (lock).

If the subroutine was entered from block 226 of FIG. 3C, the program logic illustrated starts at block 420. Thereafter, the route name or route identification and the ID of the route key 30 or person used on the route to be closed, may be entered in block 422. After this data entry was complete, the operator could press a predetermined key or select an icon, for example, the F10 key, to indicate that the data entry was complete. Thereafter, the program flow may be to block 424 where the appropriate closed seal for each open route call could be entered by the operator. The operator may receive the closed seal by way of telephone or other communication means from the route service technician. After the appropriate closed seal is entered, the operator would press a predetermined key or select an icon, for example, the F10 key, and the program may display the results. Additionally, the display may include which subordinate or CLD locks 60 were authorized, which subordinate locks 60 locks were opened, and any bad or erroneous attempts to enter unauthorized subordinate locks 60. Thereafter, the flow may continue to block 428, which directs the program flow back to start block 420. By entering the appropriate closed seals for each open route call, the software could update the appropriate seed values if one-time combinations were utilized.

With reference now to FIG. 3O which illustrates an exemplary subroutine that may be employed to reassign a route from the ID of one route key 30 or service technician to another route key 30 or service technician. The reassign subroutine 228 begins in start block 430. The reassign a route subroutine 228 illustrated performs a similar function to the reassign a service call subroutine illustrated in FIG. 3J. After starting the reassign a route subroutine 228 from the route service selection menu 220 of FIG. 3C, the operator enters the route name or other route identification, current route key 30 or personal ID, and the new route key 30 or personal ID in block 432. Once the data entry was complete, the operator would press a key or select an icon or button, for example, the F7 key, or otherwise indicate that the data entry was complete. Thereafter, the program flow may be to block 434 where the operator could select which route calls to reassign. After the appropriate selections were made, the operator would press a key, typically the F10 key, or otherwise to indicate that the data entry was complete. Thereafter, the program obtains the new combinations. The modified combinations and subordinate locks authorized for each route call that was reassigned in block 436 may be displayed. Thereafter, the program flow moves to block 438, which returns the program back to the start block 430. As discussed above to return to the route service selection menu, the operator could press a predetermined key or select an icon/button on the screen, for example, the escape key.

With reference now to FIG. 3P which illustrates an exemplary shelve lock subroutine 282 which may be accessed from the special supervisor menu 280 shown in FIG. 3F. The subroutine illustrated starts at block 440. Thereafter, the operator may be prompted at block 442 to enter the lock name, mode, and serial number to shelve. Thereafter, in block 444, the operator enters which subordinate locks, if any, would also be shelved on the service call. After completing the data entry, the operator may press a key or select an icon or button on the screen, for example, the F9 key, and the program flow could move to decision block 446 where the program determines if the lock information entered was valid. If the lock information entered was invalid, an error screen may be displayed in block 448. Thereafter, the program flow may move to block 459, which would return the program to start 440. When the lock information is valid, the program flow typically moves to block 450 where the lock would be accepted for shelving. Thereafter, the operator may be queried to see if more locks were desired to be shelved in decision 452. If more locks are to be shelved on this service call, the flow may return to block 442 for entry of additional lock data. When no further locks are desired to be shelved, the operator typically presses a key or selects an icon or button on the screen, for example, the F10 key and the program flow moves to block 454. In block 454 the operator enters ID of the key 30 or service technician employed to shelve the locks. After completing this data entry, the operator presses a key or selects an icon or button on the display, for example, the F10 key, indicating to the computer that that entry was complete. The program flow continues to block 456 which provides the operator the ability to specify which file to store the shelving combinations. Block 456 is optional in that it is not required to store the shelving combinations in a computer file. Thereafter, the program flow may be to block 458, by pressing a predetermined key or selecting an icon or button on the display, for example, the F10 key, where the program obtains and displays the shelving combination modified for shelving subordinate locks, if desired. The displayed shelving combination may be a modified shelving combination permitting the operator to decide which subordinate locks to shelve. Additionally, an error screen may be displayed if there were any problems. Thereafter, the flow moves to block 459, which returns the subroutine back to the start 440. As in prior subroutines, to exit the subroutine and return to the prior menu, in this case the special supervisor selection menu 280, the operator would typically press a predetermined key or select an icon/button on the display, for example, the escape key.

With reference now to FIG. 3Q which provides an exemplary flowchart for a subroutine that may be utilized to replace a lock using a key 30. The illustrated replace ATM/locks using key 30 subroutine 288 may be accessed from the special supervisor menu selection 280 of FIG. 3F. This subroutine permits locks to be replaced as needed. Using this subroutine either the supervisor lock or one or more of the subordinate locks could be replaced. The illustrated replace ATM/locks using key subroutine 288 begins with block 460. Thereafter, the program flow moves to block 462 where the name or other identification and mode of the lock to be replaced could be entered by the operator. Once the data entry was complete, the operator presses a predetermined key or selects an icon/button/menu item on the display, for example, the F7 key, and the program flow continues to decision block 464 where the program checks to see if the lock was open or shelved. If the lock was opened or shelved, an error screen may be displayed in block 466 and the program flow could return to block 462. When the lock is indicated as closed and active, the program flow may be to block 468 where the lock serial number, customer number, description and number of subordinate locks would be displayed. Thereafter, the operator could be prompted in block 470 to enter the replacement serial number and subordinate/CLD lock authorizations, if any, for the service call. After entering this data, the operator may press a predetermined key or selects an icon/button/menu item on the display, for example, the F9 key, or other designated key to indicate the data entry was complete. Thereafter, the program flow may be to decision block 472 where the program determines if the new lock information entered was valid. If there was an error in the lock information, the program flow may move to block 474 which may display an error screen and the program flow returns to block 462 for restarting the data entry process. When the lock information entered was valid, the program flow moves to block 476 where the lock would be accepted for replacement. Thereafter, the operator could be prompted in decision block 478 to see if he wished to replace more locks. If the operator desired to replace more locks, the program flow returns to the data entry block 462. When the operator entered the data for all the locks that were going to be replaced, the operator may press a designated key, or select an icon/button/menu item, for example, the F10 key, and the program flow typically moves to block 480 where the operator enters the ID of the key 30 or person used to replace the locks. Once this data entry was complete, the operator may indicate this by pressing a predetermined key or selecting an icon/button/menu item of the display, for example, the F10 key, and the program flow may move to block 482. Block 482 is an optional block and may be skipped if desired. In block 482 the operator specifies the file storing the replacement combinations. Thereafter, the program flow moves to block 484 where the software obtains and displays the replacement combinations and/or errors if there were problems, for example, if the key 30 or technician ID already had a lock open. After displaying the replacement combination, the subroutine in block 486 could return to start 460 of the subroutine. When the operator desired to use other functions in the software, he/she could press a predetermined key, icon, button, or menu item, for example, the escape key, which returns the operator to the special supervisor selection menu 280 or to any other point selected by the programmer.

FIG. 3R illustrates an exemplary logic flowchart for a subroutine that may be utilized to change a user's information. This subroutine is old in the art and is not discussed in detail, but is included for a complete disclosure.

In order to maintain compatibility with existing locks and to minimize the changes to the firmware of the supervisor lock, the key and combination control device 20 may access a lock I/O card that generates a regular one-time use combination. This combination, together with the key 30, could be utilized to open the supervisor lock. For each subordinate lock that is authorized to be opened, the software may adjust one or more digits in the regular combination to form the dispatch combination. This digit modification could be done in accordance with a preprogrammed algorithm programmed both in the key and combination control device 20, together with the firmware of the supervisor lock 40. As a result, there may be a single, combination that provides access to the supervisor lock 40 alone and the supervisor lock 40 and any combination of subordinate locks 60. For example, if there are four subordinate locks controlled by a single supervisor lock 40, the key and combination control device 20 could define 32 combinations for each opening of the supervisor lock and any combination of associated subordinate locks. These 32 combinations include 16 duress combinations.

When the service person entered the dispatch combination in the supervisor lock, the supervisor lock computes and/or obtains from memory a regular authorized combination and then determines the differences between the combination entered and the authorized combination. These differences could determine if there is a duress situation or which combination of subordinate locks the key holder was permitted access to. This approach can also be utilized when the senior lock is in the dual access mode, which may require two combinations and two keys to access the supervisor lock. Additionally, both electronic keys may be utilized to access the subordinate locks.

Preferably, after each subordinate lock was closed, the service technician would obtain a closed seal so that the seed values and audit records at the supervisor lock could be updated. After closing the supervisor lock with all subordinate locks that were opened having provided a closed seal, the supervisor lock could also provide a closed seal to the electronic key 30 and/or a visual closed seal to the lock operator. This closed seal would be a modification of the base closed seal to reflect the audit data from the subordinate locks. Preferably, the closed seal would indicate which subordinate locks were attempted, if any, or which combination of subordinate locks were attempted. Close seals may not be employed in some embodiments of the supervisor-subordinate lock system.

Electronic Key

The key 30 is preferred to be a touch memory device produced by Dallas semiconductor. This key 30 typically contains a small battery maintained RAM type memory. Alternatively, key 30 may be any other type of portable data storage device. For example, magnetic strip, smart card, magneto-optical, or other device that could reliably contain the necessary data and permit the data to be transferred and updated as required by the supervisor lock 40 and the subordinate lock 60.

Supervisor Lock

The preferred supervisor lock 40 is a modified Cencon self-powered electronic lock manufactured by Mas-Hamilton Group. Details of the Cencon System 2000® lock are disclosed in U.S. Pat. Nos. 5,410,301; 5,451,934; 5,488,358; 5,488,660; and 5,709,114 and in U.S. patent application Ser. Nos. 08/906,535; 08/558843; 08/704,109. Alternatively, any other electronic lock that is capable of being programmed to control the operation of one or more subordinate locks could be used. Basically, the electronic supervisor lock after being opened and/or operated by an authorized combination and/or key 30 provides the user the ability to open any authorized subordinate lock. Preferably, the supervisor lock 40 would not be physically or electronically connected to the subordinate locks 60. The only modification to the Cencon lock is the modification to the firmware stored in the locks memory. Exemplary flowcharts for the control logic provided by the modified firmware is shown in FIGS. 4A–4LL.

The illustrated logic provides the lock the ability to determine which, if any, of the subordinate locks the key holder is authorized to open. The access code(s), if any, may be transmitted to the key 30 when key 30 is touched to key port 50 of the supervisor lock 40. Alternatively, key 30 may be presented to supervisor lock 40 in any manner consistent with the type of key 30 utilized by the supervisor and subordinate lock system 10. For example; key 30 may be inserted into a slot in supervisor lock 40 or key 30 may be placed close enough to the supervisor lock 40 so that the key 30 and the supervisor lock 40 may read/write data to key 30 using sonic, infrared, radio, microwave or other communications medium. It is preferred that the supervisor lock 40 provide the power for the communication, so that the key 30 has limited power requirements. After the supervisor lock 40 has provided the access code to key 30, the key holder my now open any authorized subordinate lock 60.

The software illustrated by the functional flow charts shown in FIGS. 4A–4LL was written in the assembly language for the 8051 microprocessor. Thus, this program was designed to run on 8051 microprocessor. It is expected that it is within the ordinary skill in the art of computer programming for a computer programmer to utilize the flowcharts provided in writing a program in any other programming language for use on any other microprocessor or on a microprocessor running under one or more operating systems.

Figures 1, 4A:
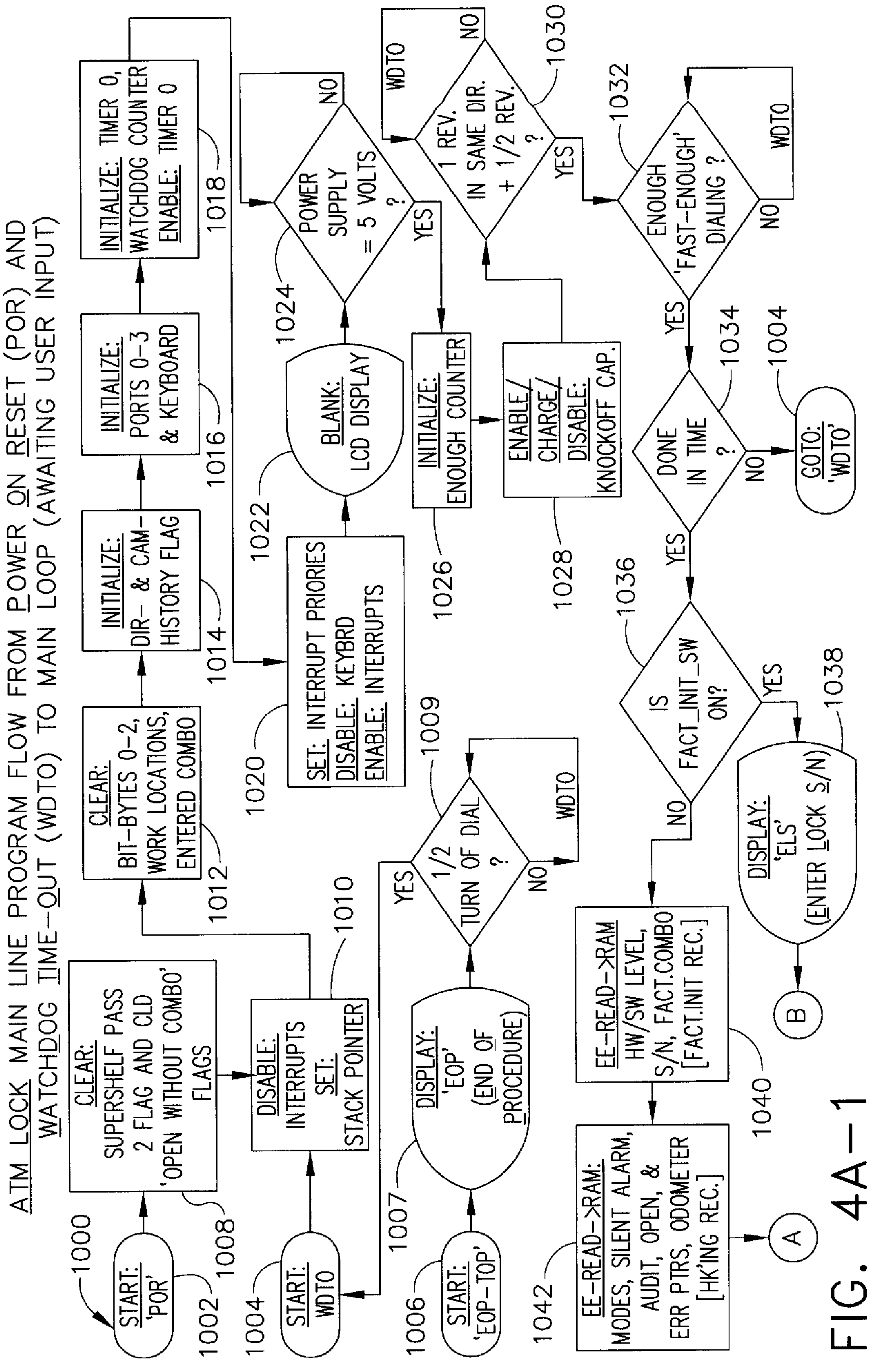
Figures 2, 4A:
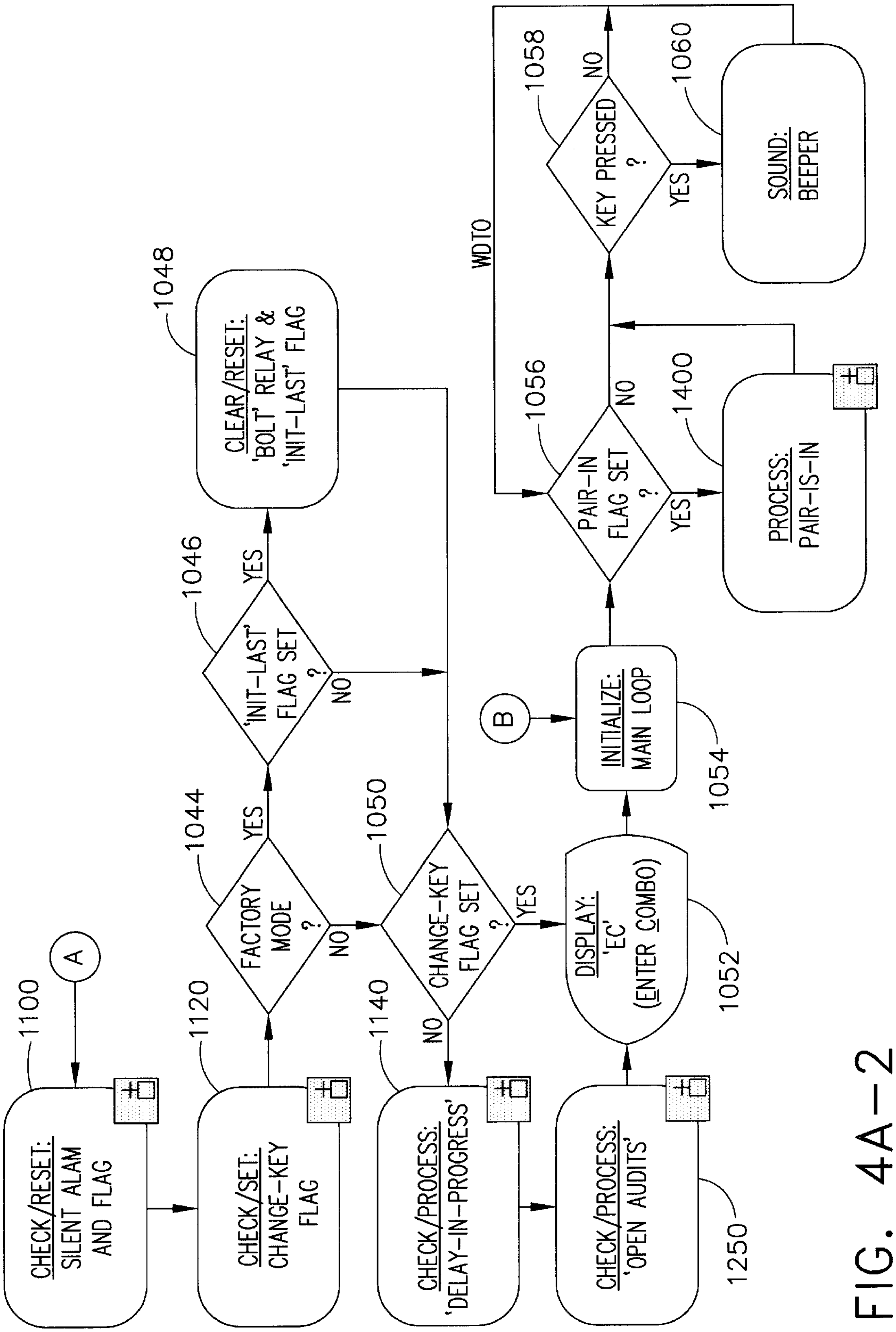

FIG. 4A is made up of FIG. 4A-1 and FIG. 4A-2 that join along a common boarder. The supervisor lock mainline program 1000 shown begins at power on reset start terminator 1002, terminator 1004, which provides the restart point after the watchdog timer times out, or at terminator 1006 which provides the end of procedure top of program restart point. Typically, an operator operating the supervisor lock 40 enters the mainline program at terminator 1002 with a power on reset. Thereafter, the program flow moves through blocks 1008 through 1020, which will initialize the lock. Next, the lock display may be blanked in block 1022. Then in decision block 1024, the power supply could be checked to see if the voltage was greater than or equal to a predetermined value, for example, 5 volts. Here the program may loop or wait until the power supply has reached the predetermined amount. Thereafter the program flow moves to block 1026 and initializes a counter.

In block 1028 the knock off capacitor may be enabled, charged, and then disabled after the charging cycle of this capacitor is complete. This block is optional and may not be utilized in a supervisory lock that did not use a solenoid to condition the mechanical portions of the lock for opening. Next, if required for security reasons and to top off the power supply capacitor, the program flow may move to decision block 130, which loops the program until the dial has been turned a predetermined amount, for example, one and a half revolutions. This dial rotation insures that the bolt is fully extended prior to continuing the lock start up procedure. Thereafter, the program flow moves to decision block 1032, which verifies that the dial was rotated fast enough to top off the capacitor providing power supply. As in decision block 1030, in decision block 1032 the program may loop until the dial is rotated fast enough. Thereafter, the program may verify that the above steps were done in less then a specific amount of time. In the event that the time limit was exceeded the block could restart at the watch dog time out start at terminator 1004.

Next, the program flow may continue to decision block 1036, which verifies that the lock has been initialized at the factory. This block is also optional, but provides for easier factory initialization and set up. If the factory initialization switch is on in decision block 1036 the program flow may then display ELS or any other indicator which would indicate that the factory initialization switch was on in block 1038. When the factory initialization switch is off the program flow may continue to blocks 1040 and 1042 where data may be read from memory. Thereafter in the preferred embodiment, the program flow moves to the check status silent alarm subroutine 1100 which checks and resets the silent alarm. After completing this subroutine, the program flow may move to the check status of change key subroutine 1120. This subroutine provides debounce by setting a flag and allows the user to bypass setting the change key flag if the change key is locked in side of the lock.

After returning from this subroutine, if used, the program flow moves to decision block 1044, which checks if the lock is in the factory mode. The lock will be in the factory mode until one or more user modes are initialized. If the lock is in the factory mode, then the program flow moves to decision block 1046 which checks for the initial last flag set. This flag is set during the factory initialization process. When this flag is set the program flow moves to block 1048 which clears and resets the bolt relay and initial last flag. Thereafter the program flow from blocks 1044, 1046 and 1048 moves to decision block 1050 which checks the change key flag. When the change key is absent the typical program may call the check delay and progress subroutine 1140, which checks to see if there is a delay in progress. Thereafter, the program flow may move to the check for an unresolved open record with subroutine 1250. This subroutine verifies or checks to see if there is an unresolved open audit record for the lock. This subroutine may be called if the electronic lock was maintaining audit records on the identification of the electronic/user that opened and/or closed the lock.

Thereafter the program flow moves from either decision block 1050 or the check for unresolved open records subroutine 1250 to block 1052 where the display may indicate EC or some other indication that it was time for the user to enter a combination. The program flow from either display block 1052 or display block 1038 could be to block 1054 where the main loop is initialized. The program flow then moves to decision block 1056, which checks to see if a pair of digits and/or symbols has been entered. If the pairs in flag has not been set, then the program flow moves to decision block 1058 to check to see if a key has been pressed. When a key is pressed a beep may be sounded to provide an audible indication to the user that his key press has been accepted or has been entered. Thereafter the program flow from either decision block 1058 or block 1060 returns to check the pair in flag in decision block 1056.

When a pair of digits or keys have been entered the program flow calls the pair is in subroutine 1400. This subroutine processes the data entered by the operator. The only change to the logic flow chart shown in FIG. 4A that is a result of modifying the lock firmware to become a supervisor lock is the addition in block 1008 of clearing the CLD open without combo flags. The remaining portions of FIG. 4A illustrate program logic that is known in the art.

Figure 4B:
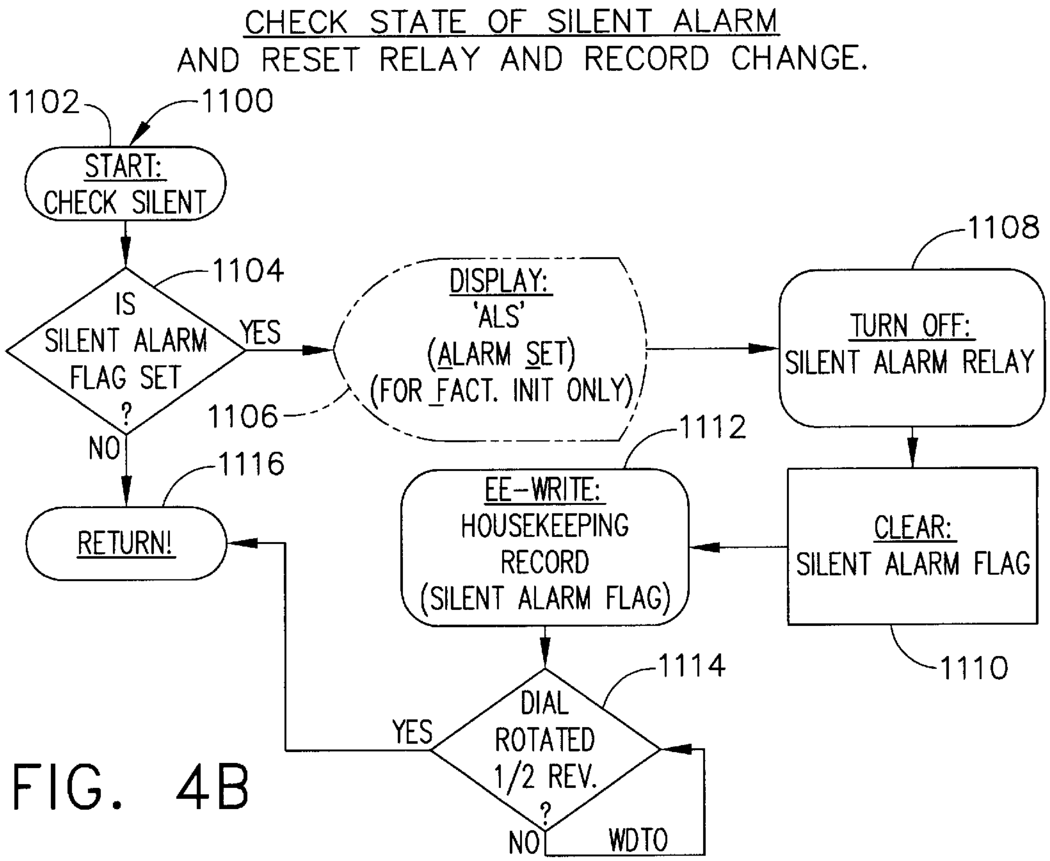

FIG. 4B illustrates one embodiment of the program logic that may be used by the check state of silent alarm subroutine 1100. The subroutine illustrated begins at terminator 1102 and continues through terminator 1116 where the subroutine would return to the mainline program. Basically, this subroutine checks the state of the silent alarm and turns the alarm off if set as well as recording the change in the state of the alarm. This subroutine is not new in the art and will not be discussed further.

Figure 4C:
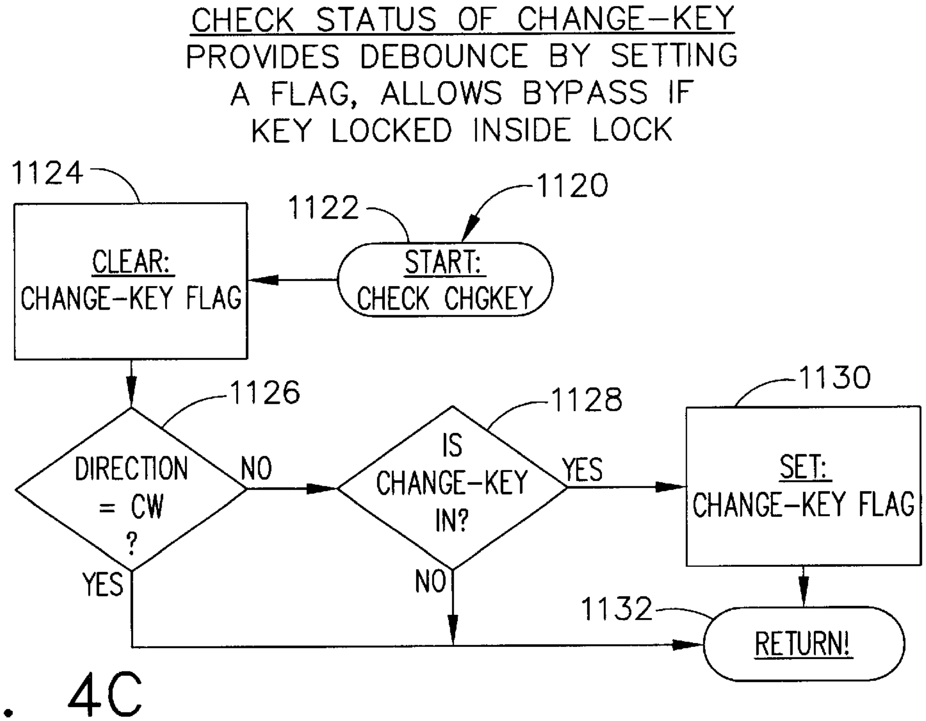

FIG. 4C illustrates a sample logic flow chart for the check status of change key subroutine 1120. This subroutine begins at the start terminator 1122 and continues to the return terminator 1132. Like the check state of silent alarm subroutine 1100, the check status of change key subroutine 1120 is not new in the art and will not be discussed further.

Figures 1, 4D:
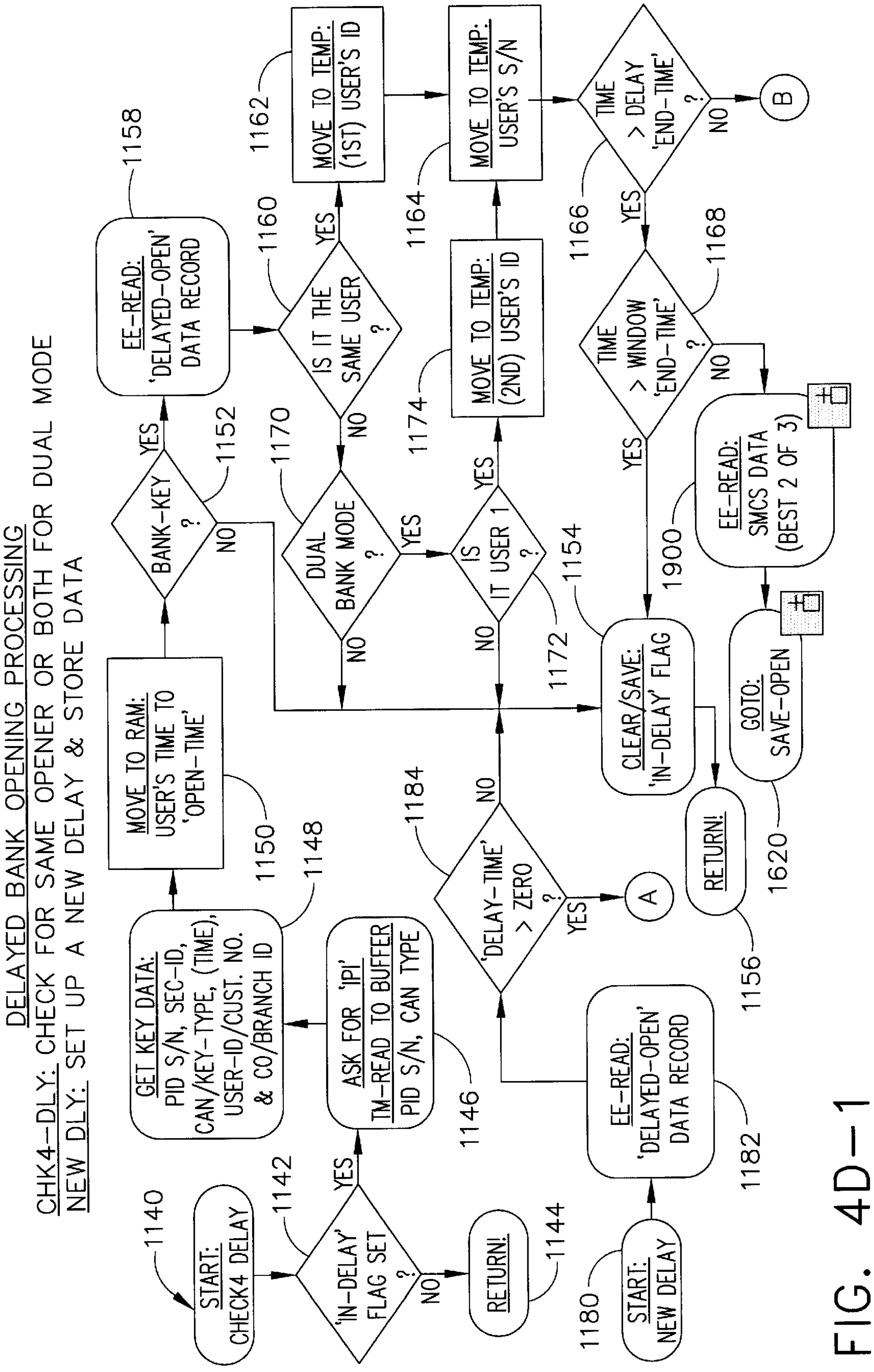
Figures 2, 4D:
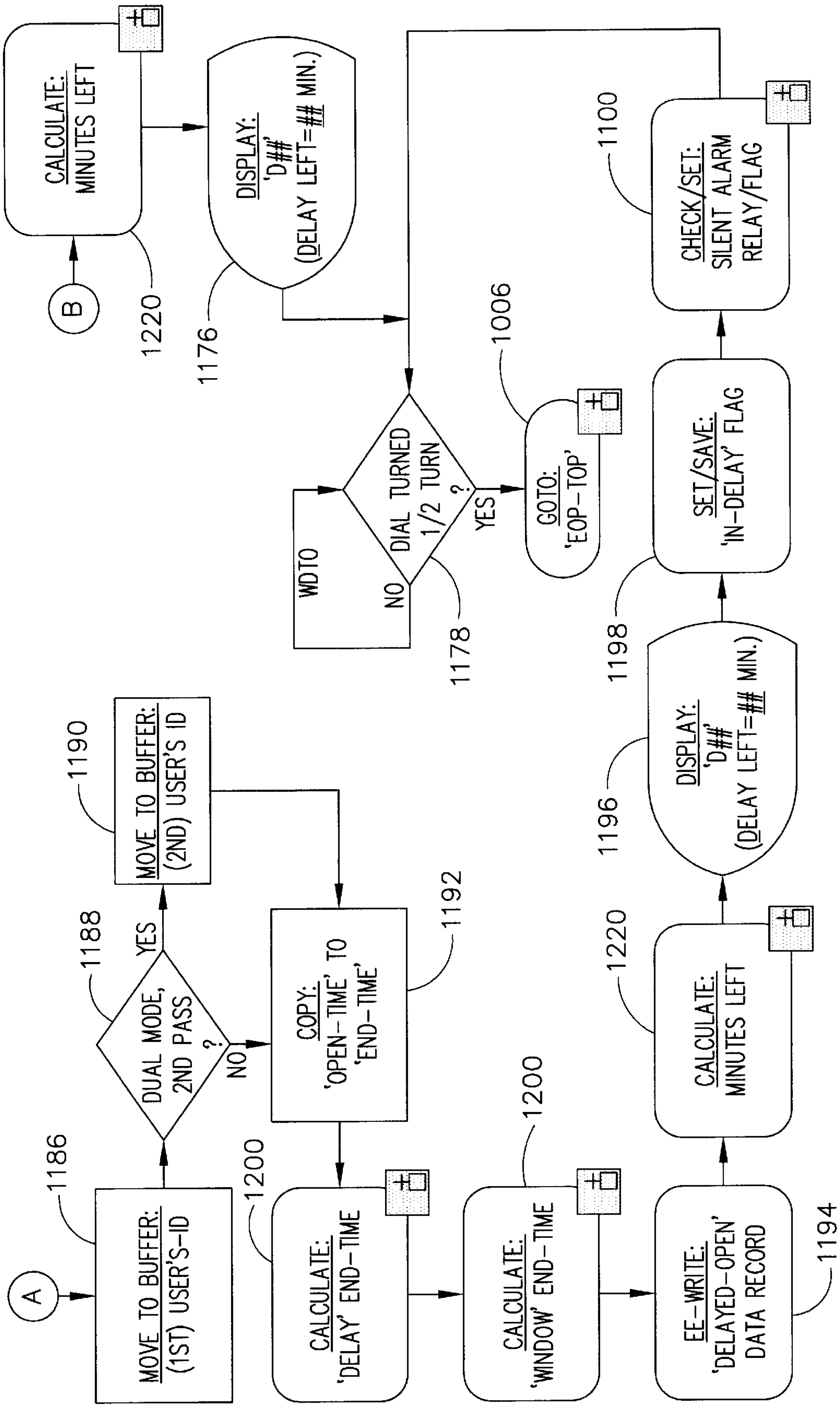

FIG. 4D illustrates the exemplary check delayed bank opening processing subroutine 1140 and the exemplary start new delay bank opening processing subroutine 1180. The check for delayed bank opening subroutine 1140 checks to see if there is a delay in progress for a particular bank key user. The start new delay subroutine 1180 starts a new time delay for a particular user. The basic idea implemented by both of these subroutines is that in some circumstances it may be desirable to delay the opening of a bank vault or other secured container for a period of time after the combination has been entered and/or electronic key presented for the first time until a preset time thereafter where the user would have to re-present an electronic key and/or re-enter the appropriate combination for entry into the supervisor lock 40. The check for delay subroutine 1140 checks to see if this delay is in progress for the electronic key presented. Alternatively, this subroutine may check for a delay in progress for a user ID entered. Then the program flow checks to see if the time delay has expired and checks to see if the user is within the time window specified after the delay in which the lock operator may enter the lock without initiating a new time delay. If the delayed time has ended in decision block 1166 and the current time is less than the window end time in decision block 1168, the delay flag may be cleared as shown in block 1154 for that particular user and the subroutine returns to the mainline program.

When a new delay is required/desired, the new delay bank opening subroutine 1180 may be called and this subroutine reads the delayed open data record in block 1182 and verifies that there was a delay time in that record in decision block 1184. If there was no delay time in the data record the program flow moves to block 1154 and clears the end delay flag and the program returns. When the delay time is greater than zero, the program through blocks 1186 through 1192 and would gather the appropriate data that may be used by the calculate end time subroutine 1200 to calculate the delay end time and the window end time. Thereafter, this data would be written to the EEPROM in block 1194. Typically, the program calculates the minutes left using the calculate minutes left subroutine 1220. After the minutes left calculation is completed, typically the delay time left may be displayed in order to assist the operator in bock 1196 and the in delay flag would be set in block 1198. Thereafter, the program could also check the status of the silent alarm flag using the check silent alarm subroutine 1100. Additionally, the program may check for a dial turn in decision block 1178 before returning the program flow to the end of procedure top terminator 1006.

To check the status of a delay using the check for delay subroutine 1140 typically the program will first check to see if the end delay flag is set in decision block 1142. Thereafter, in blocks 1146, 1148 and 1150, the program will obtain the required data from the user and/or the user's electronic key. Thereafter, the lock may check to see if the electronic key or the user was a bank user in decision block 1152. If the user and/or key was not a bank key, the program flow may continue to block 1154, clearing the end delay flag and returning the program to the main line. When the user and/or electronic key reflected bank type access the program may read the delayed open data record and then using the logic flow of blocks 1160 through 1172 set the program up to check the appropriate delay end time in decision block 1166 and the window end time in decision block 1168. The delayed opening subroutines discussed above may be applied to any class or even all users.

Figure 4E:
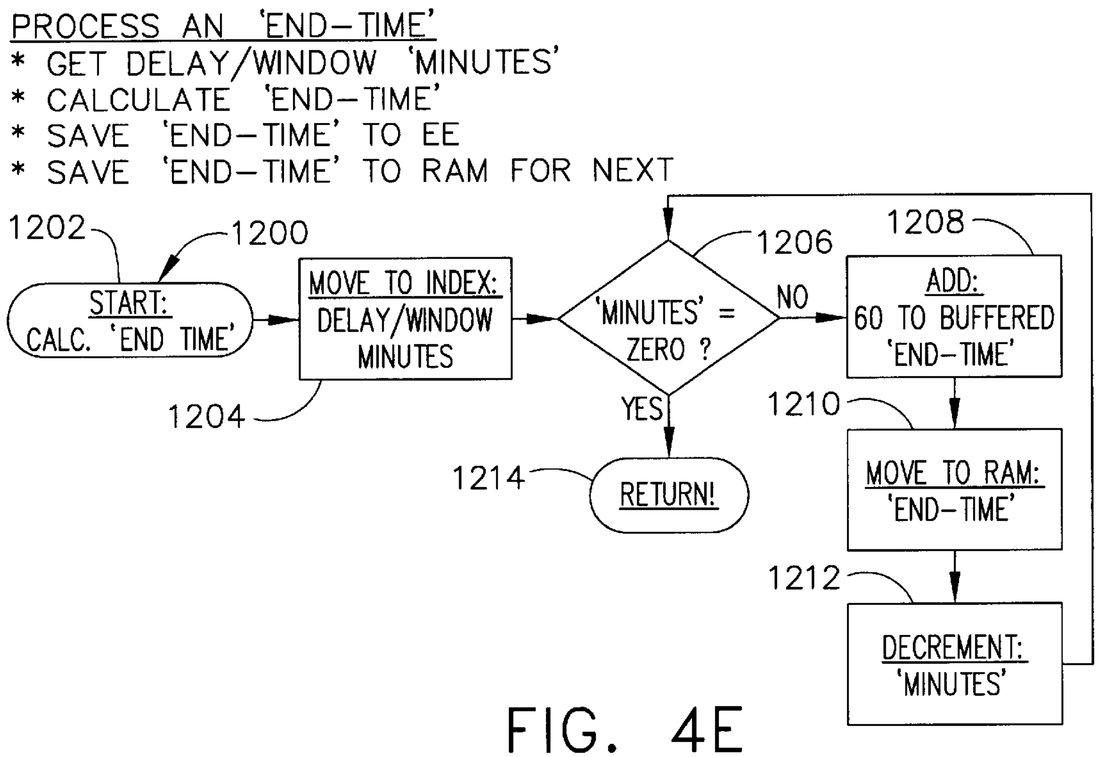

FIG. 4E illustrates an exemplary process end time subroutine 1200 that may be called from the subroutines that deal with delayed bank opening processing shown in FIG. 4D. The illustrated process end time subroutine 1200 calculates and determines the number of minutes left in the delay or window time. The program flow illustrated in FIG. 4E is relatively straightforward and is expected to enable the average programmer to implement this subroutine without further discussion.

Figure 4F:
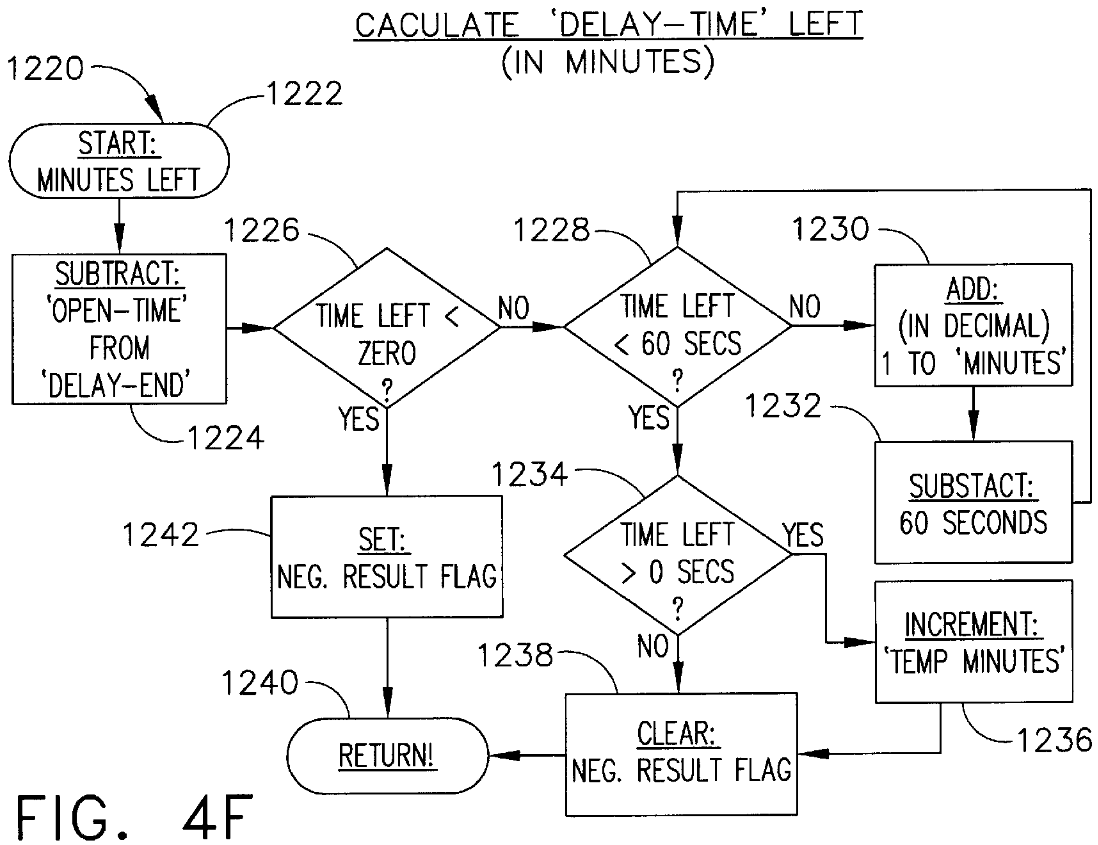

The exemplary minutes left subroutine 1220 illustrated in FIG. 4F uses the end time calculated using the process end time subroutine 1200 and the current time to calculate the minutes left in either the window or delay time. Since the electronic key employed in the preferred embodiment typically keeps time in seconds vice minutes this lock will subtract the delay end time from the open time in block 1224 and determine if the time left is less than zero in decision block 1226. If the time left is less than zero, a negative result flag would be set in block 1242. When the time left was greater than or equal to zero, the logic of blocks 1228, 1230 and 1232 convert seconds into whole minutes. Thereafter, the program flow clears the negative result flag in block 1238. Thereafter the program flow from either block 1242 or block 1238 moves to the return terminator 1240 which returns the program flow to the portion of the program that called the minutes left subroutine 1220.

Figures 1, 4G:
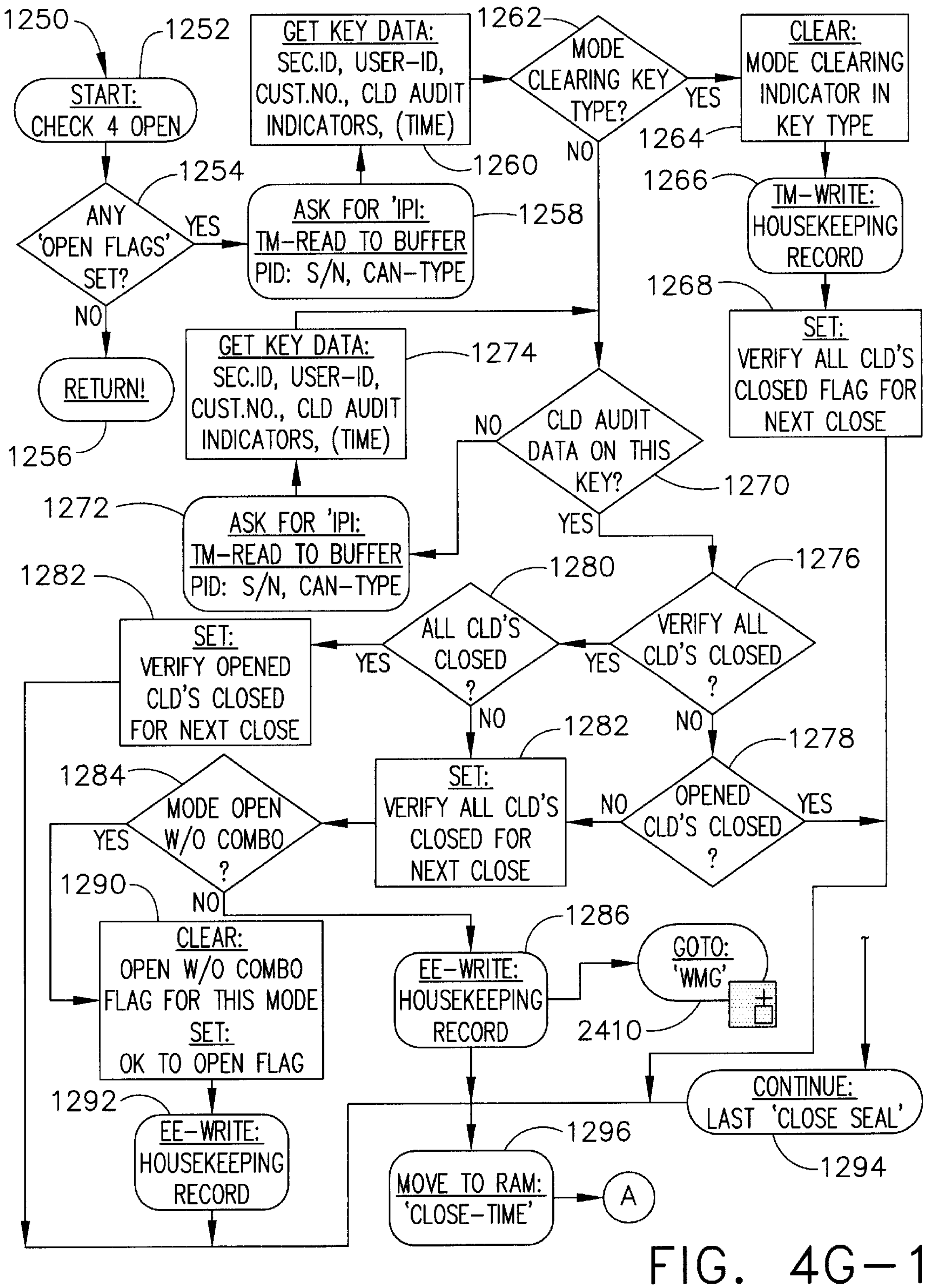
Figures 2, 4G:
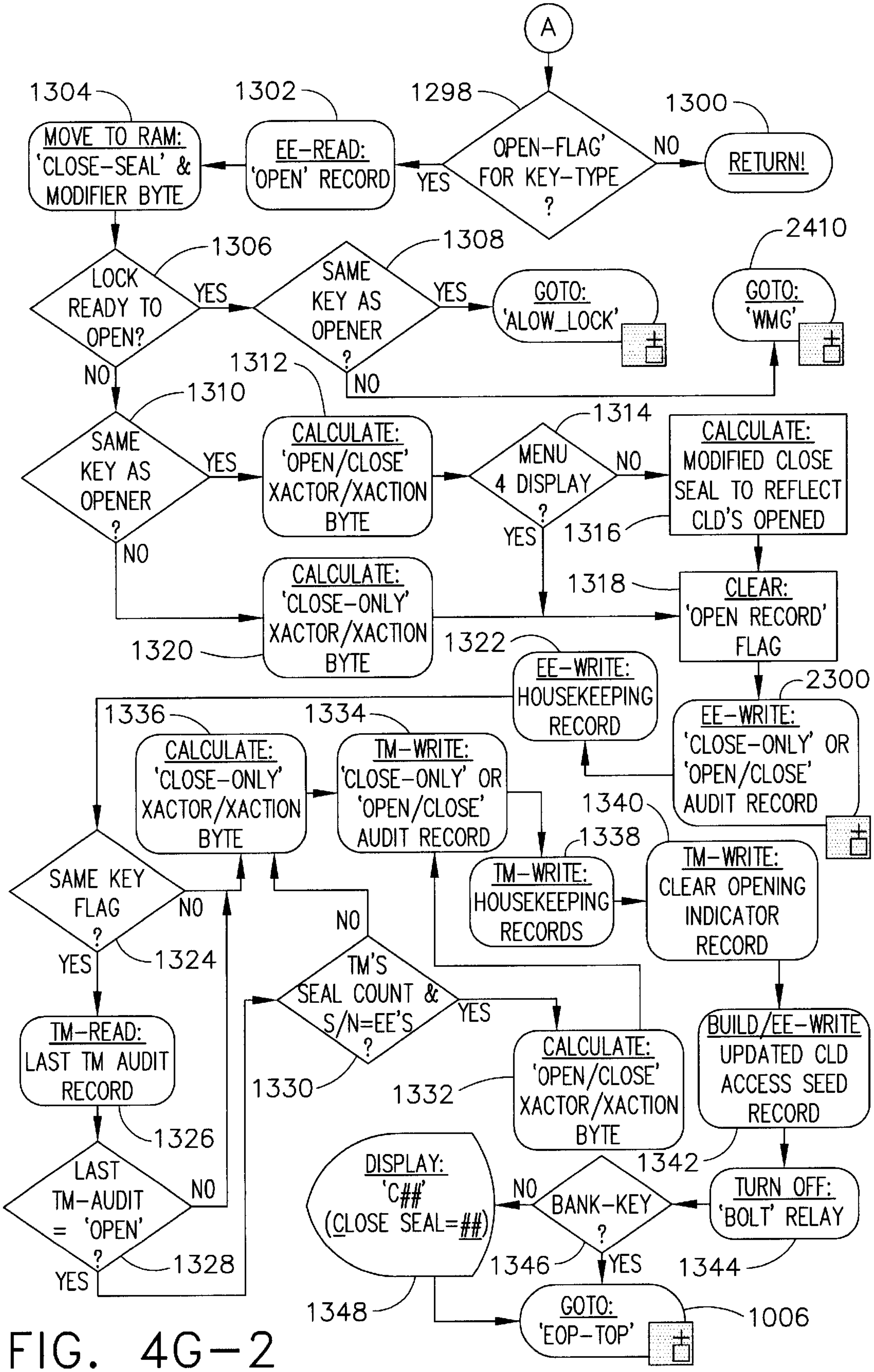

FIG. 4G illustrates an exemplary check for unresolved open records subroutine 1250. Basically this subroutine checks to see if a record for the particular electronic key type, user ID, and/or combination type is still open. An open record may indicate that the lock was not closed. Thereafter, the lock may display a closed seal for FLM and route key/combinations and thereafter perform the appropriate housekeeping tasks. This optional subroutine is typically used when audit records are being maintained on the date and time the lock was opened and identity of the person who opened the lock together with the date and time and identify of the person closing the lock. If this subroutine is not used and audit records are not maintained, then a separate subroutine may need to be developed that would update the seed values for the subordinate locks, if one-time combinations were utilized for the subordinate locks.

The check for unresolved open record subroutine 1250 illustrated begins at start terminator 1252. Thereafter, the subroutine checks to see if any open flags are set in decision block 1254. If no open flags are set, then the subroutine returns to the mainline program at return terminator 1256. When one or more open flags are set in decision block 1254, the subroutine in blocks 1258 and 1260 will ask for and read the data from an electronic key or from data entered by the operator. Thereafter, the subroutine may check in decision block 1262 if the key or combination/data entered indicate that the user desires to and is authorized to change the mode of lock. The preferred embodiment employs electronic keys for carrying all the data except for the access combination. If a mode change is authorized, the program flow would move to block 1264 where the mode clearing indicator would be cleared for that key type. Thereafter, in block 1266 a housekeeping record would be written to the electronic key followed in block 1268 by setting the verify all subordinate locks closed flag for the next close.

When the electronic key being used or other indicator indicates that the mode of the lock is not being changed, then the program flow typically checks for subordinate lock audit data in decision block 1270. The program flow obtains the audit data in blocks 1272 and 1274 if the data was not initially read. Alternatively, the program could request the appropriate audit data to be entered by the user using the keypad. Once the appropriate audit data has been obtained by the subroutine 1250, the program flow may move to decision block 1276 which checks the verify all subordinate locks closed flag. This flag may be set when the user inadvertently fails to obtain a closed seal from one or more of the subordinate locks and is permitted to re-enter the supervisor lock without a combination or using the same combination as was used to enter the lock the first time in order to obtain the proper close seal(s). However, for added security reasons, it is preferred that in the event a user is required to re-enter and obtain a closed seal from the subordinate lock that was originally not obtained that the operator be required to obtain a closed seal from each of the subordinate locks to ensure that all subordinate locks are closed.

In the typical scenario, when the operator has done his job properly, the program flow moves to block 1278 which verifies that the subordinate locks that were opened have audit records indicating that they were properly closed. If all subordinate locks that were opened were not indicated as being closed, then the verify all subordinate locks closed flag would be set in block 1282. When the user must verify in block 1276 that all subordinate locks were closed, the program flow moves to decision block 1280 which would verify that all subordinate locks were indicated as being closed. When all the subordinate locks were indicated as being closed, the flag would be changed to indicate that only the opened subordinate locks need to be verified on the next close in block 1282. If all subordinate locks were not indicated as being properly closed in decision block 1280, the program flow would move to block 1282 discussed above.

Thereafter, the program flow from block 1282 moves to blocks 1284, 1286, 1290 and 1292 which are optional blocks and could be utilized if the lock made provision to open the lock without a combination or with the old combination. Thereafter, the program flow from blocks 1278, 1292, 1286, continue last close seal terminator 1294, and block 1268 moves to block 1296 where the close time may be placed in memory. The remaining portions of this subroutine from block 1296 on are similar to those used in prior art subroutines used to check for an unresolved open record. The modifications are shown in block 1316 and block 1342. Block 1316 calculates a modified close seal to reflect the actual subordinate locks opened and to indicate if the operator has attempted to open any unauthorized subordinate locks. This modified close seal may be written to the audit records using the audit record subroutine 2300 and to the touch memory key or the electronic key audit record in block 1334, if an electronic key is utilized. Also, the updated subordinate lock access seed value or seed record may require updating in the memory as shown in block 1342. Block 1342 may be required if the subordinate locks were using a one-time combination for access. The remaining portions of FIG. 4G are expected to be obvious to a computer programmer of ordinary skill in the art since the remaining portions of the subroutine have been utilized in previous locks.

Figure 4H:
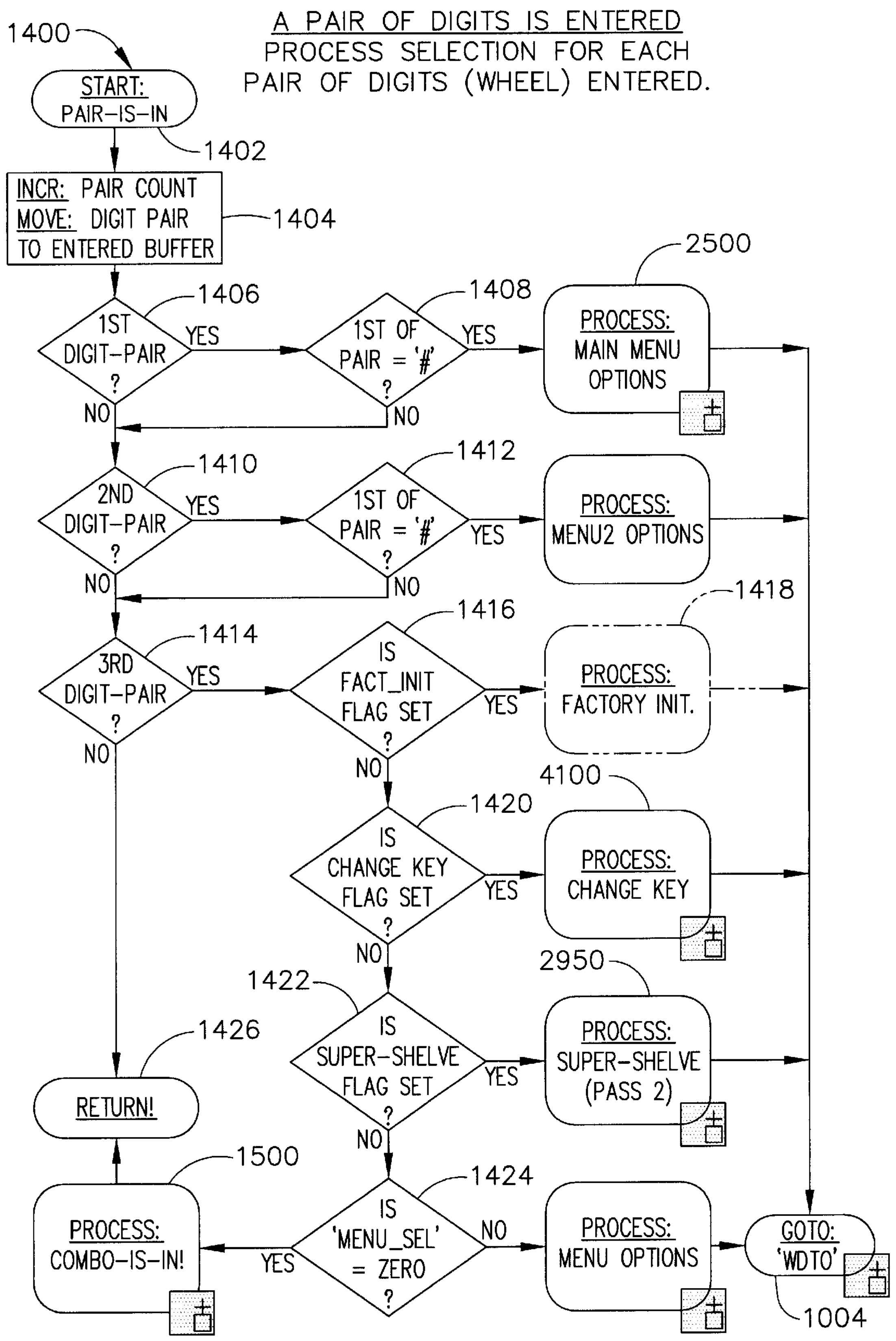

FIG. 4H illustrates the program logic that may be used in the pairs in subroutine 1400. This subroutine is not new in the art and is expected that a programmer of ordinary skill in the art could build/write the subroutine based on the logic flow chart shown. Thus, further description is not required.

Figures 1, 4I:
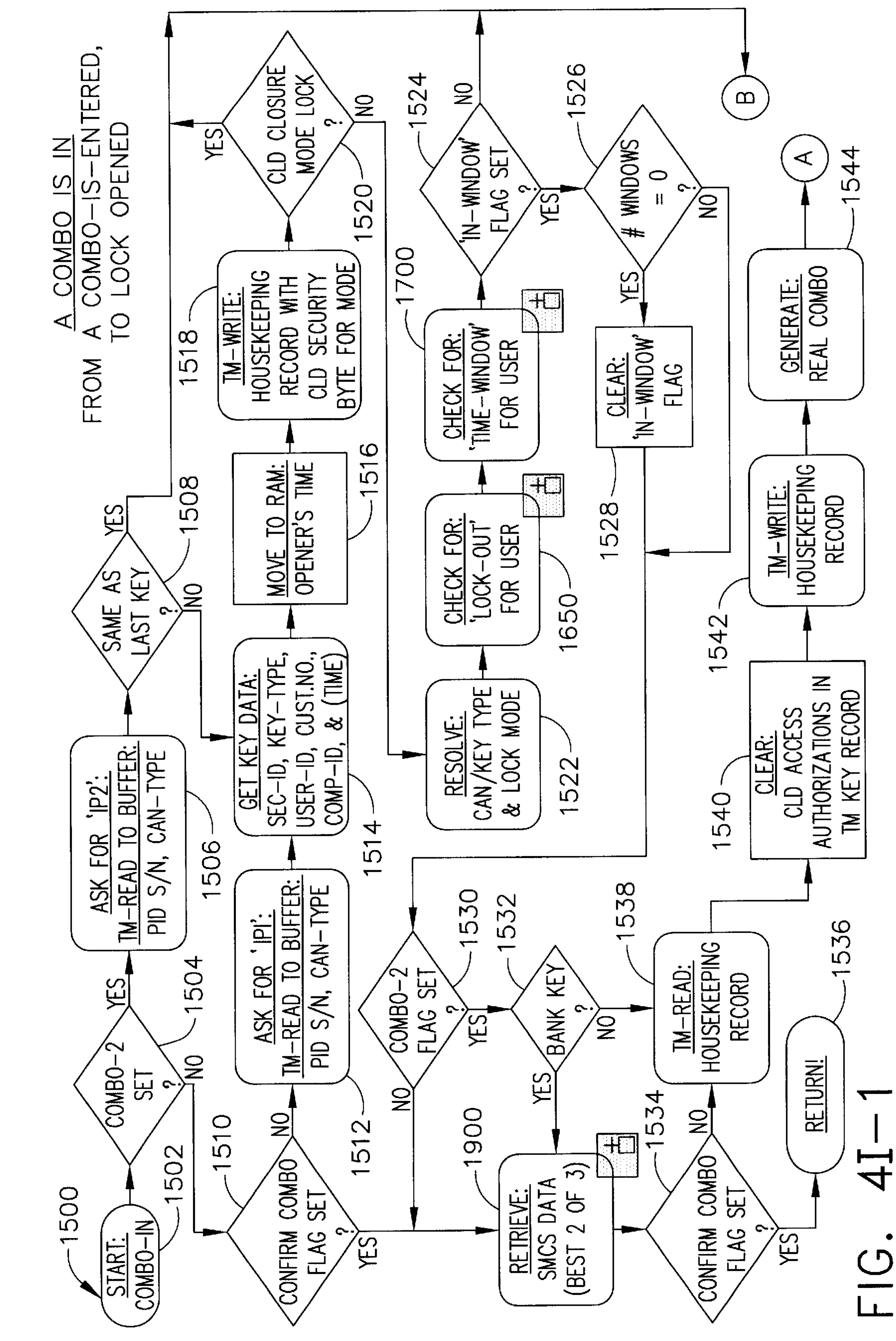
Figures 2, 4I:
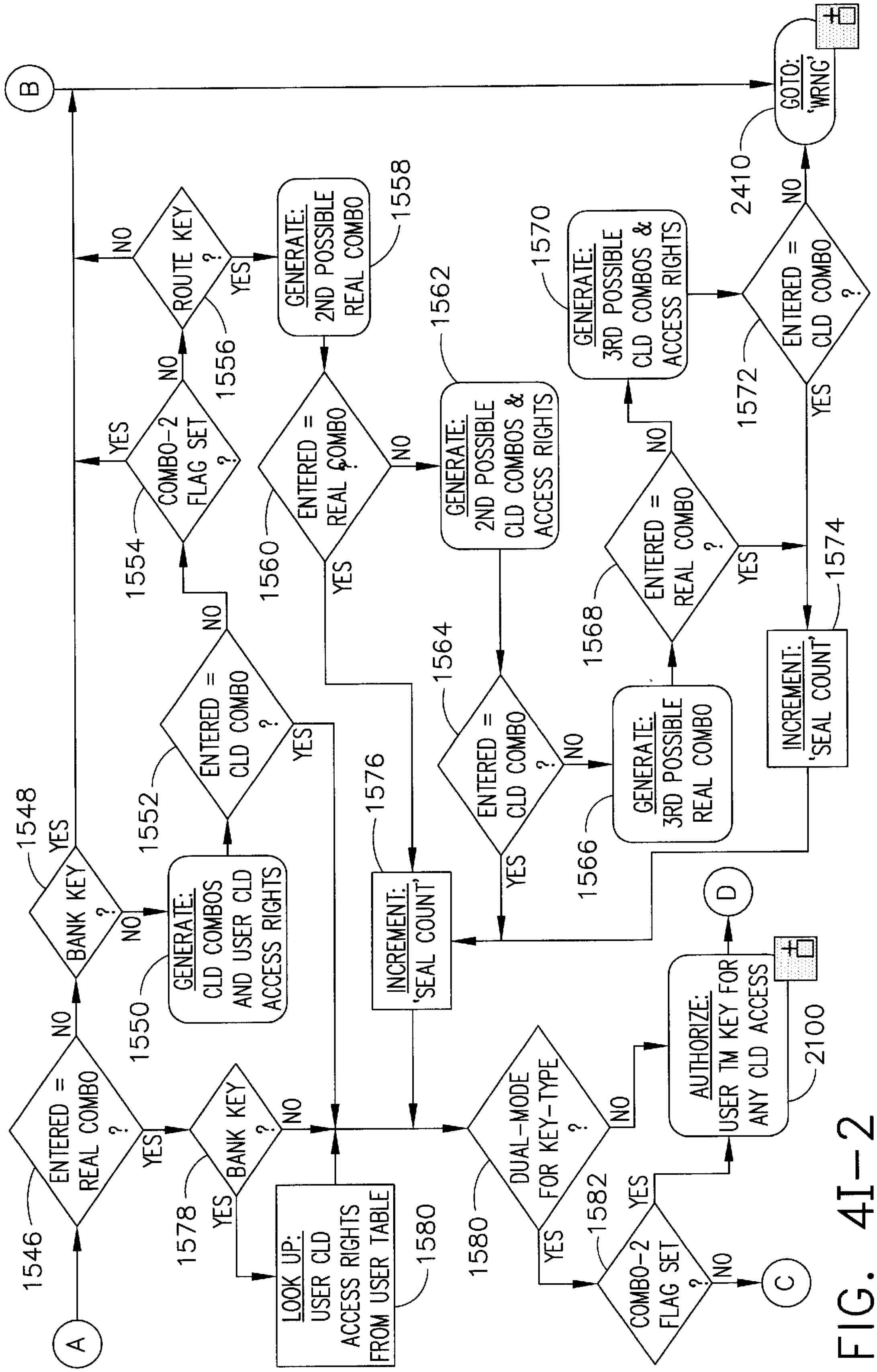
Figures 3, 4I:
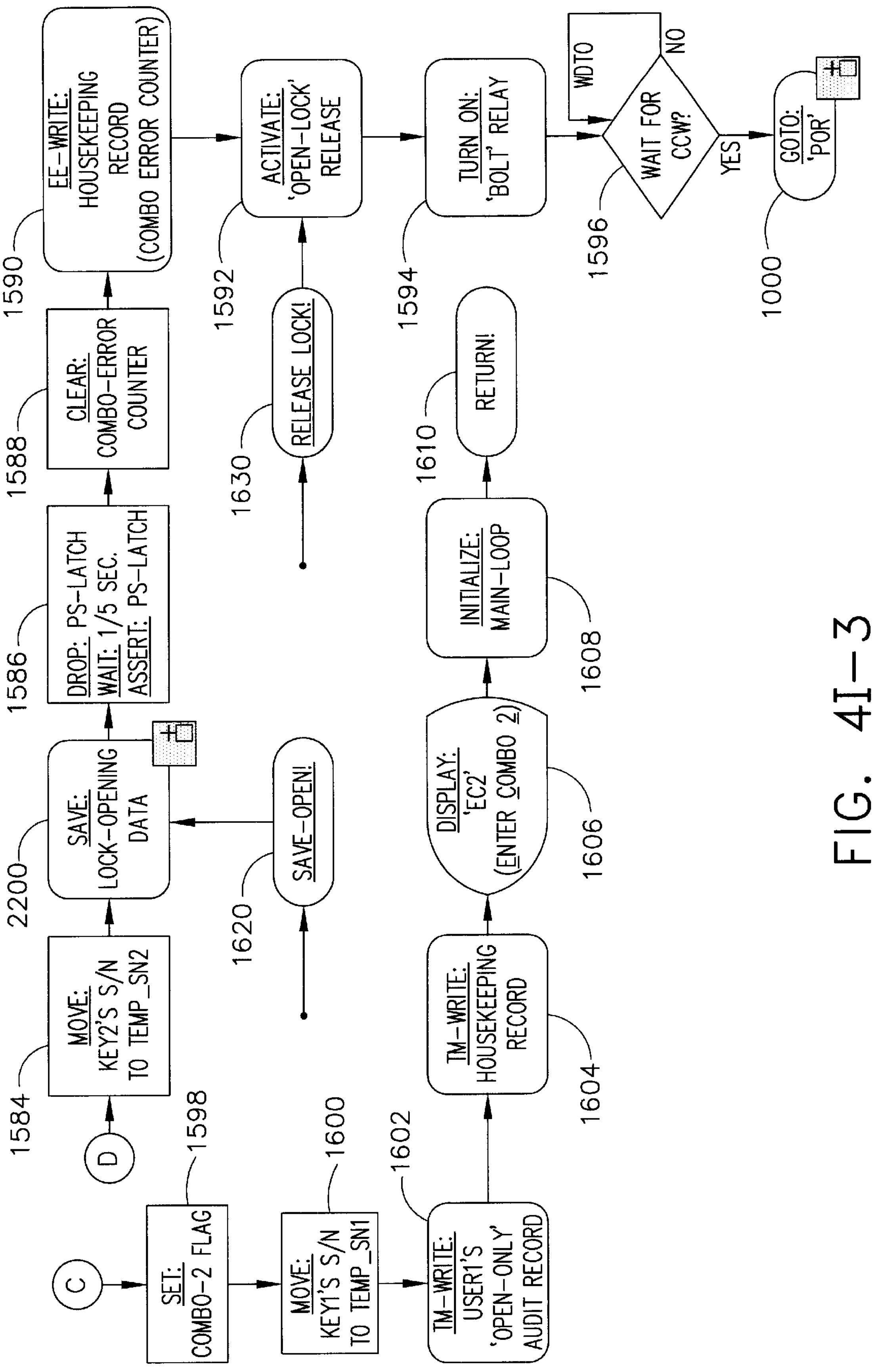

Typically, the pairs in subroutine 1400 may call the combos in subroutine 1500 an exemplary flowchart of which is illustrated in FIG. 4I. The basic subroutine utilizes data from an electronic key, keyboard entry and/or other data entry device to generate a combination. The generated combination is compared to the entered combination. If the generated and entered combinations do not match, this subroutine generates modified combinations to determine which, if any, of the subordinate locks are authorized for entry by the particular user. Furthermore, when a route key is utilized, it is possible to issue multiple combinations for a particular lock. Therefore, the combo is in subroutine 1500 must be capable of looking forward from the present combination to future combinations to check whether the user is authorized entry. While it is believed that a programmer skilled in the art could write a functional subroutine based on the flow chart in FIG. 4I for the combo in subroutine 1500 brief discussion will be provided for the elements that were added to support the senior subordinate lock control as well as to discuss the time windows feature provided by this program.

In some circumstances, it may be desirable to provide lock control that may be capable of locking out one or more modes of the lock if the user fails to get close seals from one or more of the subordinate locks even after re-entering the secured container in an effort to obtain proper closed seals from all subordinate locks. In order to accomplish this optional feature, block 1518 has been added together with decision block 1520. Decision block 1520 checks to see if the lock is under a subordinate closure lockout. If the supervisor lock is under a lockout due to failure to confirm all the subordinate locks closed, the program flow moves directly to a warning subroutine 2410.

When the particular mode being accessed by the user is available, the program flow continues to block 1522. Thereafter, the lock may check for a particular user being locked out using the lockout for user subroutine 1650 and may also check for time windows for user with subroutine 1700. Additionally, it is preferred that at some point before generating the real combination from the data entered that the subordinate lock access authorizations in the electronic key if used would be cleared. An example of this is shown in block 1540. Thereafter, the real combination is generated in block 1544 and the entered and real combinations are compared in decision block 1546.

Whether the combos match or do not match in decision block 1546 the program flow moves to blocks 1548 and 1578, respectively, where the program checks to see if the electronic key is a bank key or user is a bank user. When the combinations match and the user and/or key are for a bank, the program flow may utilize a lookup table to see which subordinate locks the bank user is authorized to access. When the combinations do not match and the key and/or user are not a bank, then the program will generate the subordinate combinations based on different subordinate lock access rights in block 1550. Thereafter, the program in decision block 1552 would determine if the entered combination matched one of the subordinate lock combinations.

Further on, if the entered combinations do not match the subordinate lock combinations in decision block 1552 and the lock is a one-time combination lock then the program flow would move to decision block 1556 where the lock program checks if the user and/or key were of the route type. If the user and/or key were for a route, then the firmware would generate second real combinations and second subordinate lock combinations in blocks 1558, 1560, 1562 and 1564. If the entered combination doesn't match either the second real combination or the second modified combination, the program flow moves on to repeat the above process in blocks 1566, 1568, 1570 and 1572 for a third real combination and third modified combinations (subordinate lock combinations). If in block 1572, the entered combination and one of the previously generated combinations did not match then the program flow would call the warning subroutine 2410. Alternatively, the program may look ahead and generate additional combinations, if desired, by repeating the steps discussed above.

Thereafter, the program flow increments the seal counter appropriately depending on which real combination or modified combination matched in block 1574 and 1576. The program flow continues to block 1580 where the firmware checks for dual mode keys and/or combinations being required. If two keys and/or two combinations are required and both have been entered or if only a single user is permitted access then the program flow would write the subordinate lock authorization access codes to the electronic key and/or display the subordinate lock combinations on the display for the supervisor lock 40. Typically, this authorization process utilizes a subordinate lock access subroutine 2100. Thereafter, the program flow would continue as used in prior art electronic locks.

Figure 4J:
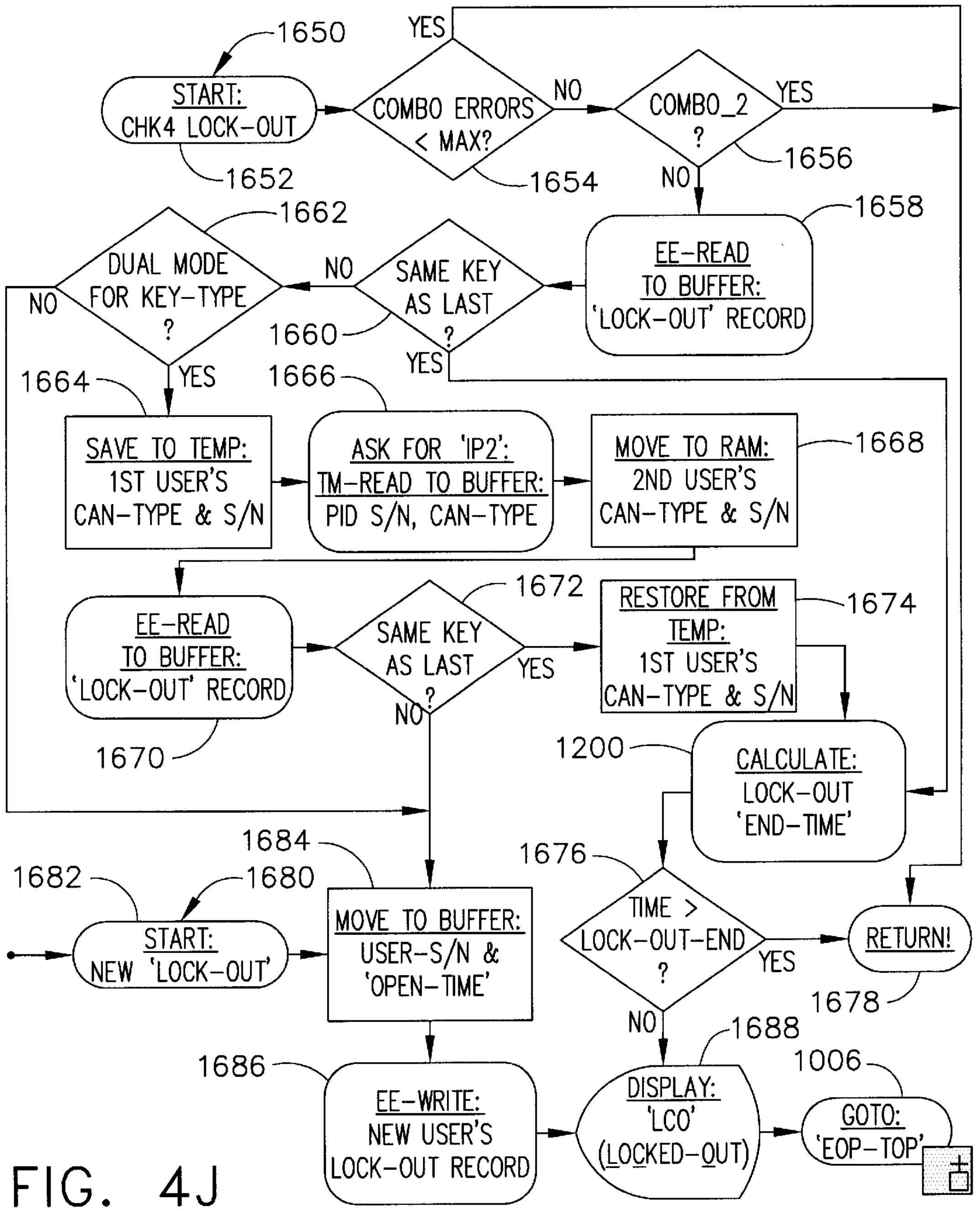

FIG. 4J illustrates the lockout subroutine 1650 that is used to lock a particular user out for a predetermined amount of time if the number of erroneous combinations entered exceeds the maximum number programmed into the lock. Also shown in FIG. 4J is the new lockout starting point for the lockout processing subroutine. The new lockout subroutine 1680 provides for starting a new lockout if and when the user combination errors exceed or equal the maximum permitted. It is believed that programmers skilled in the art could program the subroutine based on the flowchart provided.

FIGS. 4K–O illustrates the subroutines that may be employed to verify that the user is attempting to access the lock within the time window allowed. Typically, the data for the authorized time windows is contained in electronic form on an electronic key. However, this data could also be stored in the lock itself. It is believed that the flowcharts illustrated would provide sufficient disclosure for a programmer skilled in the art to develop time windows subroutines if that feature was desired.

Figure 4K:
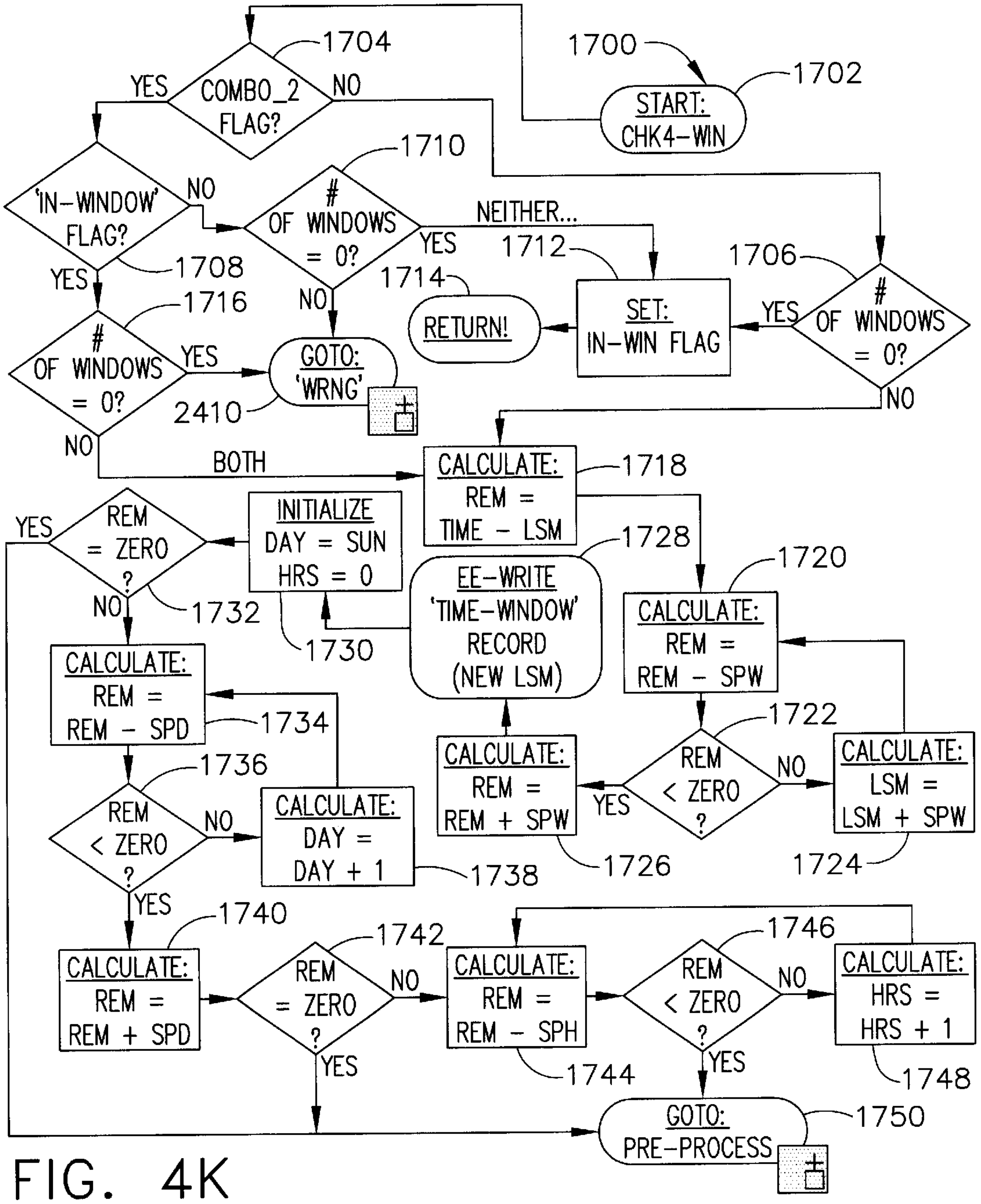
Figure 4L:
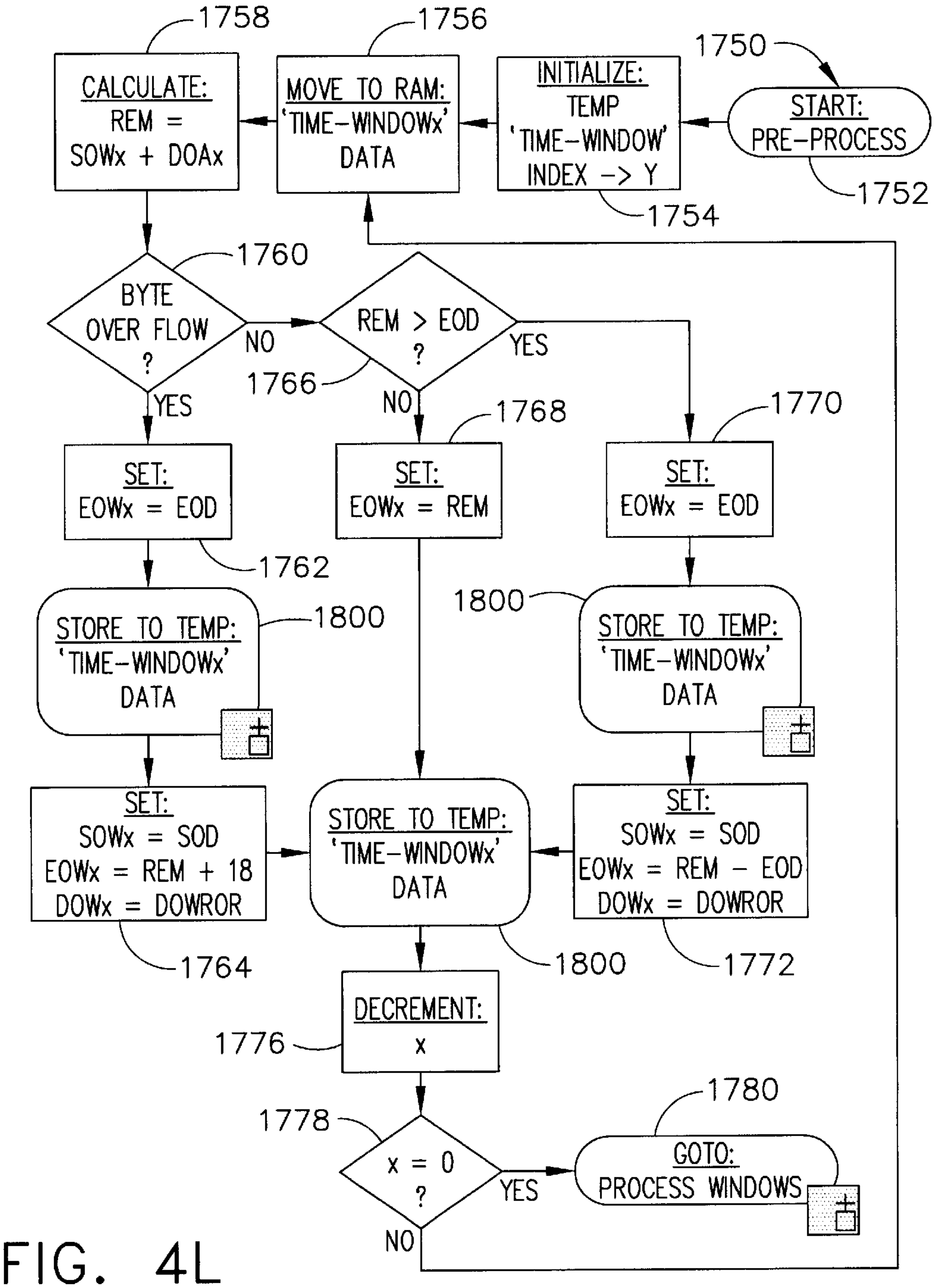
Figures 4M, 4N, 4O:
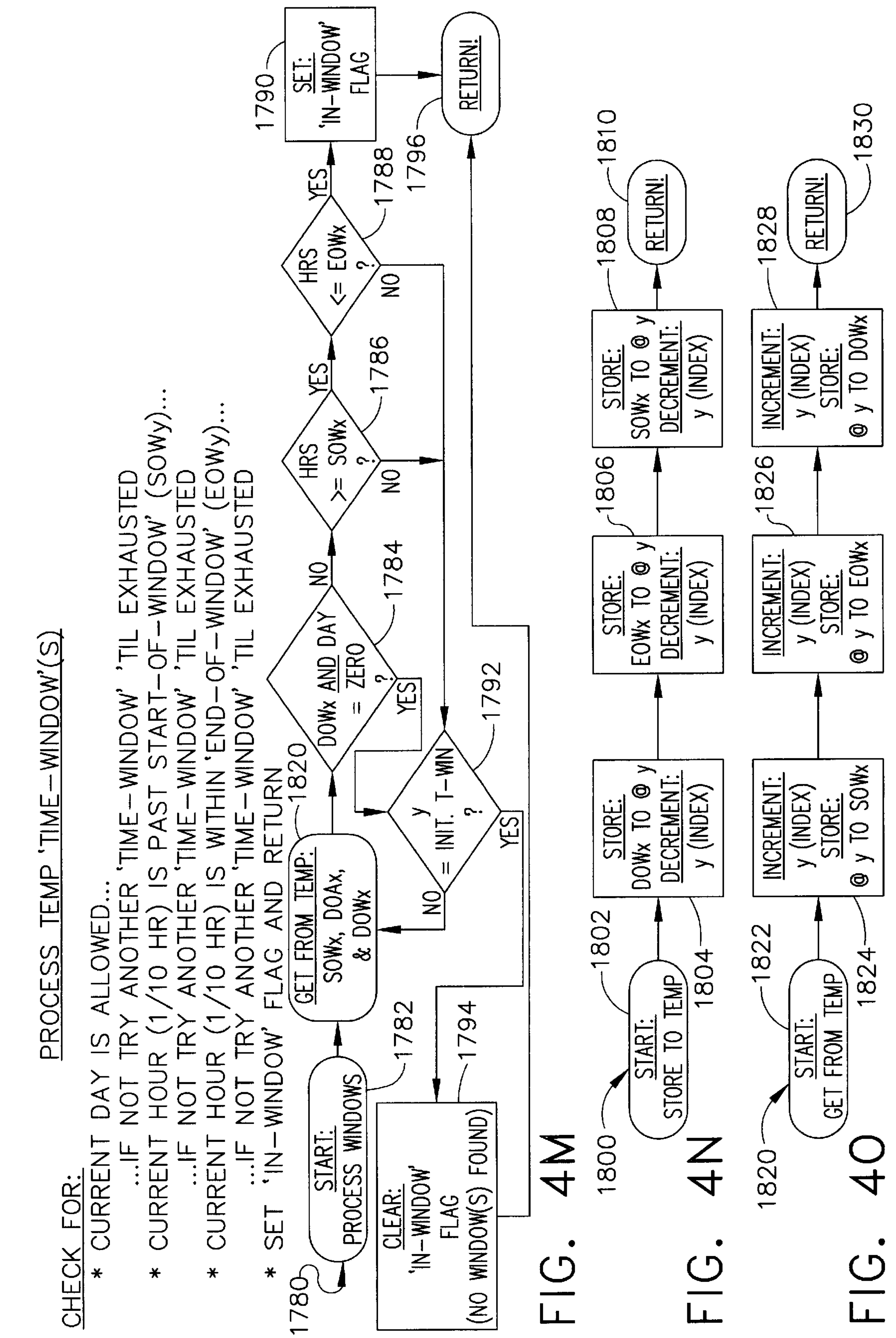
Figure 4P:
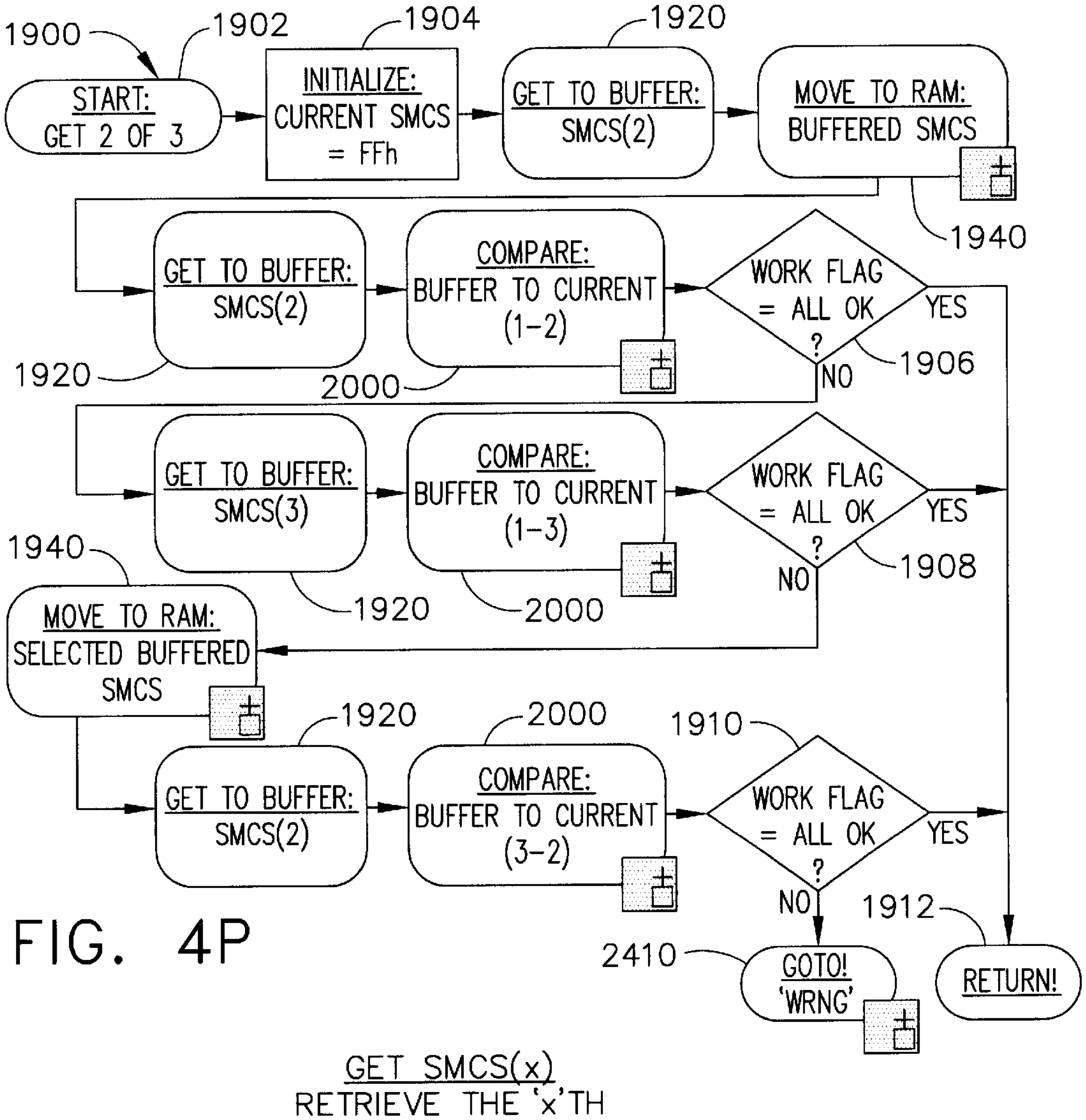
Figure 4Q:
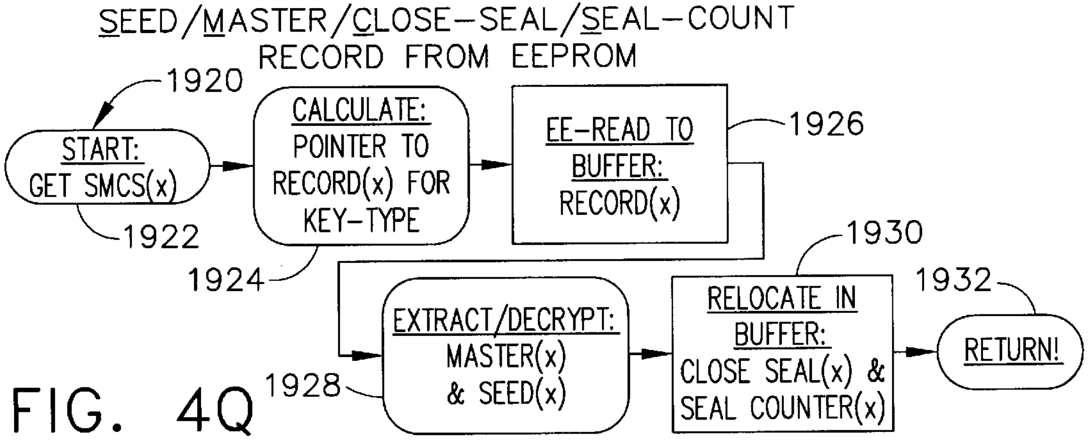
Figure 4R:
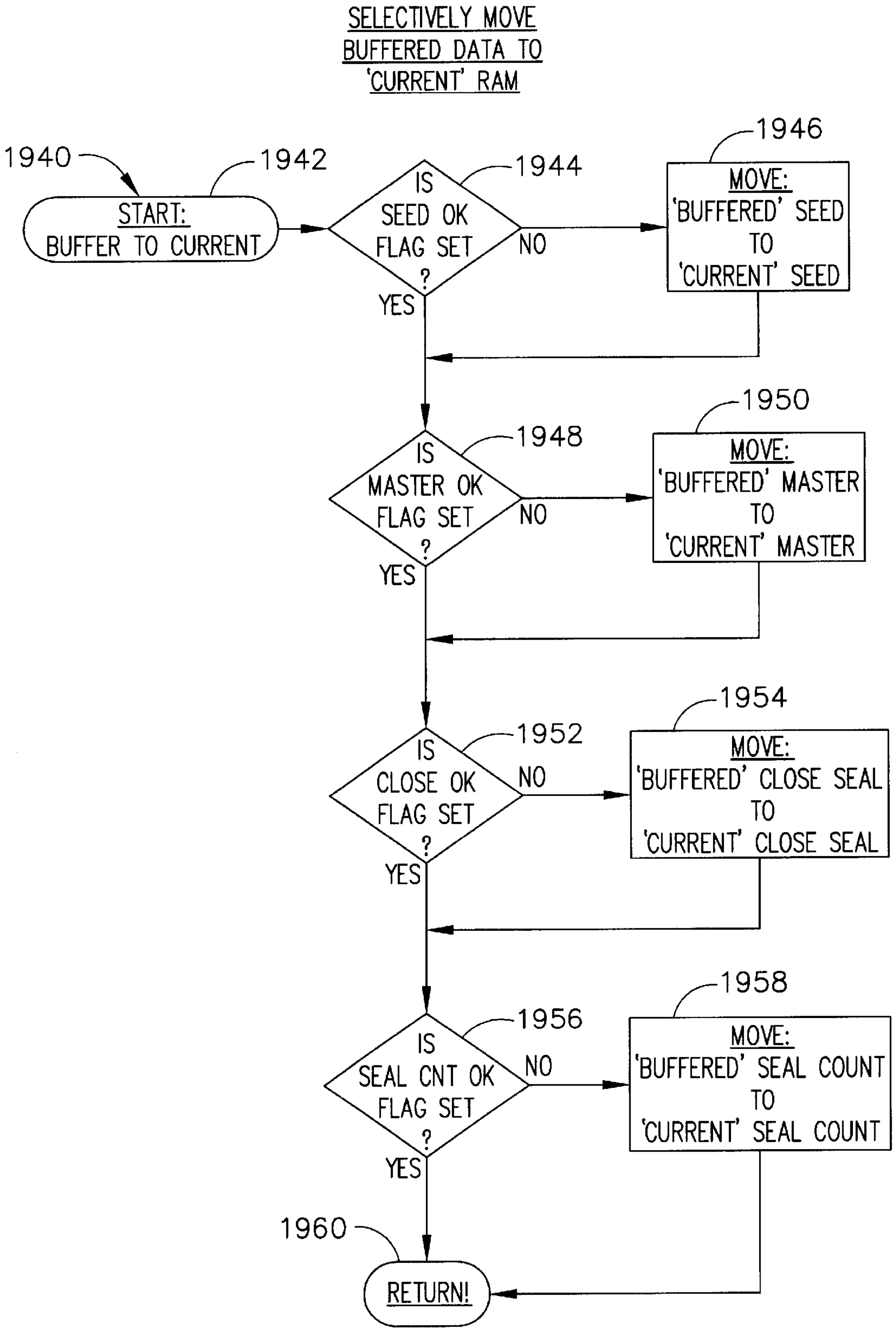
Figure 4S:
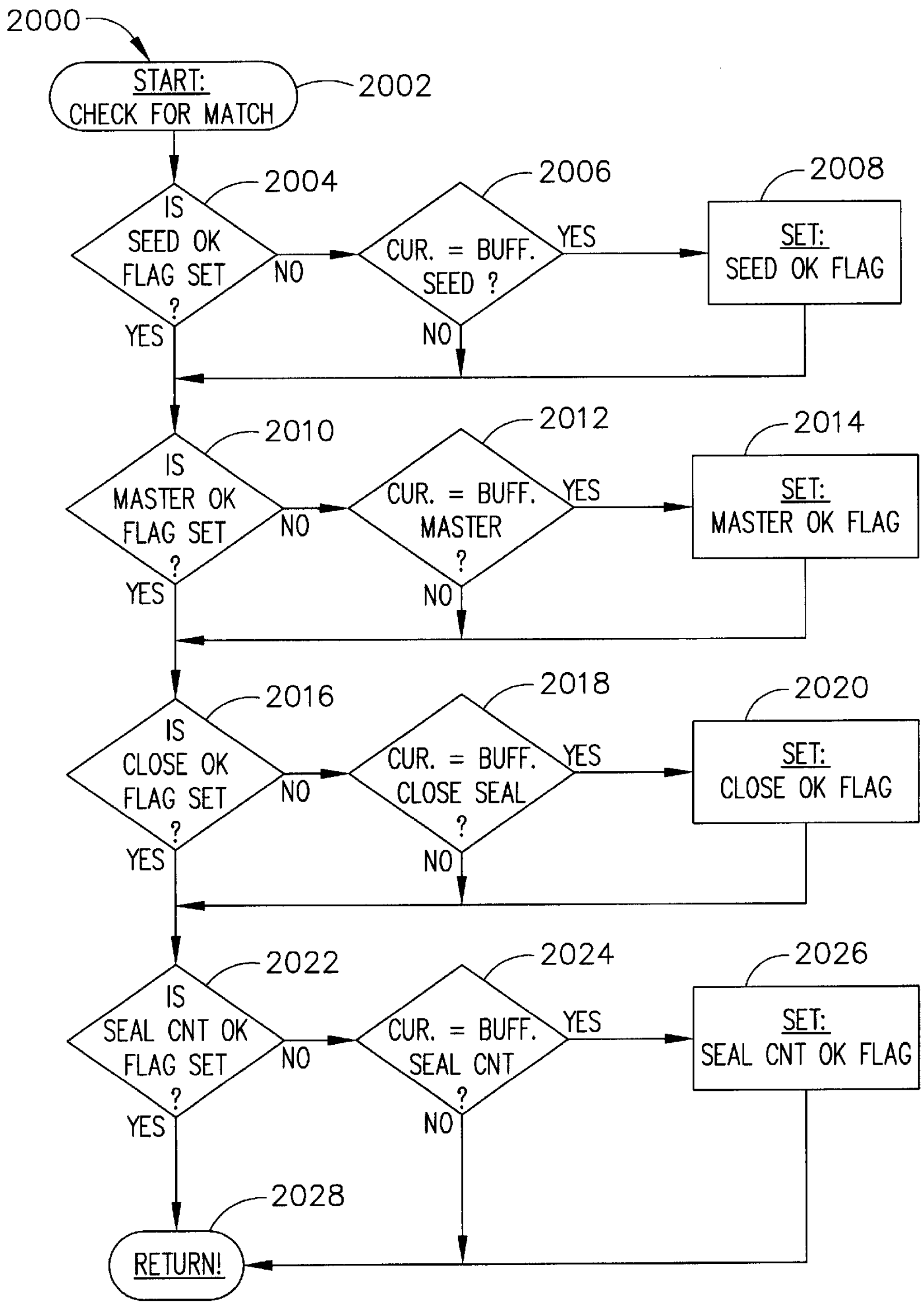

FIGS. 4P–S show exemplary subroutines that may be used to retrieve the seed value, master value, close seal and seal count (SMCS) and may be called from FIG. 4P in the SMCS data subroutine 1900. The flowcharts are believed to adequately disclose the subroutines and the programming necessary to one skilled in the art. Additionally, the subroutines have not been changed or added to in order to implement the senior subordinate lock invention and are thus believed to be old in the art.

Figure 4T:
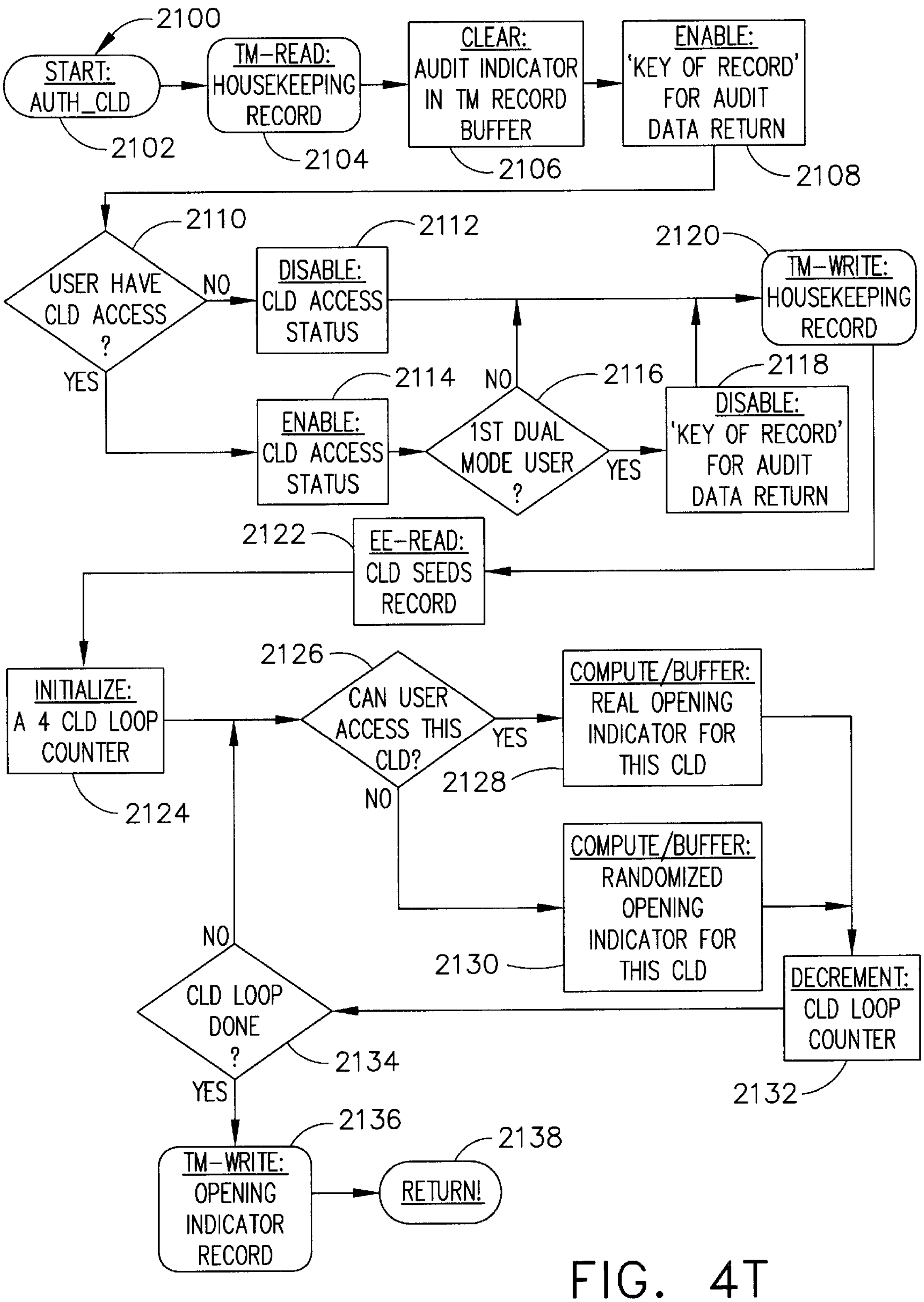

FIG. 4T illustrates exemplary logic flow that may be utilized in the authorized subordinate lock access subroutine 2100. This subroutine writes the access data for each subordinate lock which the user is entitled to open or is authorized to open to either an electronic key or to a memory buffer location for display on the display 44 of the supervisor lock 40. The authorized subordinate lock access subroutine 2100 illustrated begins with start terminator 2102.

Thereafter, blocks 2104, 2106 and 2108 prepare the electronic key for accepting the subordinate lock access data. Next, the program flow verifies that the user is authorized access to one or more subordinate locks in decision block 2110. If the user does not have access to subordinate locks, the subordinate lock access may be disabled in block 2112. When the user had access authorization to one or more subordinate locks the subordinate lock access status would be enabled in block 2114.

Next, decision block 2116 and block 2118 may be used if the lock is set up for two-person integrity i.e. requiring two keys to access and open the lock. Block 2118 disables the key of record for audit data return for the first user when the lock is in dual mode. Thereafter, the subroutine may perform a housekeeping record write to the electronic key in block 2120. The program flow in block 2122 reads the subordinate lock seeds record. Then, a loop counter is initialized in block 2124. The loop counter will have a value equal to the number of subordinate locks which the supervisor lock can handle. For example, this number may be four.

Thereafter, the subroutine checks in decision block 2126 to determine whether the user had access to the particular subordinate lock. If the user had access then a real opening indicator (combination/one-time combination) for the subordinate lock would be computed in block 2128 and if the user did not have access an invalid opening indicator would be prepared in block 2130. Thereafter, the loop counter would be either incremented or decremented depending on the programmer's preference in block 2132. Thereafter, the program flow verifies whether all the subordinate locks had been checked in decision block 2134. If further subordinate locks require checking for access authorization, the program loops back to decision block 2126 discussed above. After all subordinate lock authorization data is obtained, the subroutine in block 2136 writes the opening indicator or authorization data to the electronic key or to a buffer memory that could be utilized to display the access combinations on the supervisor lock 40. Thereafter, the subroutine returns to the program that called the subroutine at return terminator 2138.

Figure 4U:
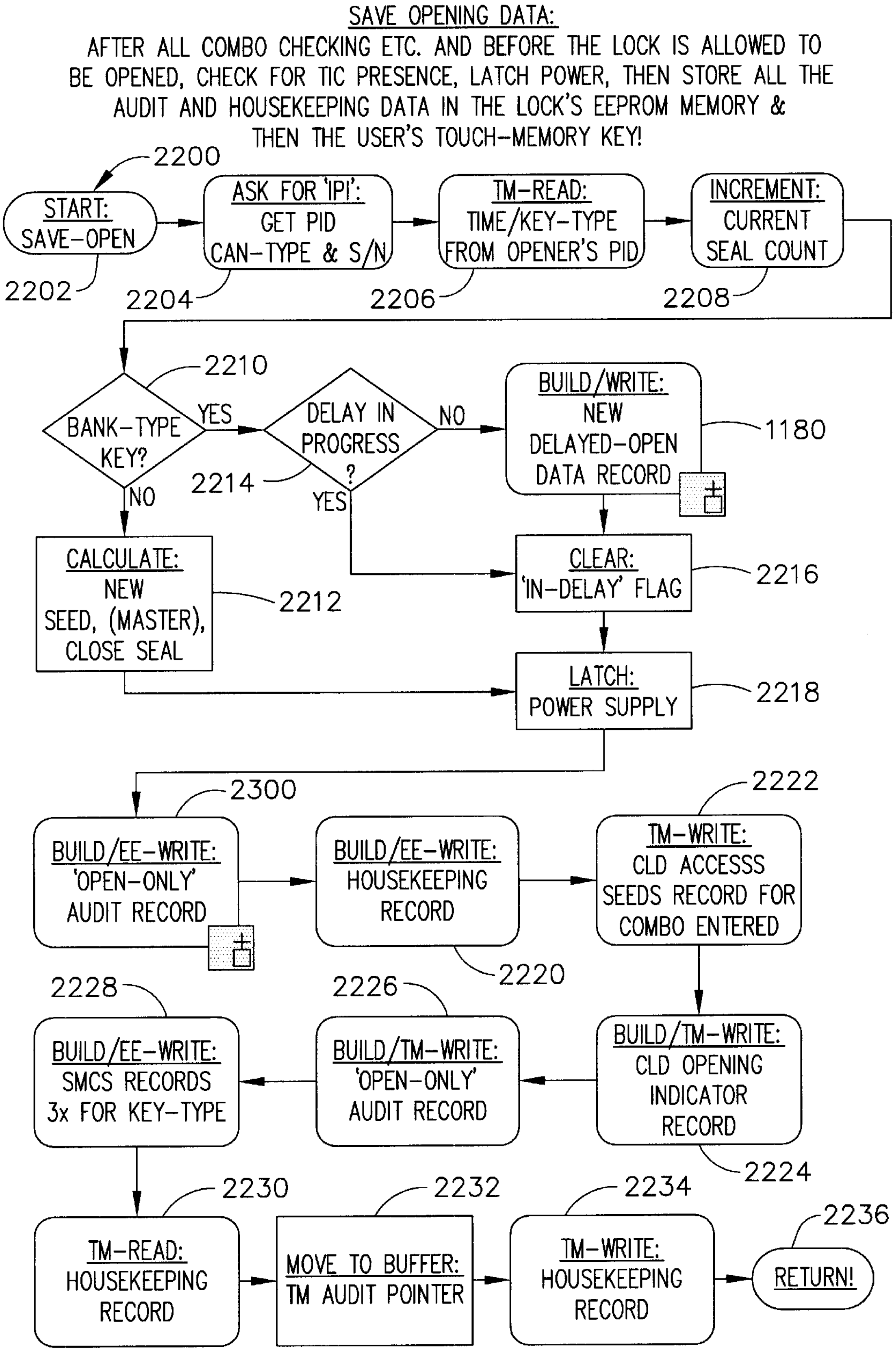

FIG. 4U illustrates an exemplary save open subroutine 2200 that after all the combination checking is completed and before the lock is opened or before the supervisor lock to displays or writes the subordinate lock 60 access codes to a memory device, the lock stores all audit and housekeeping data in the locks memory and the user's electronic key, if used. This subroutine may be required if it was desired to maintain audit records and other housekeeping data on an electronic key. The basic subroutine has been modified to support the subordinate supervisor lock system. The added elements are shown in blocks 2222 and 2224 where the subordinate lock access seeds record for the combination entered and the subordinate lock opening authorization or opening indicator record is written to the electronic key. These elements could be easily incorporated in either the mainline program or in a second subroutine if the maintaining of audit records is not required.

Figure 4V:
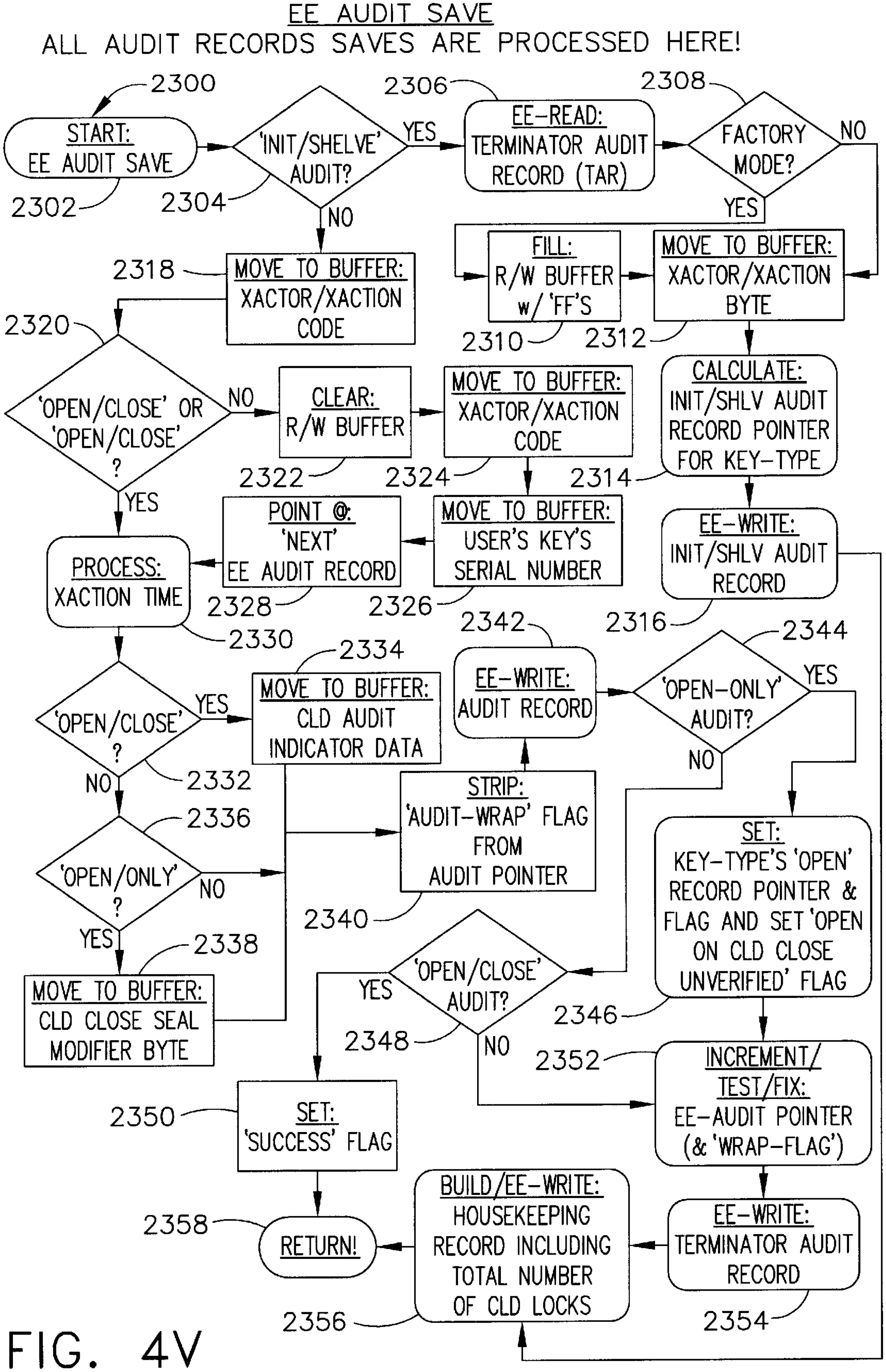

FIG. 4V illustrates an exemplary audit save subroutine 2300. The subroutine provided in FIG. 4V is believed to be self-explanatory and within the skill of a programmer of ordinary skill in the art to draft a functional subroutine therefrom. The modifications directed toward the supervisor subordinate lock system are discussed below. This audit save subroutine 2300 permits the writing of several different types of audit records of interest. Of particular interest are the open-close or open-only audit records. When the particular audit record is an open-close record, then the subroutine typically moves the subordinate audit indicator data to buffer as shown in block 2334. If the audit record is the result of an open-only audit record, then in block 2338 the subordinate lock close seal modifier byte may be moved into the buffer. Additionally, on an open-only audit, a flag may be set that indicates that the close for the subordinate lock(s) is unverified in block 2346. Finally, the final write in block 2356 may include in the housekeeping record the total number of subordinate locks in the system. This audit save subroutine 2300 allows for the saving of audit records both when the lock is opened followed by a close by the same operator or alternatively the lock could be opened by one operator and a close obtained by a second operator in which case a close-only audit record could be written as well as an open-only audit record.

Figure 4W:
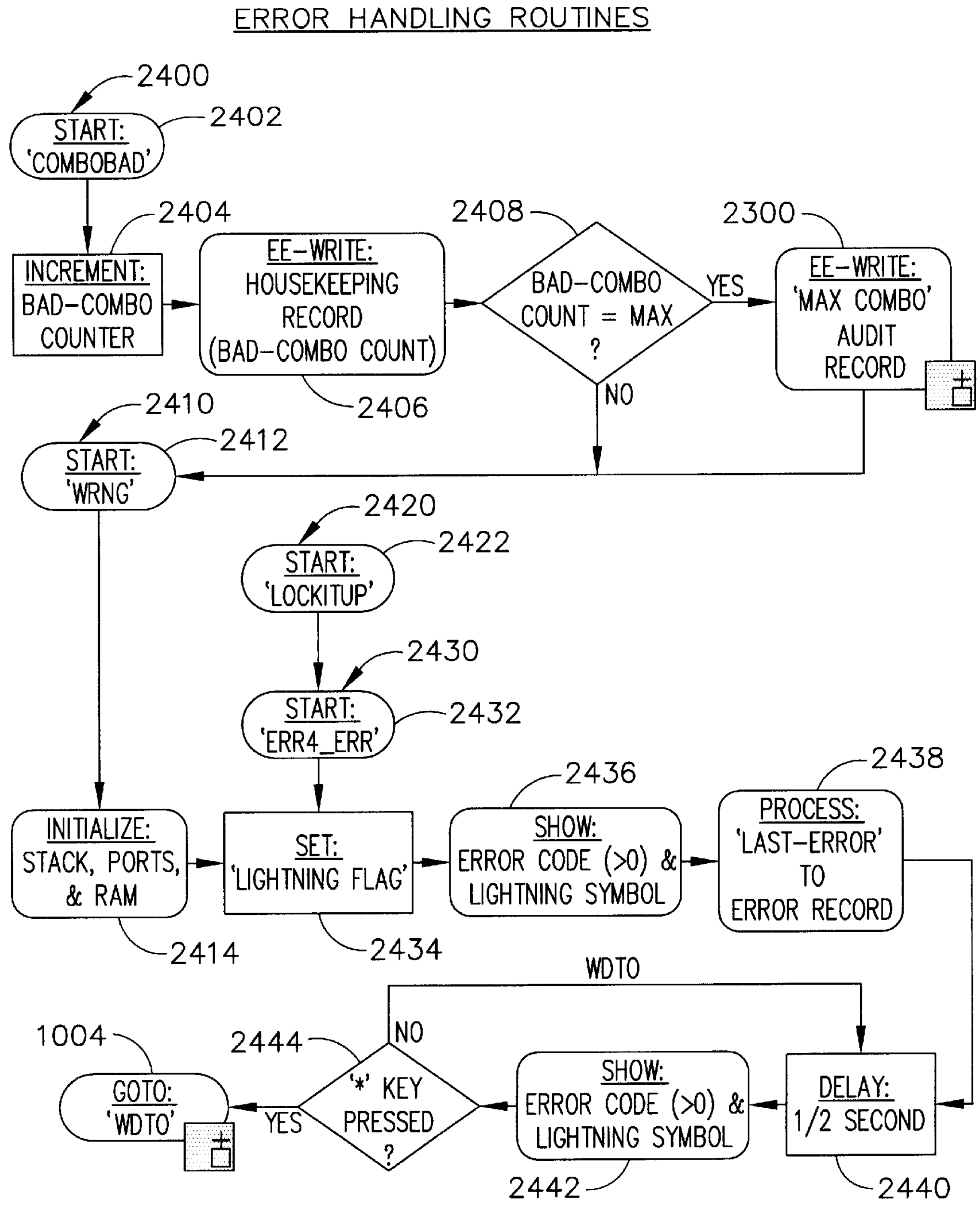
Figure 4X:
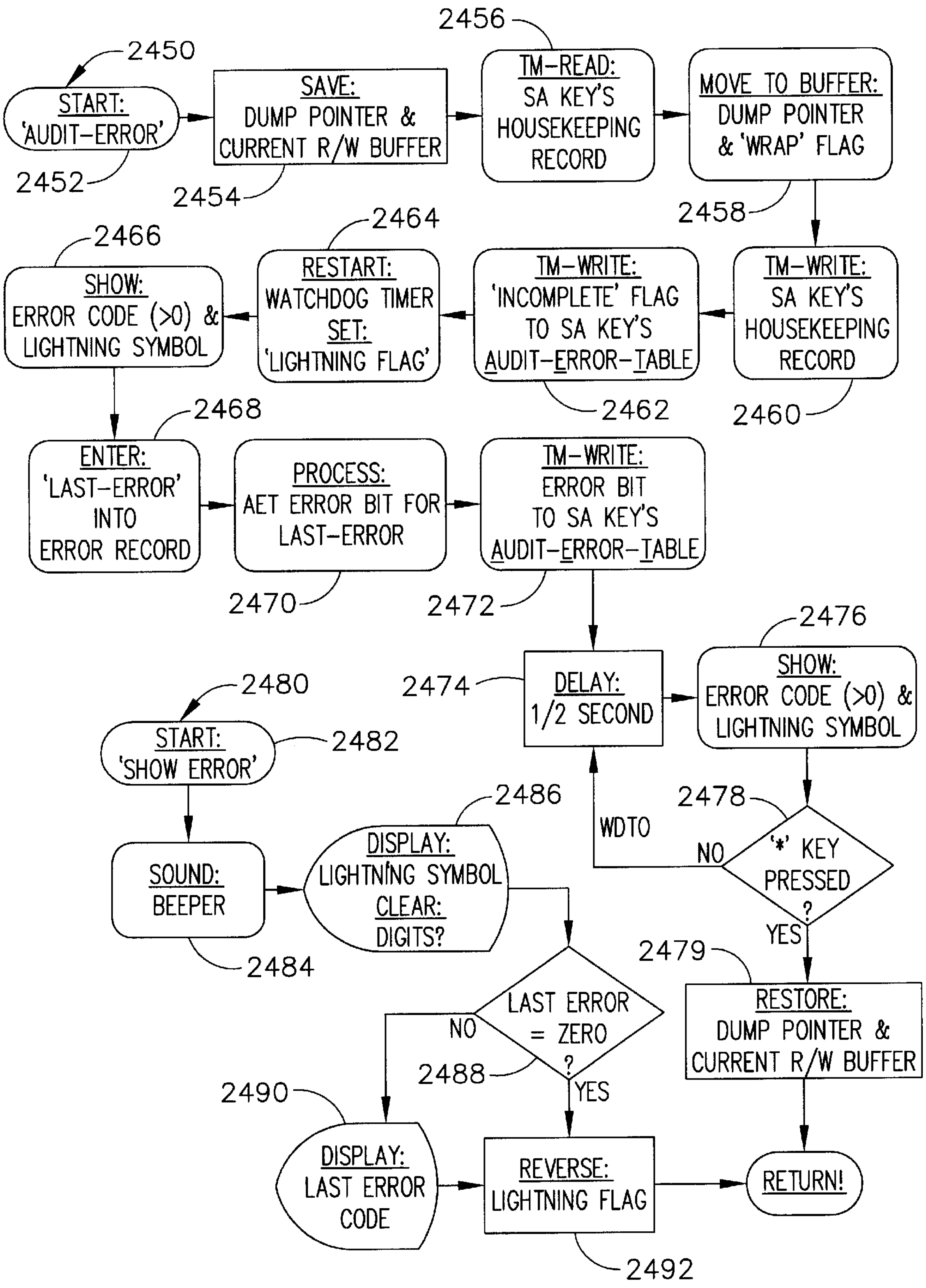

FIGS. 4W and 4X illustrate exemplary error handling subroutines utilized in the preferred embodiment. These subroutines are essentially old in the art and have not been altered to support the use of a senior and subordinate lock system disclosed. Additionally, it is believed that one of ordinary skill in the art could provide similar effective error handling routines based on the logic provided in FIGS. 4W and 4X. Therefore, these flowcharts and subroutines will not be discussed in detail.

The exemplary main menu function subroutine 2500 is a subroutine that may be called from the pairs in subroutine 1400 illustrated in FIG. 4H. The main menu function subroutine 2500 illustrated allows the user to perform additional functions and display additional information on the lock including display of lock's code and hardware level shown in block 2512; display the lock's serial number shown in block 2516; display the lock's total seal count in block 2520; display the last closed seal for a key type in block 2524; display the last 15 error codes in block 2528; and perform additional subroutines. The only change to the main menu functions is the addition of the ability to access the subroutine for subordinate lock access seed dump 2600. This subroutine is accessed by pressing a predetermined key or button, for example, "0" followed by a second predetermined key or button, for example, "6." The remaining subroutines provide other functions, for example, set/change a bank user's combination subroutine 2700, process super shelves subroutine 2900, and audit dump subroutine 4000 are all modifications of subroutines that have been utilized in prior locks. The modifications to these subroutines will be discussed below.

The exemplary subordinate access seed dump subroutine 2600 illustrated in FIG. 42 begins at start terminator 2602, thereafter the program flow may check to see if the lock is in the factory mode in decision block 2604, if the lock is in the factory mode the program flow may move to the warning subroutine 2410.

When the supervisor lock is not in the factory mode the subroutine obtains data from the electronic key or from keyboard input in blocks 2606 and 2608. Preferably, an electronic key is utilized. Program flow then moves to decision block 2610 where the program verifies that the electronic key is a subordinate lock seed key. If the key 30 is not a seed key, then the program flow may move to the warning subroutine 2410. When the key is a proper seed key, program flow verifies in decision block 2612 that this is the proper key to seed the subordinate locks for this particular supervisor lock in decision block 2612. If the seed key did not match that particular lock then the program flow may again move to the warning subroutine 2410. When the subroutine has determined that the seed key matches the supervisor lock 40, the program flow continues to block 2614 where the program reads from memory the access seeds for the subordinate locks. Thereafter, the program may verify that there were no read errors in decision block 2616, if there was a read error the program flow could move to the lock it up subroutine 2420. Next, the program flow moves to block 2618, which calculates the security bytes for the subordinate locks.

Thereafter, a housekeeping record may be written to the electronic key in block 2620 and a check of this record in the electronic key 30 could be performed at decision block 2622. If there were an error, then the program flow could be to the lock it up subroutine 2420. If the electronic key read was proper, the program flow moves to block 2624 where the program writes the subordinate lock security byte to the buffer in block 2624, thereafter in block 2626 the program writes to the electronic key the initial or first subordinate lock unit number and the appropriate modes for that lock. After checking for a write error in decision block 2630, an optional step, the program flow could move to block 3642 where the program flow encodes the CLD access seeds, thereafter the encrypted or encoded access seeds may be written to the electronic key in block 2640. Again there may be a check that the write to the electronic key was performed properly in the decision block 2634 and after verifying no error the program returns at terminator 2636. If there was an error made in the write to the electronic key, the program flow could move to the lock it up error handling error subroutine 2420.

Figures 1, 4Y:
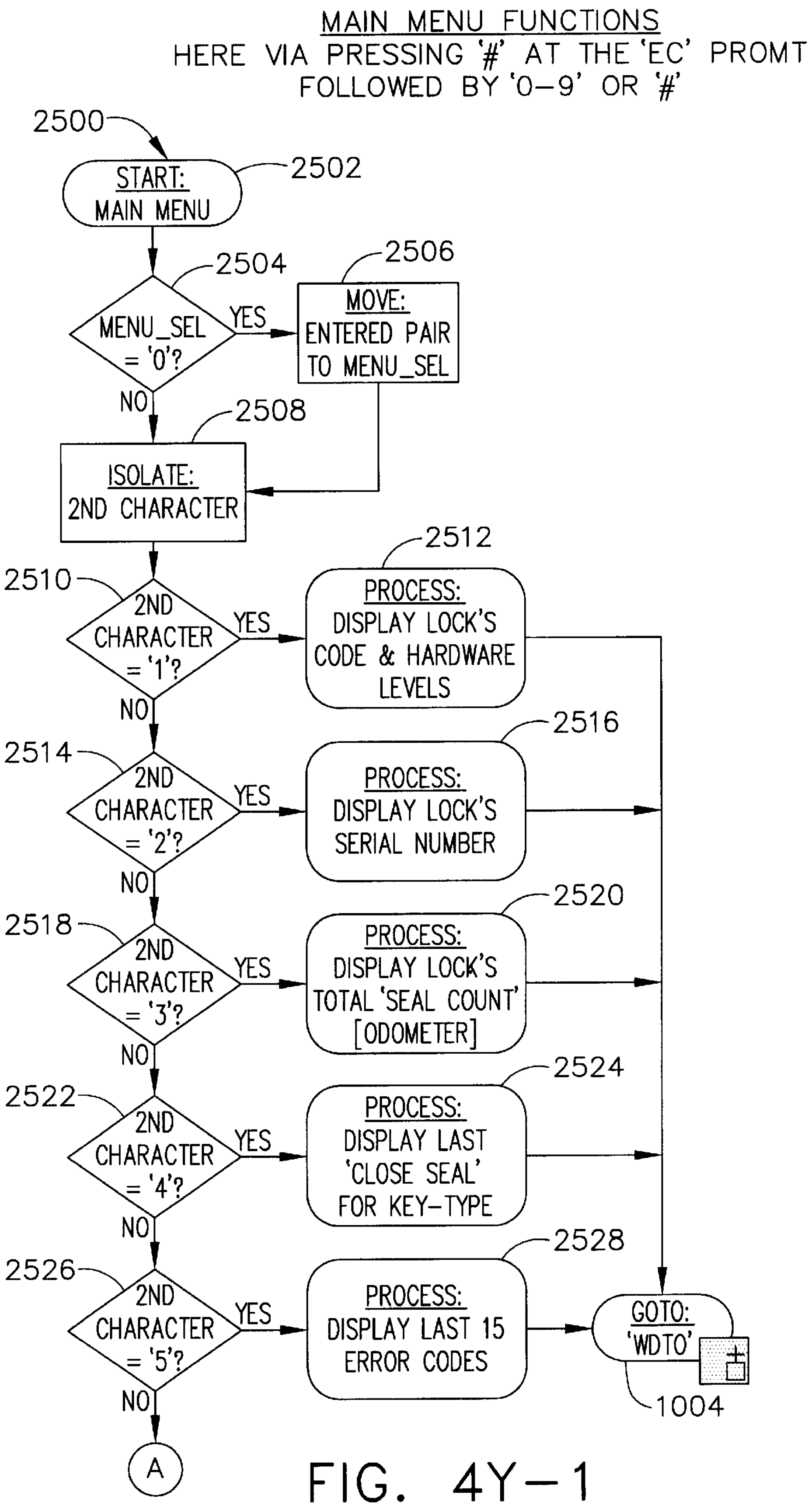
Figures 2, 4Y:
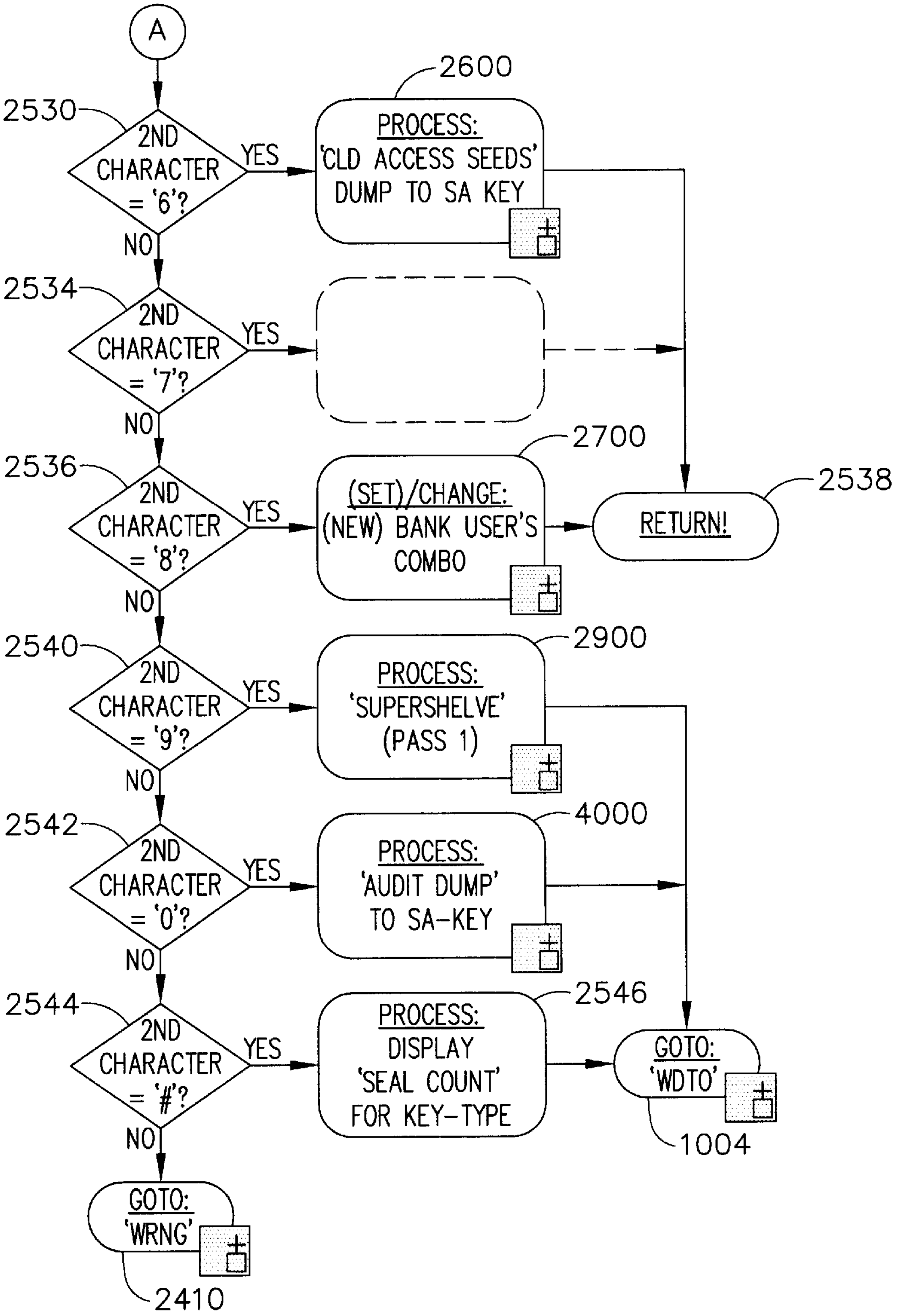
Figure 4Z:
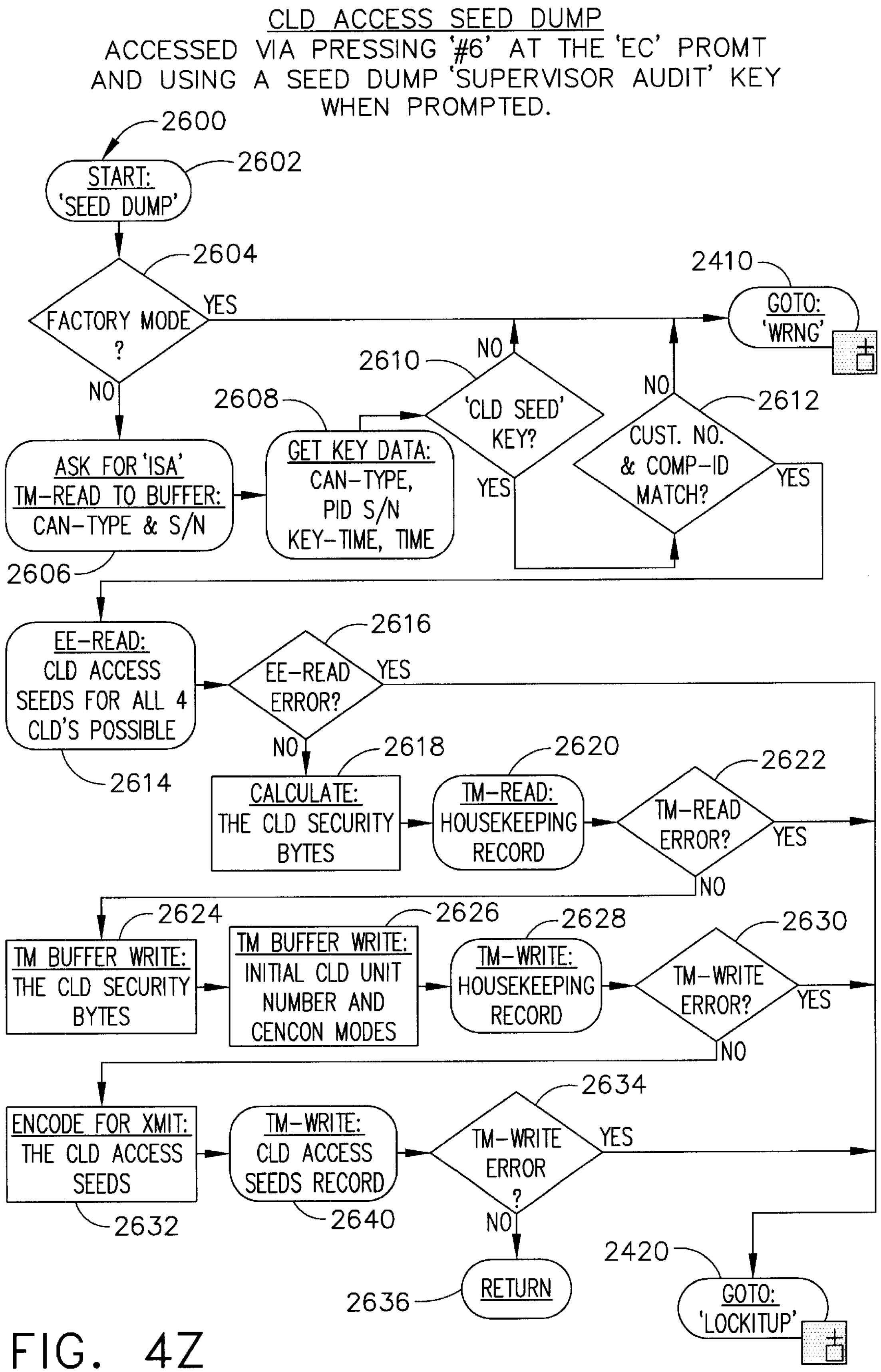
Figure 4A:
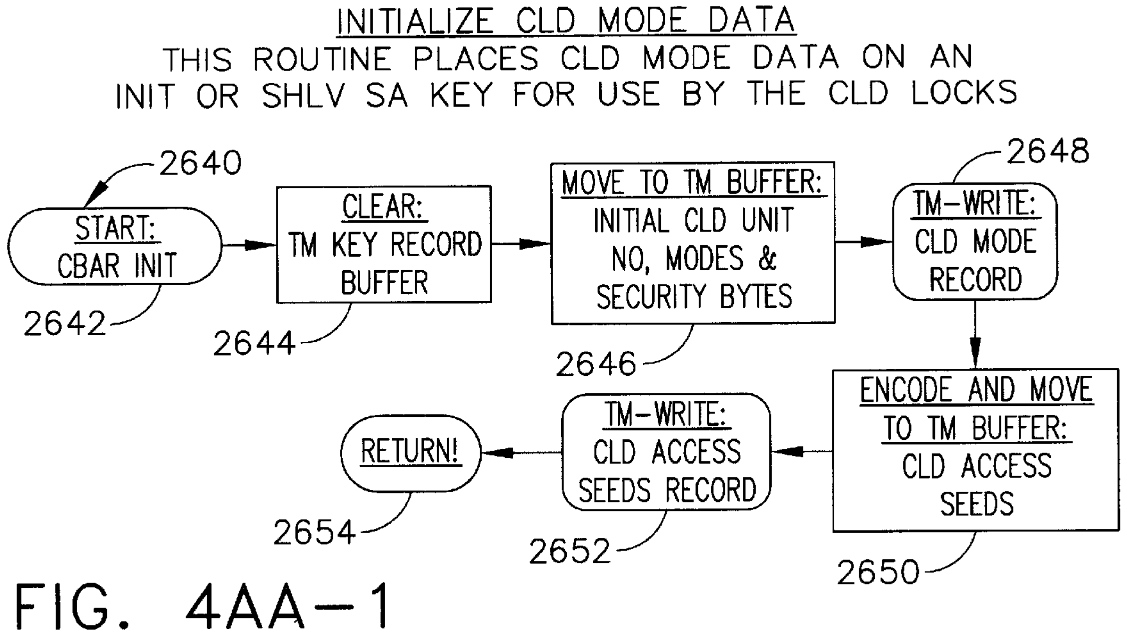
Figure 4A:
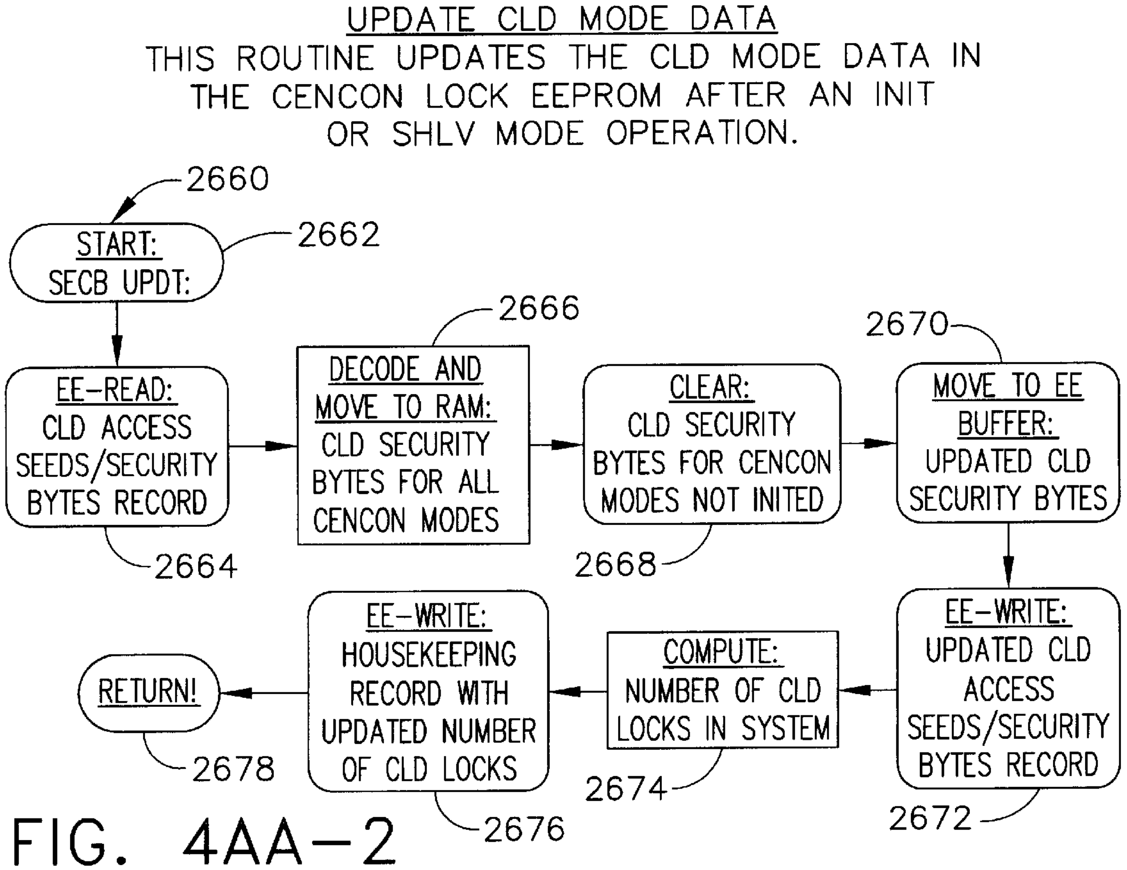
Figure 4B:
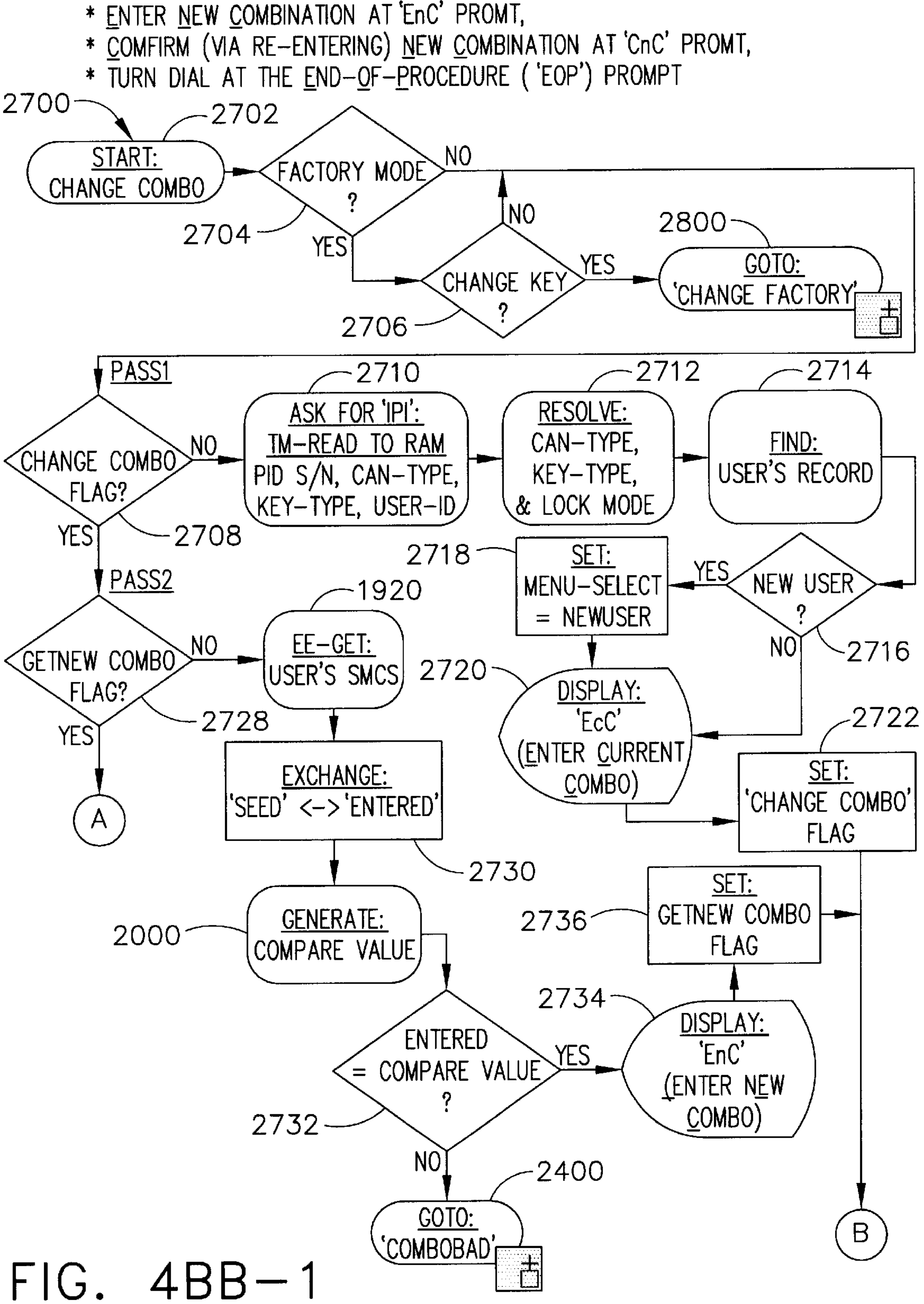
Figure 4B:
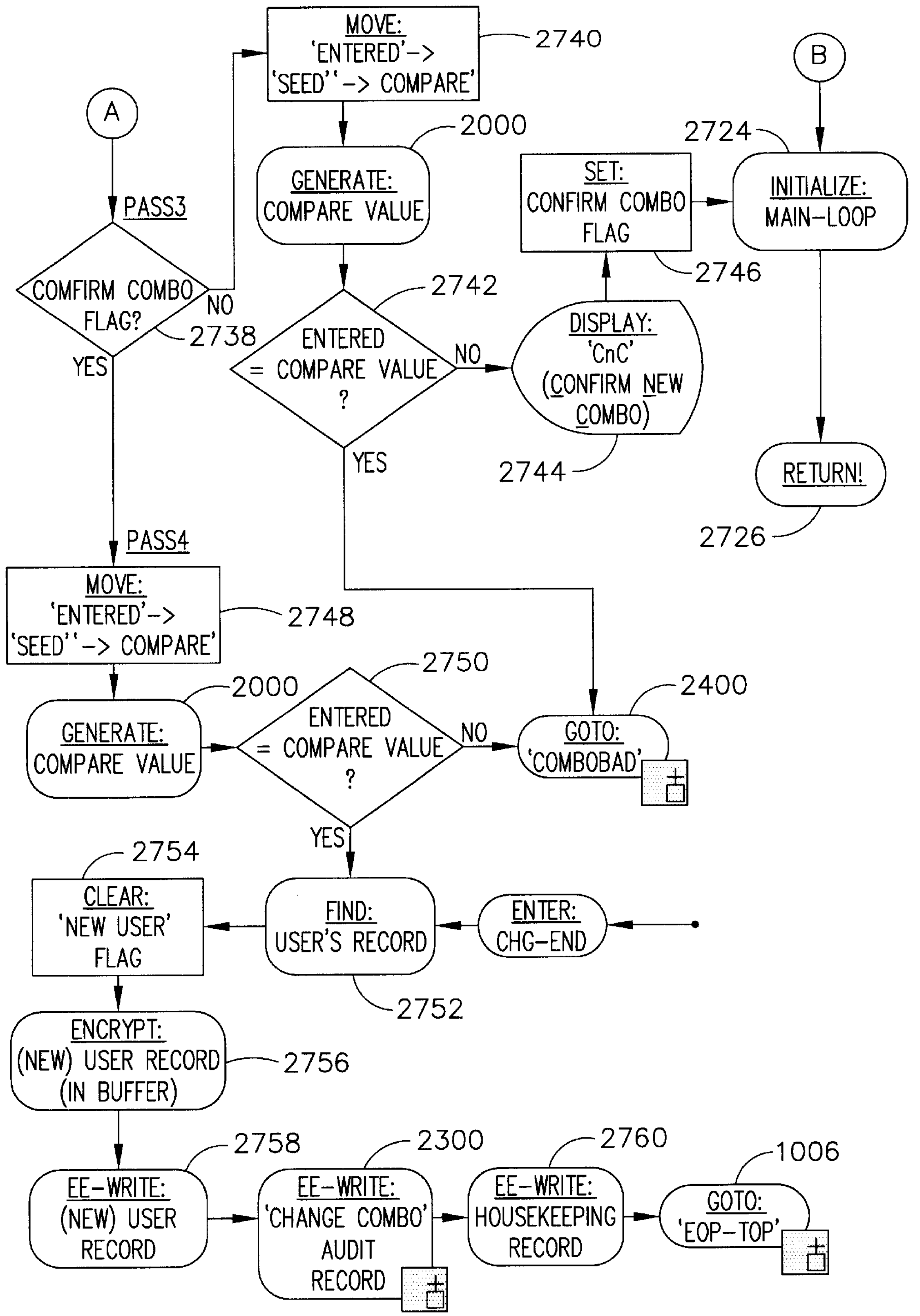
Figure 4D:
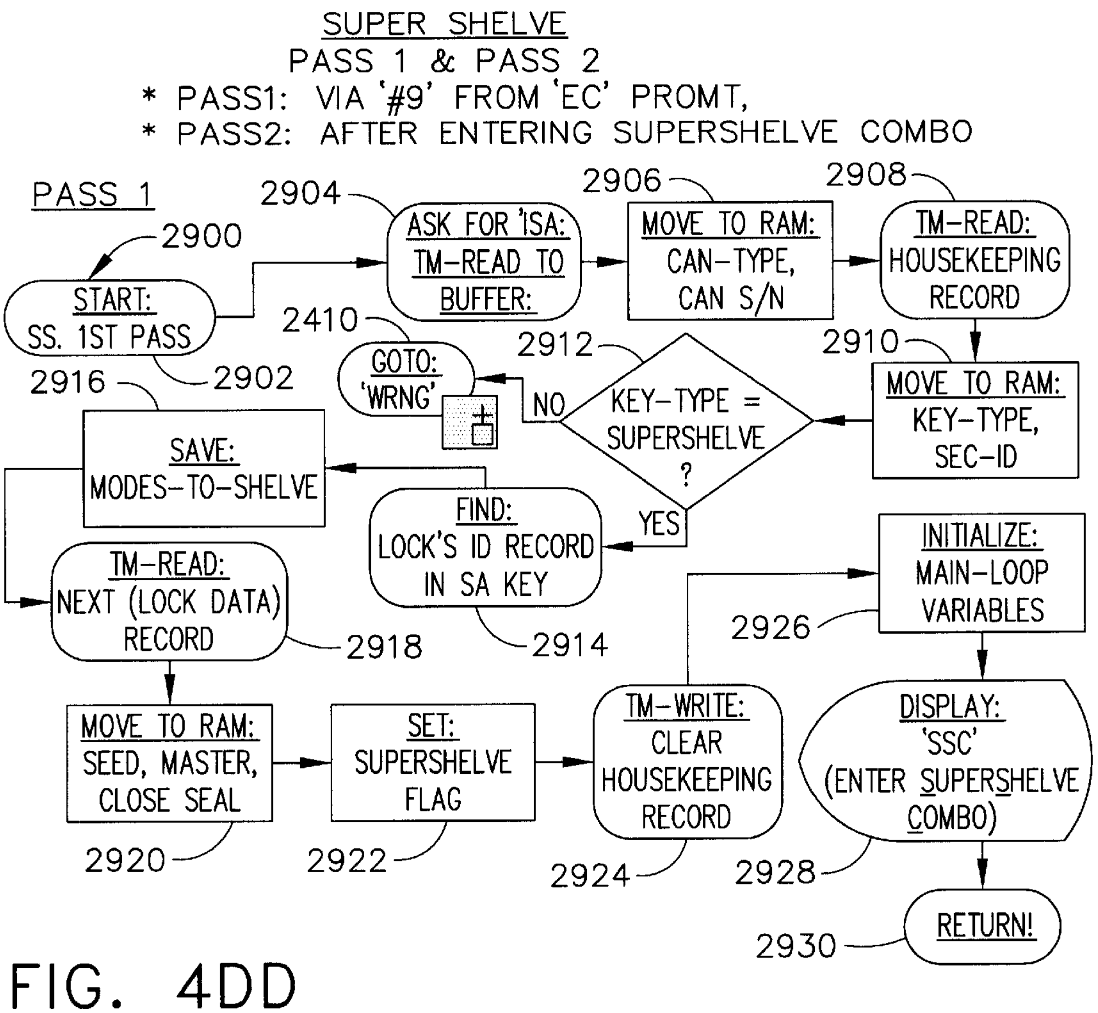
Figure 4E:
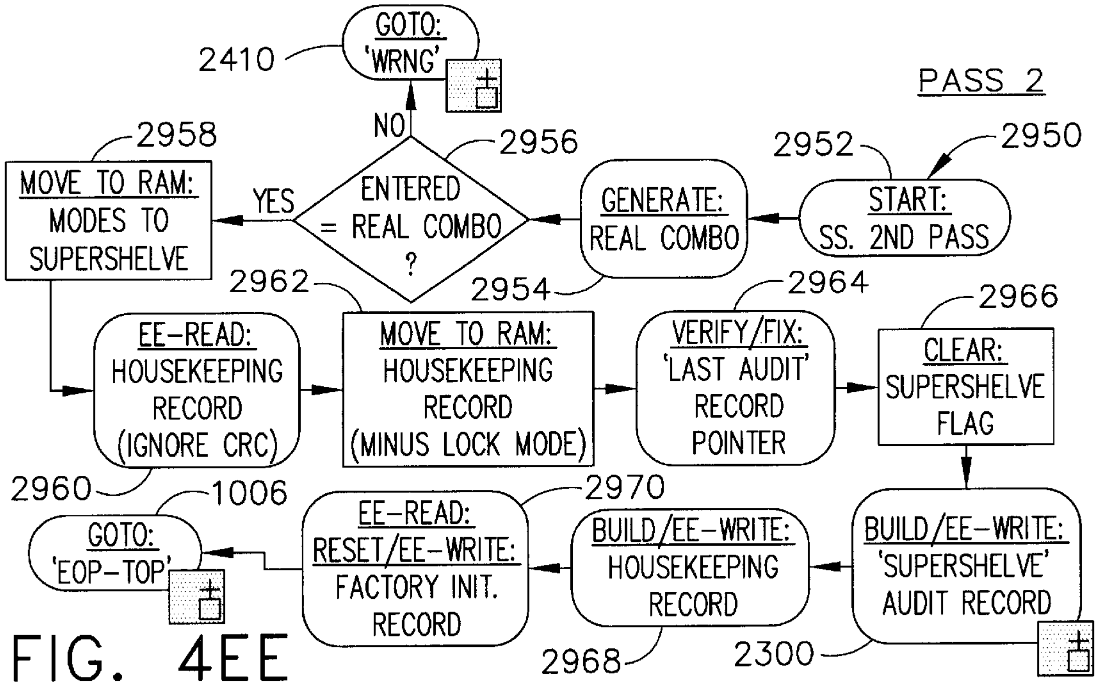
Figure 4F:
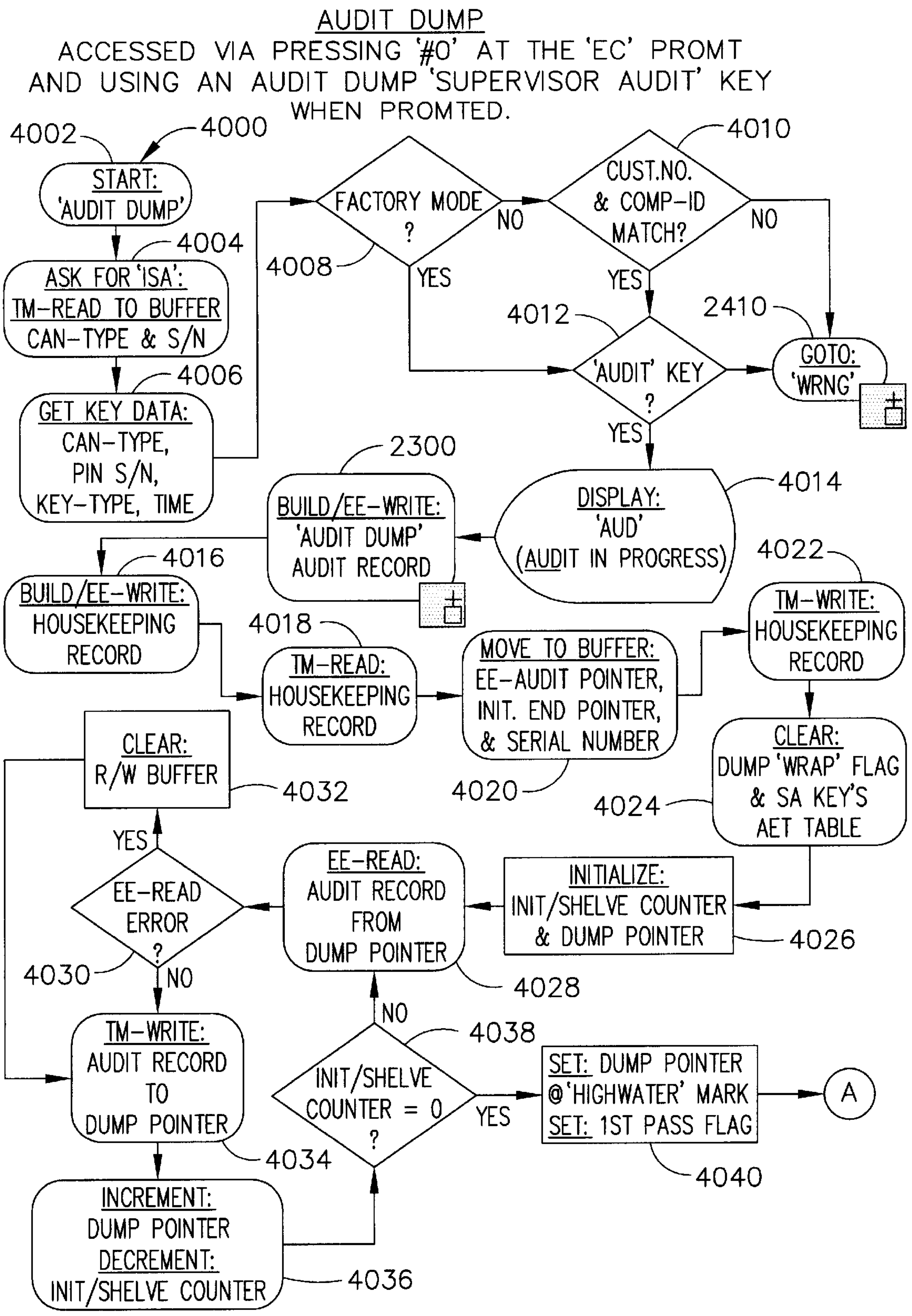
Figure 4F:
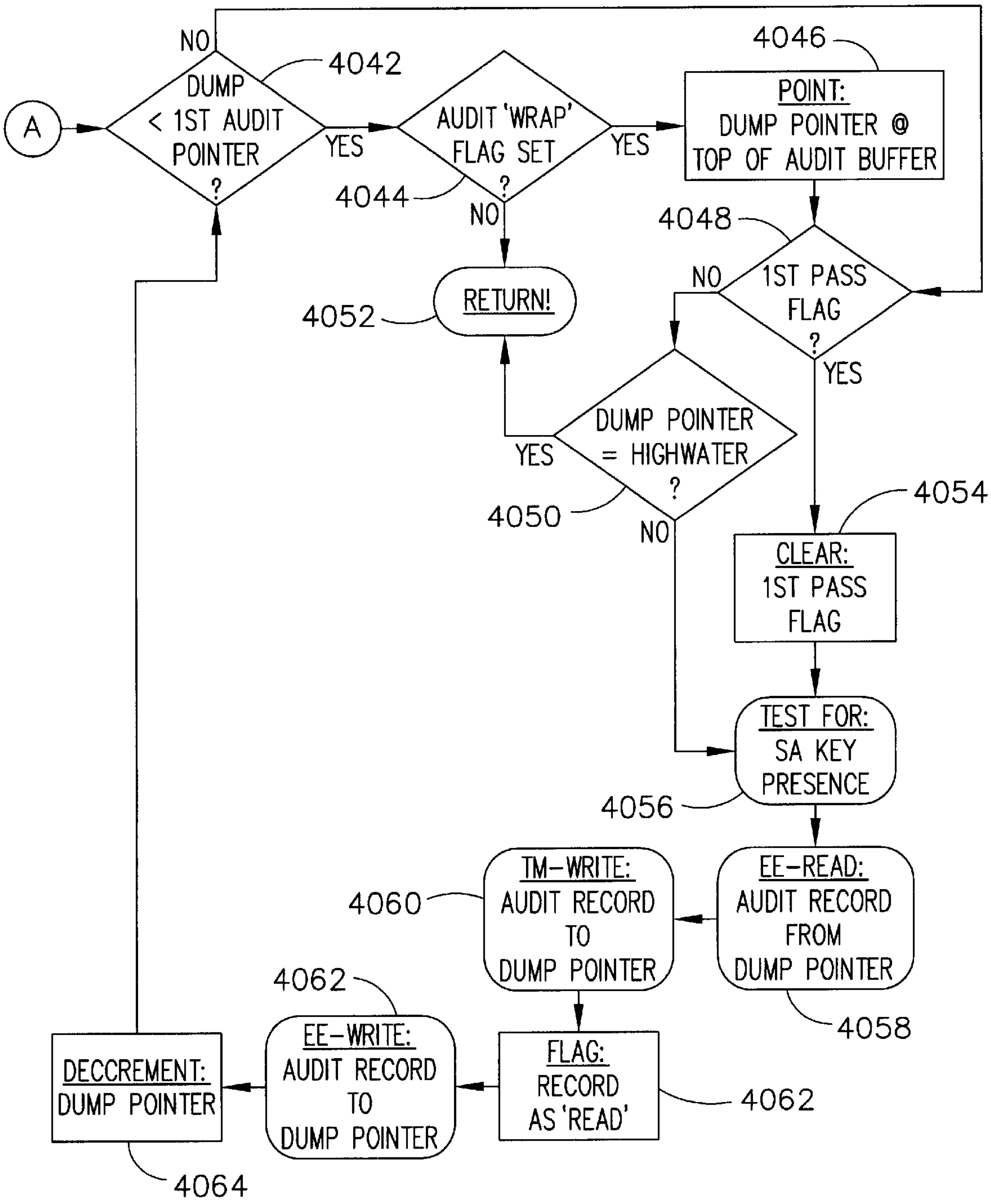
Figure 4G:
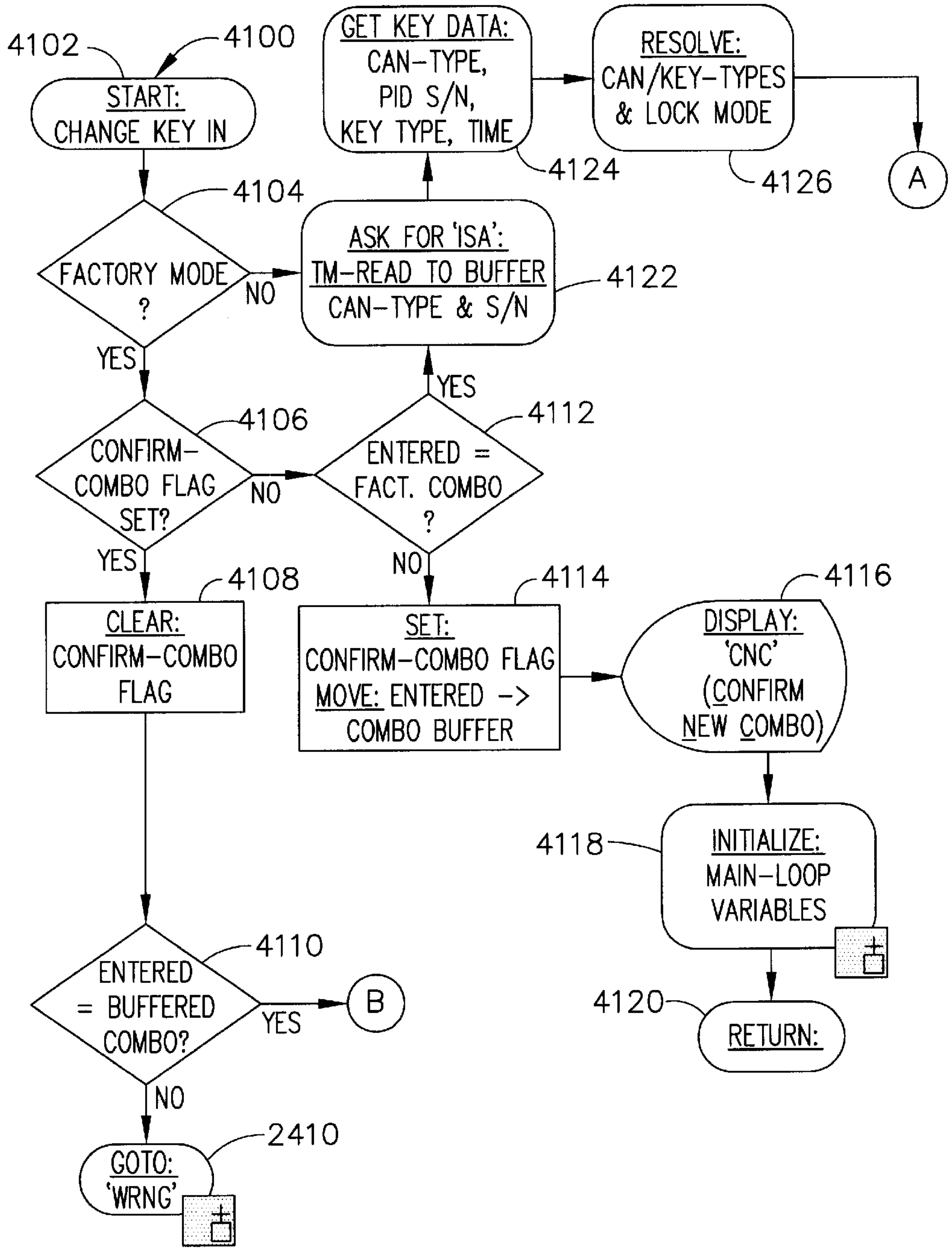
Figure 4G:
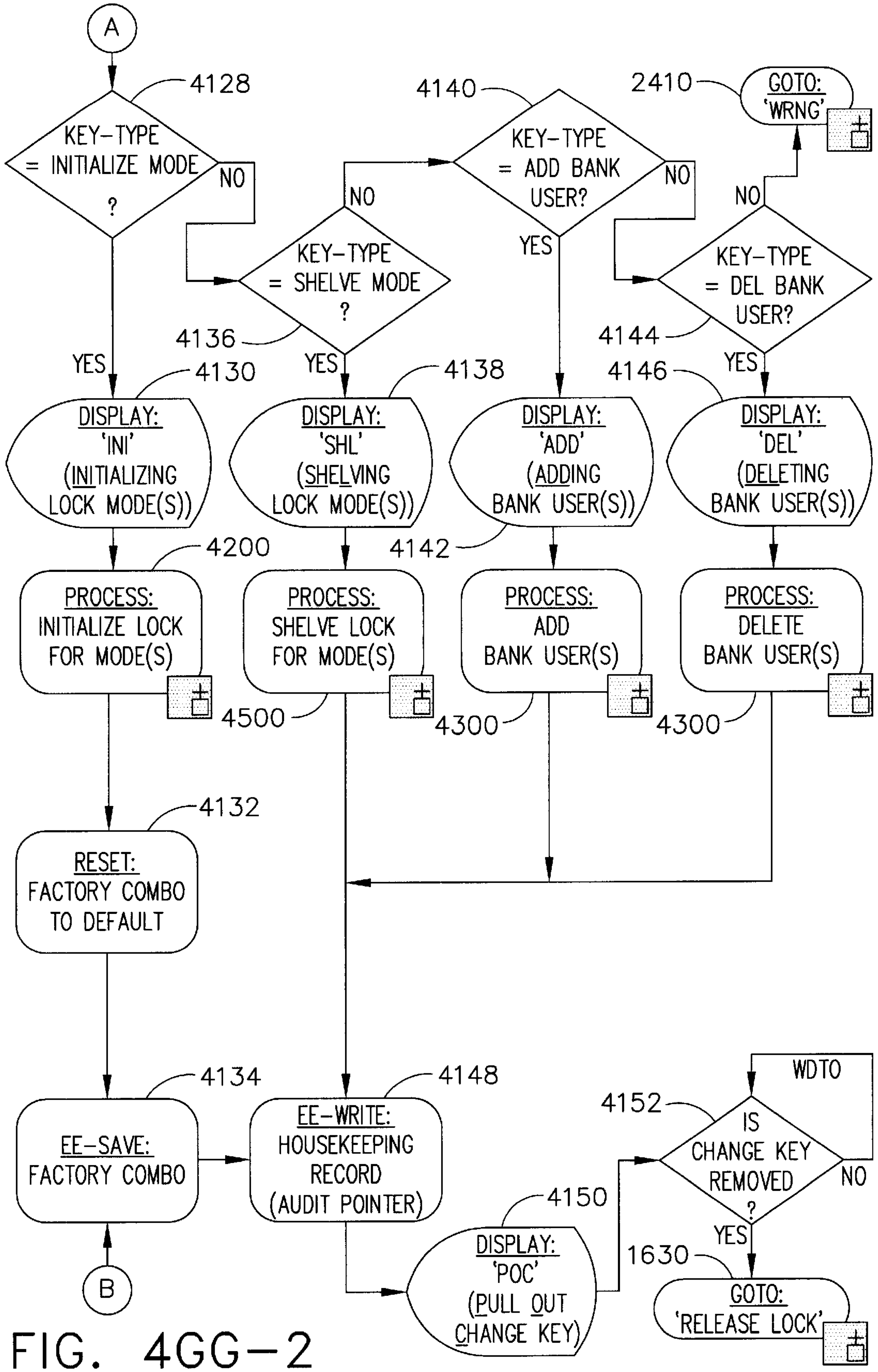
Figure 4H:
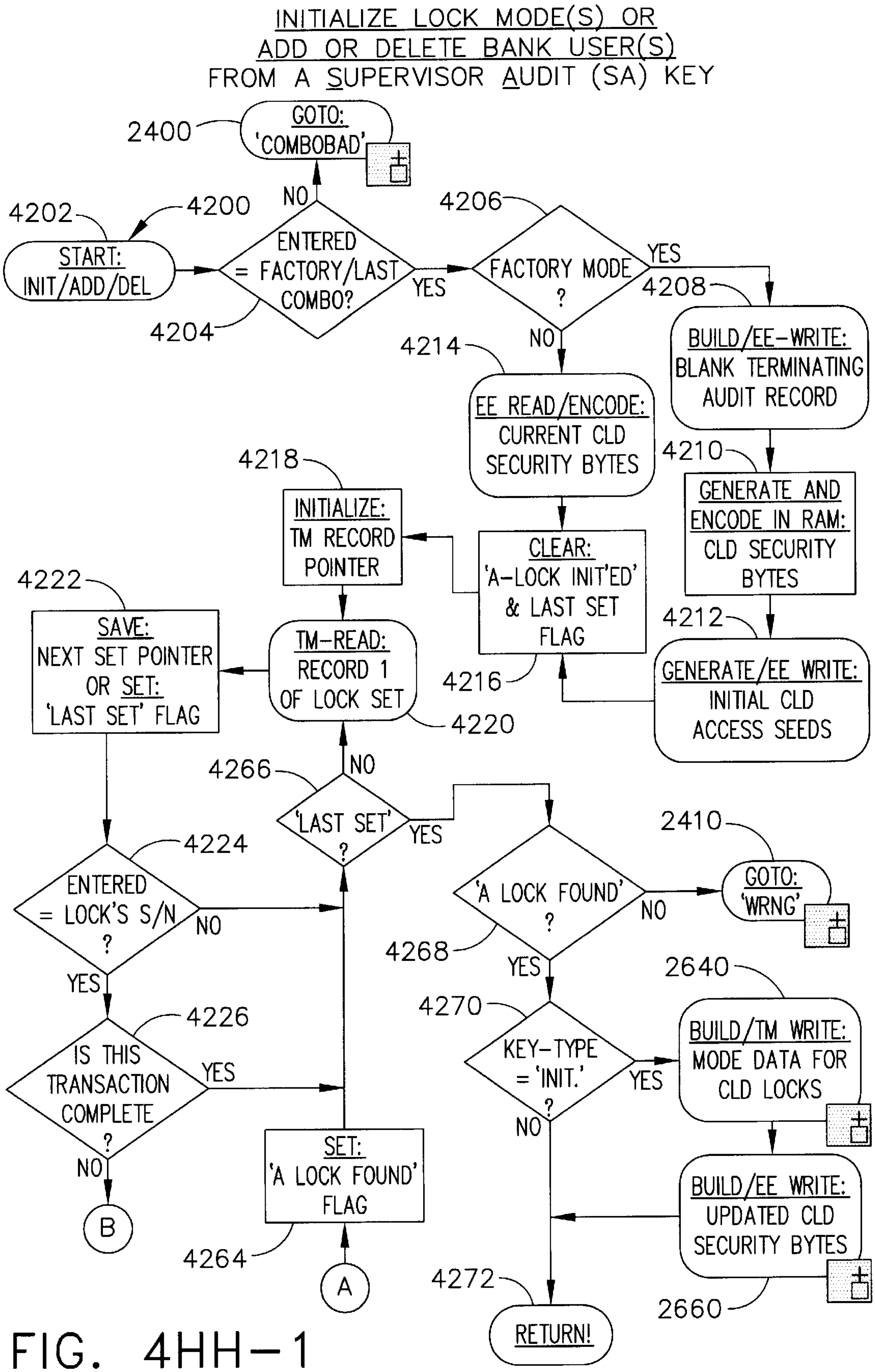
Figure 4H:
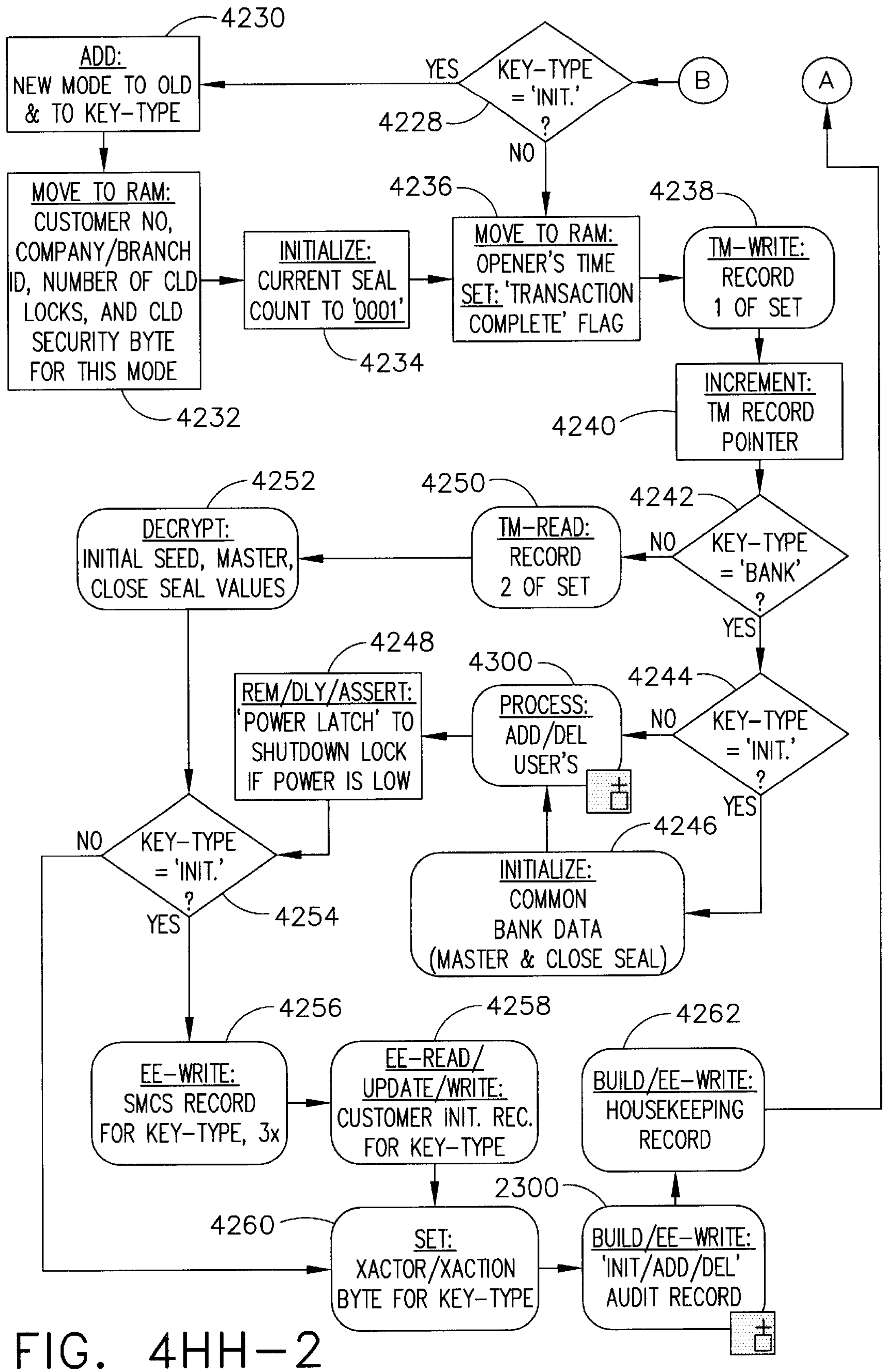
Figure 4I:
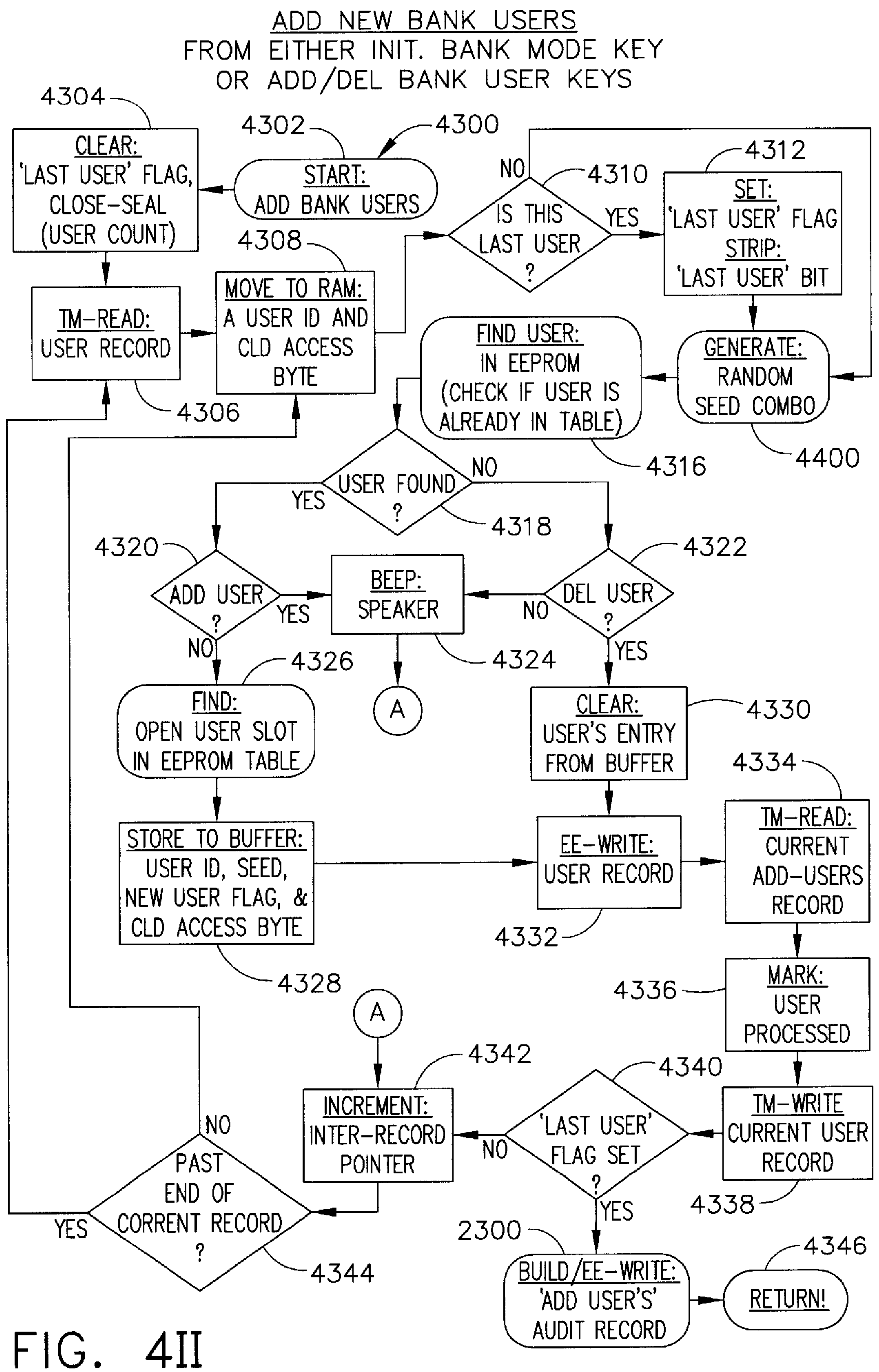
Figure 4J:
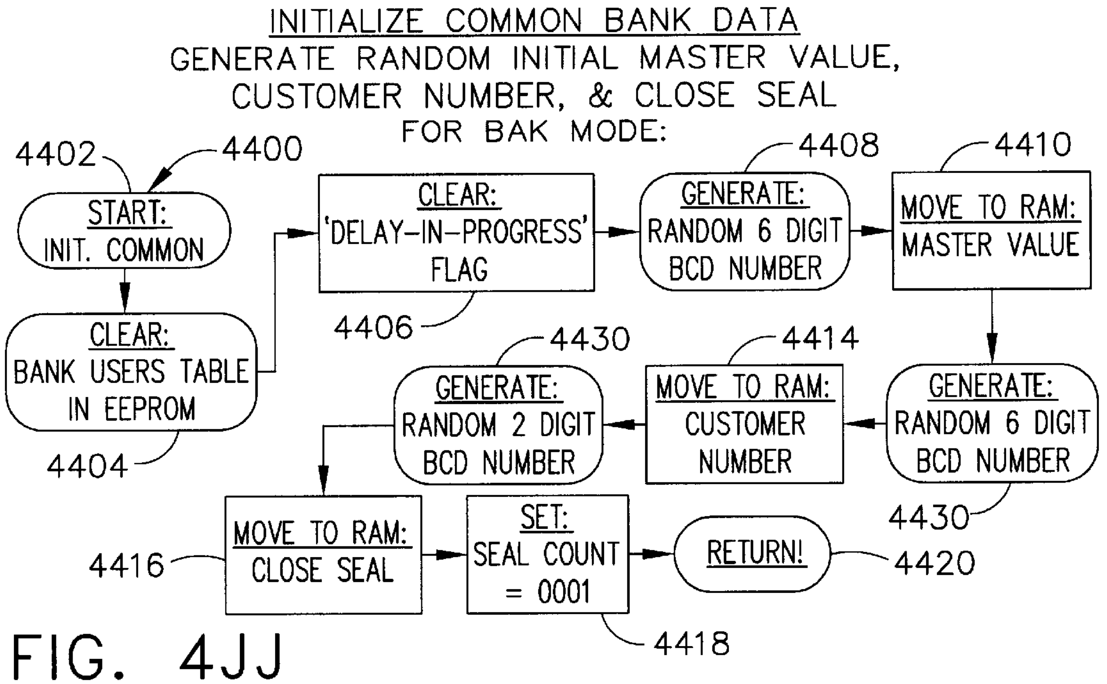
Figure 4K:
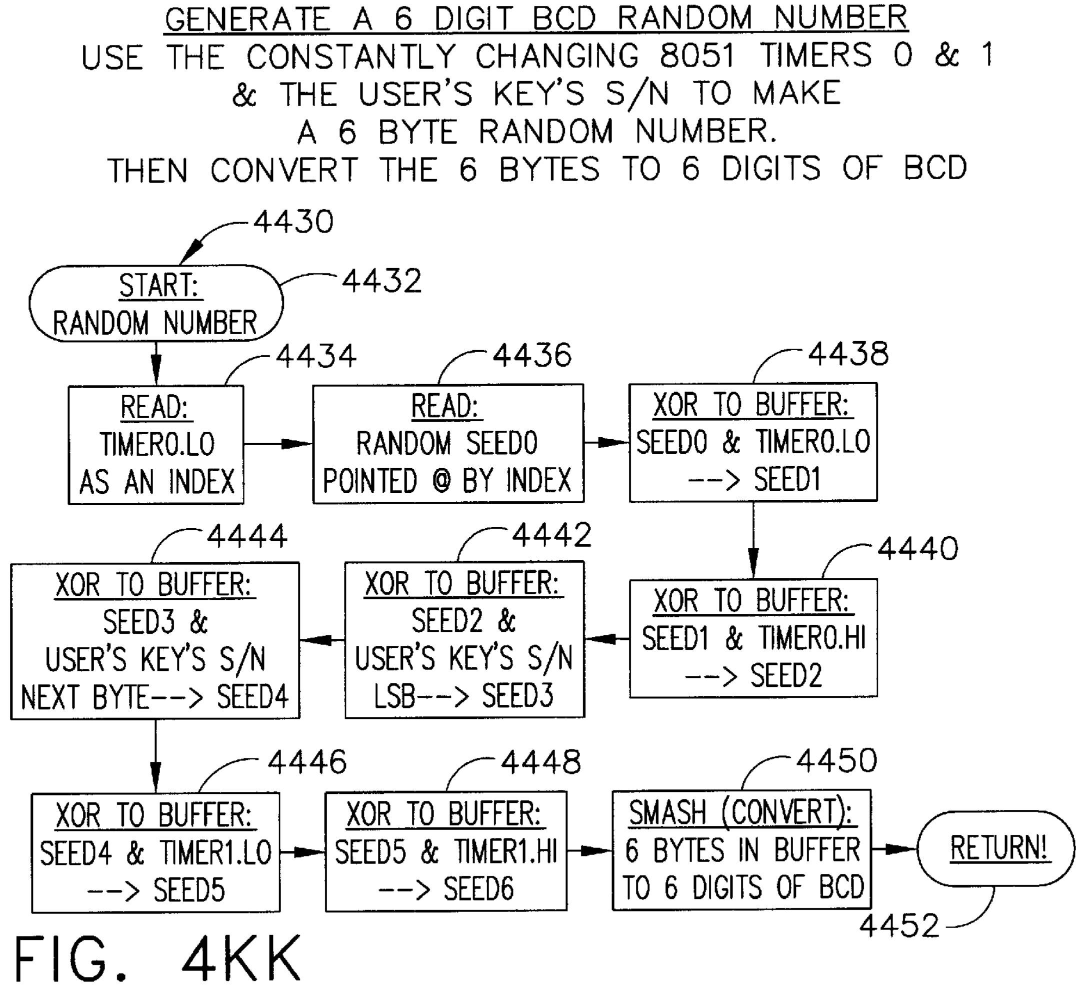
Figure 4L:
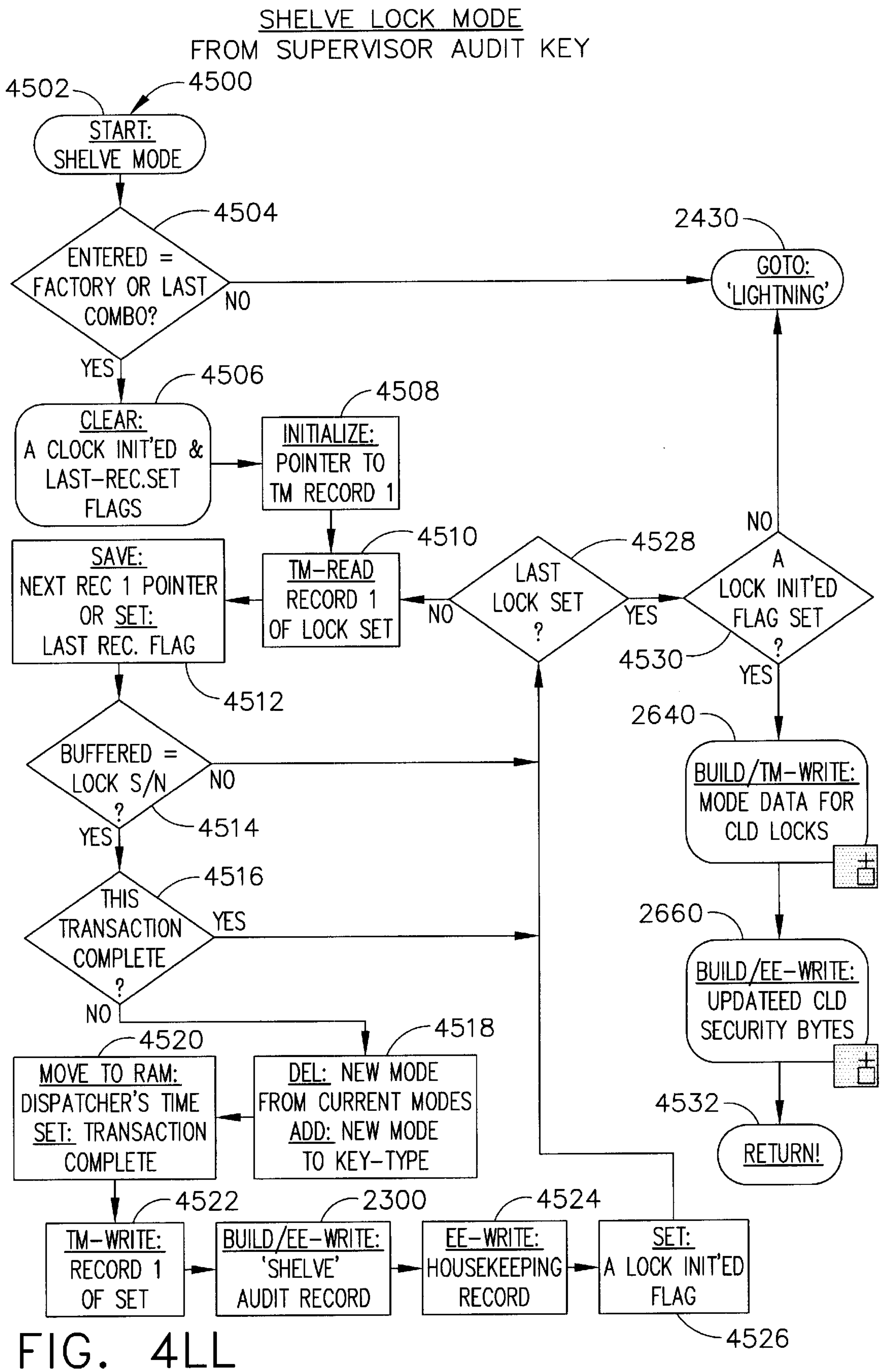

FIG. 4BB illustrates an exemplary set/change bank user's combination subroutine 2700 that may be called from the main menu functions subroutine 2500 of FIG. 4Y. This subroutine has not been altered in order to permit the lock to act as a supervisor lock. Additionally, it is believed that the logic flow chart provides sufficient disclosure for one of ordinary skill in the art to write a program to implement this subroutine therefore further discussion of this subroutine is not necessary.

An exemplary change factory combination subroutine 2800 that may be called from the set/change bank user's combination subroutine 2700 is illustrated in FIG. 4CC. This subroutine also has not been altered to enable the lock to perform as a supervisor lock and is believed to be disclosed in sufficient detail to enable one of ordinary skill in the art to program this feature, if desired, in the lock.

FIG. 4DD illustrates an exemplary super shelve pass one subroutine 2900 that may be called from the main menu function subroutine 2500. This subroutine has also not been modified in order to support using the lock as a supervisor lock 40. Additionally, an exemplary super shelve second subroutine 2950 is illustrated in FIG. 4EE and may be called from the pair is in subroutine 1400. Both of these subroutines are believed to be disclosed in sufficient detail to enable one of ordinary skill in the art to draft the appropriate software code to implement this feature if desired.

An exemplary audit dump subroutine 4000 is illustrated in FIG. 4FF, similar to the previous subroutine, this subroutine also has not been modified in order to support supervisor/subordinate lock operations. Therefore further discussion is not required. Additionally, the logic flow chart provides sufficient detail for one of ordinary skill in the art to program this feature, if desired.

FIG. 4GG illustrates an exemplary change key in subroutine 4100 that may be called from the pair is in subroutine 1400 if the change key flag is set. This subroutine enables the lock user with appropriate key type and/or user ID to change the combination. Additionally, the lock user may initialize lock modes at decision block 4128 and using the initialize lock mode subroutine 4200. Furthermore, this subroutine permits the user to add or delete bank users blocks 4140, 4142, 4144 and 4146 together with the add/delete bank users subroutine 4300. The illustrated subroutine also permits the supervisor and/or subordinate locks to be shelved utilizing blocks 4136, 4138 and shelve locks subroutine 4500. The change key in subroutine 4100 has not been changed in order to support supervisor and subordinate lock operations, however, the subroutines called from the change key in subroutine 4100 have been altered as necessary to support supervisor and subordinate lock operations.

An exemplary Initialize lock mode subroutine 4200 is illustrated in FIG. 4HH. This subroutine is a modification of an earlier subroutine. The modifications permit the initialization of subordinate locks 60 and supervisor locks 40. The changes that enable use of the supervisor and subordinate lock system 10 will be discussed in detail. If the supervisor lock 40 is in the factory mode at decision block 4206, then the subroutine generates and encodes in memory the CLD security bytes in block 4210. Then, in block 4212 the subroutine generates and writes to memory the initial subordinate lock access seeds, if the subordinate locks utilize one-time combinations and require initial seed values.

Additionally, if the key type was an initialization key at decision block 4228, then in block 4232 in addition to the customer number and company/branch ID, the number of subordinate locks and subordinate lock's security byte for this mode is also moved to memory. Additionally, if the key type was an initialization key in block 4270, a mode data subroutine 2640 may be called which places the subordinate lock mode data on an initialization or shelve electronic key for use in either initializing or shelving the subordinate locks 60. After completing the mode data subroutine 2640, the update CLD subroutine 2660 may be called which updates the subordinate lock mode data in the supervisory lock 40 after an initialization or shelve operation. Thereafter the program flow would return at terminator 4272.

FIG. 4AA-1 illustrates an exemplary mode data subroutine 2640. This subroutine begins at start terminator 2642, thereafter the electronic key record buffer made be cleared in block 2644. Next, the initial subordinate lock unit number, modes, and security byte may be moved to a buffer in block 2646 in preparation for writing this data to the electronic key. Thereafter, in block 2648 the subordinate lock mode record could be written to the electronic key or displayed. Next, the subordinate lock access seeds could be encoded and moved to the electronic key buffer in block 2650 in preparation for writing this data to the electronic key or display. In block 2652 the encoded subordinate lock access seed record could be written to the electronic key or display, thereafter the program flow returns to the program calling the mode data subroutine 2640 in return terminator 2654.

FIG. 4AA-2 illustrates an example of the update CLD subroutine 2660. This routine updates the subordinate lock mode data in the supervisor lock after an initialization or shelve operation. An initialization operation places the lock in service and the shelve operation removes the lock from service. The subroutine begins at start terminator 2662, thereafter the subordinate lock access seeds and security bytes record could be read from memory in block 2664. Next, this information may be decoded and placed in memory, typically volatile memory, in block 2666. Then, in block 2668 the subordinate lock security byte could be cleared for the supervisor lock modes not initiated. Thereafter, in block 2670 and 2672 the memory may be updated with the current subordinate lock access seeds and security byte records. Next, the program in block 2674 could recalculate the number of subordinate locks in use and then in block 2676 write a housekeeping record to memory of the number of current subordinate locks. Thereafter the program returns to the program calling the update CLD subroutine 2660 at return terminator 2678.

FIGS. 4II, 4II-1, and 4II-2, illustrates an exemplary add/delete bank user subroutine 4300. This subroutine has been modified in order to enable the supervisor/subordinate lock operations disclosed herein. The changes to this routine include moving the subordinate access byte to memory, typically non-volatile memory in block 4308 in addition to moving the user ID to memory. Thereafter, at block 4328 when a user is being added, in addition to the user ID, seed value, and new user flag, subordinate lock access data could be stored in the buffer and written into the user record in block 4332. The remainder of this subroutine has not been modified in order to support supervisor/subordinate lock operations.

FIG. 4JJ illustrates an example of the initialize common bank data subroutine 4400. This subroutine generates a random initial master value, customer number and close seal when the lock is utilized in bank mode. Subroutine shown in 4JJ is believed to enable a programmer of ordinary skill in the art to perform this function if desired and thus the details are not discussed further.

FIG. 4KK illustrates an exemplary random number subroutine 4430 that is used to generate random number. The illustrated subroutine generates a 6 digit binary coded decimal random number using timers 0 and 1 of the 8051 processor combined with the user key serial number to generate a 6 byte random number and then to convert the 6 bytes to a 6 digit binary coded decimal. This random number subroutine 4430 is believed to within the ordinary skill of the art, based on the logic flow chart provided. Therefore, further discussion is not considered necessary.

FIG. 4LL illustrates an exemplary shelve lock mode subroutine 4500 that can be called from the change key is in subroutine 4100 discussed previously. The only changes to this subroutine are the addition of the mode data subroutine 2640 and the update CLD subroutine 2660 that are inserted just prior to the return terminator 4532. These subroutines have been discussed in detail previously. The shelve lock subroutine 4500 permits removing a supervisor lock or one or more subordinate locks from service.

Subordinate Lock

The preferred subordinate lock is a modified Auditcon™ 3100 series electronic lock manufactured by Mas-Hamilton Group. Details of these locks may be found in U.S. Pat. Nos. 5,451,934 and 5,709,114; and in U.S. patent applications Ser. Nos. 08/704,109; 08/985,308; 08/852,859; 08/852,854; 08/852,775; and 09/045,001. Alternatively, any other electronic lock that is capable of being opened using a key 30 and/or combination may be employed.

The Auditcon™ may be modified by removing the key pad and using a cover that only has contacts or other means for reading the data on key 30. In some embodiments the keypad may be retained to permit the subordinate lock to be opened with a combination. Once the key 30 has transmitted the access code to subordinate lock 60, that the key is authorized to open, the subordinate lock 60 permits the withdraw of bolt 62.

The firmware of the Auditcon lock is also modified. The firmware for this embodiment need only verify that the access code is correct and then operate to place the lock in a condition that would permit the key holder to open the subordinate lock 60. In some embodiments, the subordinate lock 60 may also maintain an audit record of the key 30 used to open the lock. If an audit record is maintained at the subordinate lock 60, it may be desirable in some embodiments to also record the date and/or time of entry and/or exit.

Software illustrated by the functional flow chart shown FIGS. 5A–5L was written in the assembly language for the Motorola 6805 microprocessor. Thus, this program was designed to run on this microprocessor. It is expected that it is within the ordinary skill in the art of computer programming for a computer programmer to utilize these flowcharts in writing the program in any other programming language on other micro-processors or running under one or more operating systems.

Figure 5A:
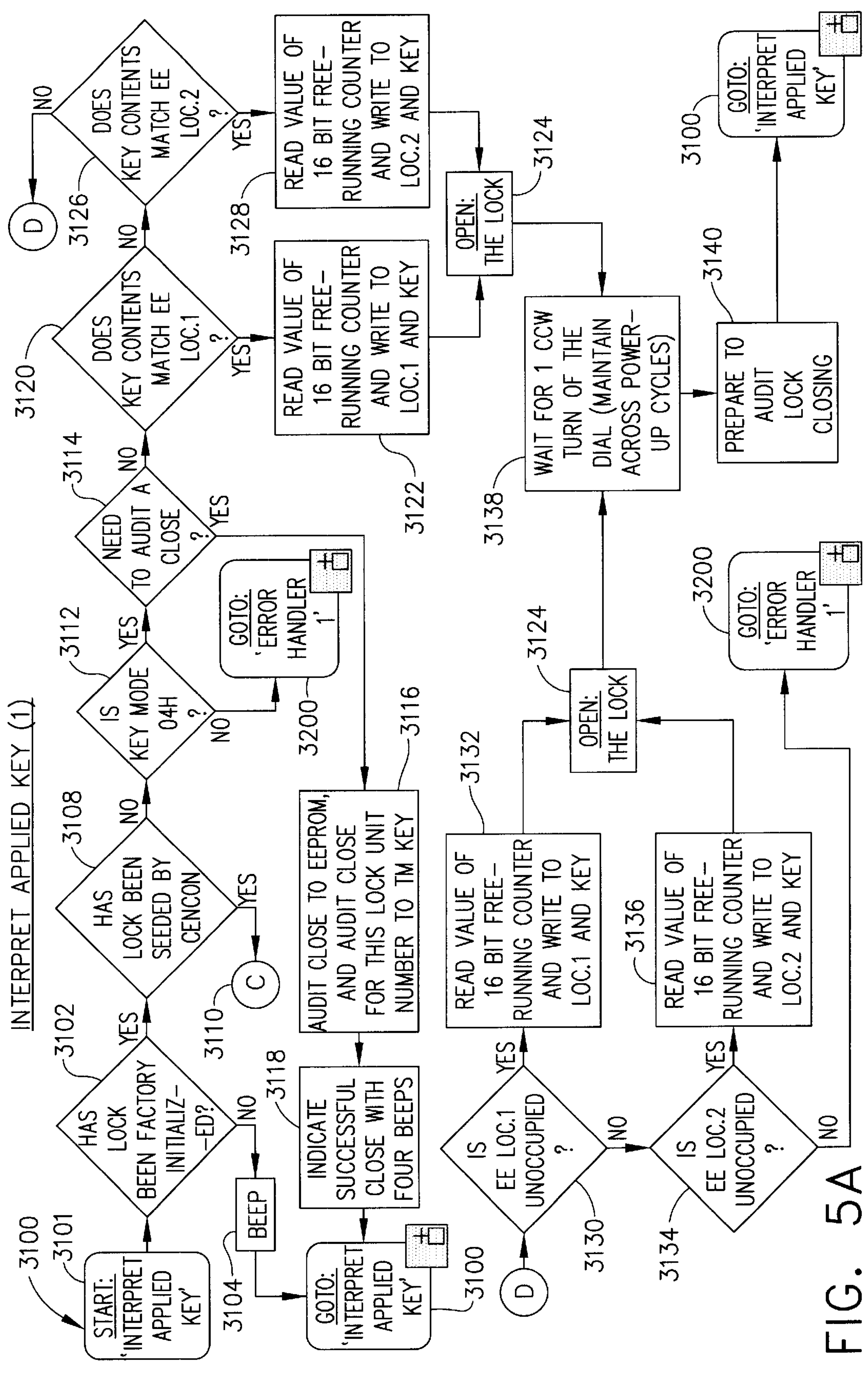

FIG. 5A illustrates an exemplary main line program flow that begins at terminator 3100. After the lock has been powered up, lock may check in decision 3102 whether or not the lock has been in factory initialized. If the lock has not been factory initialized the program flow moves to block 3104 where the subordinate lock 60 may beep or provide some other visual or audible indication that the lock has not been factory initialized. Thereafter, the program flow moves to terminator 3106 where the program returns program flow back to start 3100. When the lock has been factory initialized, the program flows from decision block 3102 to decision block 3108 where the lock 60 may check to see if a supervisor lock 40 has seeded the subordinate lock 60. Alternately, in this decision block 3108, the lock could check to see if the subordinate lock had been set up with a supervisor lock 40. The supervisor lock 40 may be a modified Cencon lock as discussed above.

Figure 5B:
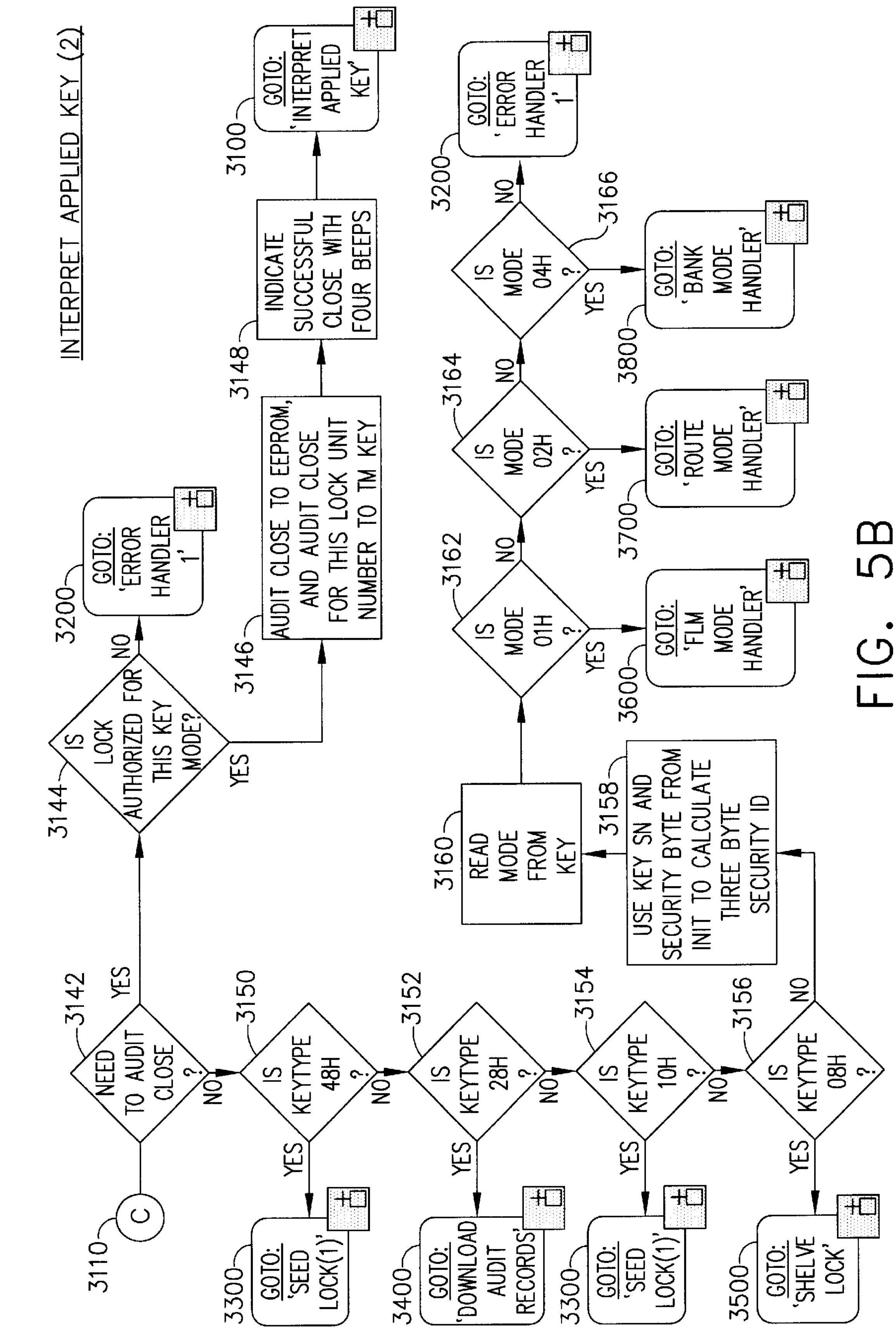

When the subordinate lock 60 has been properly initialized or seeded by the supervisor lock 40 the program flow moves to connector 3110 which connects decision block 3108 to the remaining part of the exemplary main line program illustrated in FIG. 5B. If in decision block 3108 the subordinate lock 60 has not been seeded or initialized by a supervisor lock 40, the subordinate lock could operate in stand-alone mode.

Figure 5C:
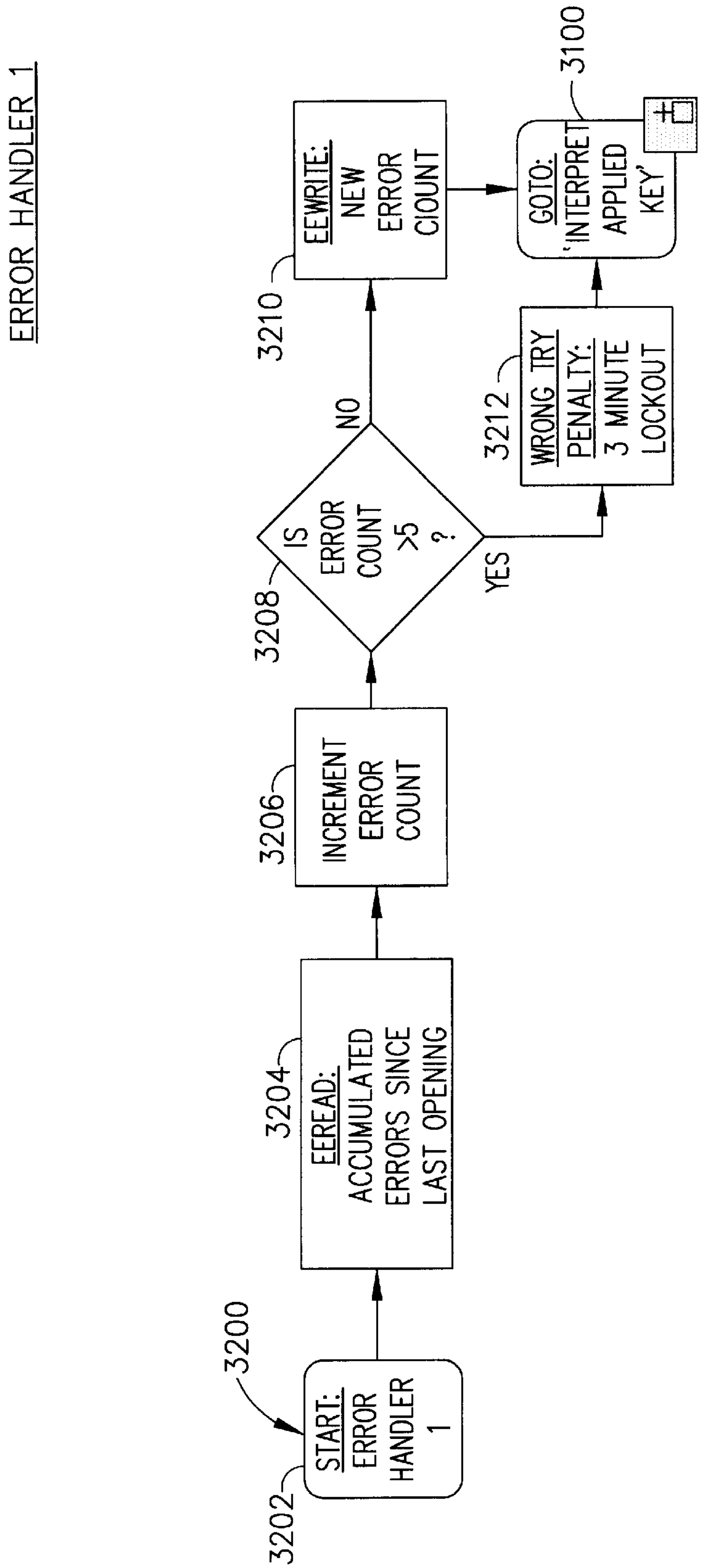
Figure 5D:
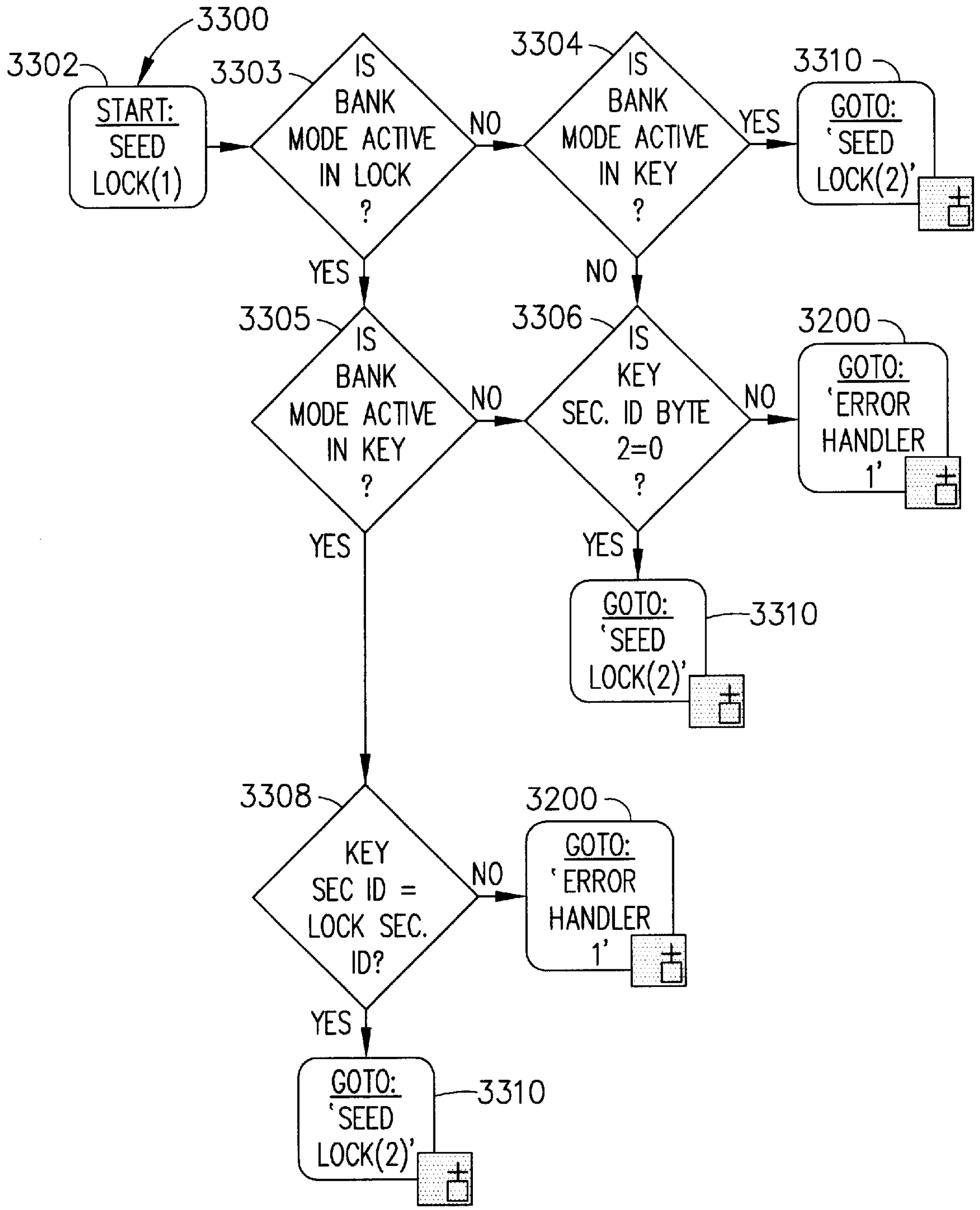

When the subordinate lock 60 operates in the stand-alone mode the program may check to see if the clock in the key 30 has been set in decision block 3112. If the clock has not been set in key 30 the program flow moves to terminator 3200 that may direct the program flow to the error handling subroutine 3200. An example of an error handling subroutine is illustrated in FIG. 5C. When the clock is set in the key 30 in decision block 3112, program flow moves to decision block 3114 where the program checks to see if the lock needs to write a close audit. This step may be utilized in subordinate locks 60 that maintain audit records. Typically, this can be accomplished by checking a flag to verify that the lock is closed and that audit data has been loaded to a key 30. If the subordinate lock 60 has not written the close audit the program flow may move to block 3116 where the audit record for the close is written to memory and to the key 30. This step of writing close audit data to the memory and/or key 30 may be required when it is desired to maintain an audit trail the date and times of opening and closing the subordinate lock 60. Thereafter, it is preferred that the lock indicate a successful close in block 3118. Again this function is not required for all lock operations, however, it is useful for the lock to give the operator some indication that the lock has been satisfactorily closed.

Thereafter, the program flow returns to block 3106, which returns the program flow back to the start at terminator 3100. When a closed audit has been completed, if this feature is implemented in the particular subordinate lock 60 and used, the program flow moves to decision block 3120 where the lock compares the key contents to the data stored in the first memory location in decision block 3120. When the subordinate lock access code for the particular subordinate lock 60 on the key 30 and memory location one match, the program flow moves to block 3122 where a new value may be written to both memory location one and the key. A new value would only need to be written if the subordinate lock 60 was accessed utilizing one-time only combinations. Thereafter, the program flows to block 3124 where the lock is opened.

When the subordinate lock access code for the particular subordinate lock 60 on the key 30 does not match the contents of memory location one in decision block 3120, the program flow moves to decision block 3126, where the lock compares the access code to the data stored in the memory location two. If the access code and the data stored in memory location two matches the lock would preferably write a new value to both the memory location two and to the key 30. In block 3128, thereafter the program flow moves to block 3124 and the lock is opened.

If the access code does not match the data stored in memory location two in decision block 3126, the program flow may then move to decision block 3130 where the program checks to see if memory location one is unoccupied. Either memory location could be unoccupied indicating that the lock has not been used for the first time by either a first key 30 or a second key 30. When memory location one is unoccupied, the program flow preferably moves to block 3132 where new data is written to memory location one and key 30. Thereafter, the program flow moves to block 3124 where the lock is opened. If memory location one has data stored in it the program flow will move from decision block 3130 to decision block 3134 where the program checks to see if memory location two is unoccupied. When memory location two is unoccupied the program moves to block 3136 which writes a data string to both the key 30 and to memory location two within the lock. Thereafter the lock is permitted to open in block 3124.

When both memory locations one and two are occupied the program flows from decision block 3134 to the error handling subroutine 3200. After subordinate lock 60 has been opened in block 3124 the lock waits for a signal indicating that the lock has been closed and the bolt extended in block 3138. In the preferred subordinate lock 60 there is no sensor on the bolt that indicates bolt position. Thus, the program waits for one counter-clockwise turn of the dial, which indicates that the bolt has been fully extended. Thereafter, the program flow may be to block 3140 setting a flag indicating that the lock needs to audit the close. This operation in block 3140 is optional and would not be required if the particular subordinate lock 60 being used did not maintain audit records. Thereafter the program flow is to block 3106, which returns the program back to the start 3100.

When subordinate lock 60 has been seeded or initialized with a supervisor lock in decision block 3108 the program flow moves to block 3142 via connector 3110. Decision block 3142 is used when it is desirable to maintain an audit trail of the keys that open and close at particular subordinate lock 60. The preferred embodiment employs audit records, therefore, the program flow in optional decision block 3142 checks to see if a close audit is needed. When a close audit is needed the program flow moves to decision block 3144, which checks to see if the lock is authorized for this particular key mode. If the lock is not authorized for a particular key mode, the program flow moves to the error handling subroutine 3200. When the lock is authorized for this key mode the program flow moves to block 3146 where the close data is written to memory and the key 30. Additionally, decision block 3144 may require that the same key that opened the lock be the key presented to receive the close audit data.

Thereafter, the program flow moves to optional block 3148 where the lock may indicate the successful close with 4 beeps or any other indicator. Preferably, some sort of audible or visual indicator will be provided to the operator so that the operator knows that the lock was properly closed. However, the lock is not required to provide any indication that the lock was properly closed. Thereafter, the program flow would return to the start of the program at terminator 3106.

When a close out audit is not required in decision block 3142 the program flow moves to decision block 3150. Decision block 3150 checks to see if the key presented is one of two key types employed to initialize subordinate locks 60. If the key is the first type of initialization key, the program flow moves to the subroutine used to seed or initialize locks 3300. Decision block 3150 and subroutine 3300 are only required when the subordinate lock 60 utilizes some type one time combination system. When the key presented is not the first type of lock initialization key the program flow continues to decision block 3152 which checks to see if the key is a download audit records key 30. If the key 30 is initialized to download audit records, the program calls the download audit records subroutine 3400. Decision block 3152 and the download subroutine 3400 are only required if the particular subordinate locks are utilizing an audit record tracking system.

When the key 30 presented is not initialized to download audit records the program flow could move to decision block 3154 where the program flow checks for the second type of lock initialization key 30. If the key 30 presented is the second type of lock initialization key the program flow will call the seed lock sub routine 3300. When the key type is not one utilized to initialize locks or to download audit records the program may check in decision block 3156 to see if the key type is programmed to shelve the lock. If the key type is programmed to shelve the lock the lock program calls the shelve lock subroutine 3500. Like the previous decision blocks, decision block 3156 is also optional as it is not required to provide a shelve lock subroutine in order to utilize the senior subordinate lock system 10.

Thereafter the program flows to block 3158 where the lock may calculate a security ID using the key serial number and the security byte contained within the subordinate lock 60. The use of the security ID is optional and is used to raise the security of the subordinate lock 60. Next, the program flow moves to block 3160 where the subordinate lock 60 program may read the mode from key 30, if key 30 is capable of several different access modes. When only a single key and lock mode is used lock 3160 would not be required. Thereafter, the program flow moves to decision block 3162 where the program would check for the first of several key modes that correspond to varying lock modes.

In decision block 3162 the program checks to see if the key 30 presented is an FLM key. If the key is an FLM key the program will call the FLM mode handler subroutine 3600. When the key is not an FLM key the program flow will continue to decision block 3164 where the program will check to see if the key 30 presented is a route key. If the key 30 presented to subordinate route 60 is a route key, the program will call the route mode handler subroutine 3700. When the key presented is neither a FLM key or route key the program flow will continue to decision block 3166 where the program checks to see if the key 30 presented is a bank key. If key 30 is a bank key, the program calls the bank mode handler subroutine 3800. When the key 30 presented is not recognized as one the modes provided by the lock, the program flow moves to the error handler subroutine 3200.

FIG. 5C shows an exemplary logical flow for the preferred embodiment of the error handling subroutine 3200. This subroutine starts at terminator 3202. Thereafter, the program flow moves to block 3204 where the program reads the accumulated errors since the last opening from memory. Next the program adds one to the error count in block 3206. Thereafter in decision block 3208 program checks to see if this count exceeds a predetermined number, for example, five. When the error count is less than the predetermined number, the program flow moves to block 3210 where the new error count is written into memory. Thereafter the program flow returns to the start of the interpreted applied key program at block 3100. When the error count is greater than the predetermined number selected by the programmer in decision block 3208 the program flow moves to block 3212 where the program will lock the user out of the lock for a fixed period of time, for example, three minutes. Thereafter, the program flow returns to the beginning of the interpreted applied key program 3100.

FIGS. 5D–5G illustrate exemplary seed lock subroutines called from either decision block 3150 or 3154 of the mainline program flow shown in FIGS. 5A and 5B. The seed lock subroutine 3300 illustrated begins at terminator 3302. The program flow then moves to decision block 3303 where the program checks for an active bank mode in the lock. Thereafter, the program flow moves to either decision block 3304 or 3305 where the program checks to see if bank mode is active in the particular key used. If the bank mode is not active in the key the program flow moves to decision block 3306 where the program checks to see if the key security ID byte two is equal to a predetermined value, for example, zero. When this condition is false, program flow calls the error handler subroutine 3200 and when this condition is true, the program flow moves to the seed lock two subroutine 3310. When bank mode is active in both the lock 60 and the key 30 the program flow moves from decision block 3305 to decision block 3308 where the program checks to see if the key security ID is the same as the lock security ID. If these two IDs fail to match, the program flow moves to the error handler subroutine 3200. When the key security ID and lock security ID match, the program flow moves to the seed lock two subroutine 3310 shown in FIG. 5E.

Figure 5E:
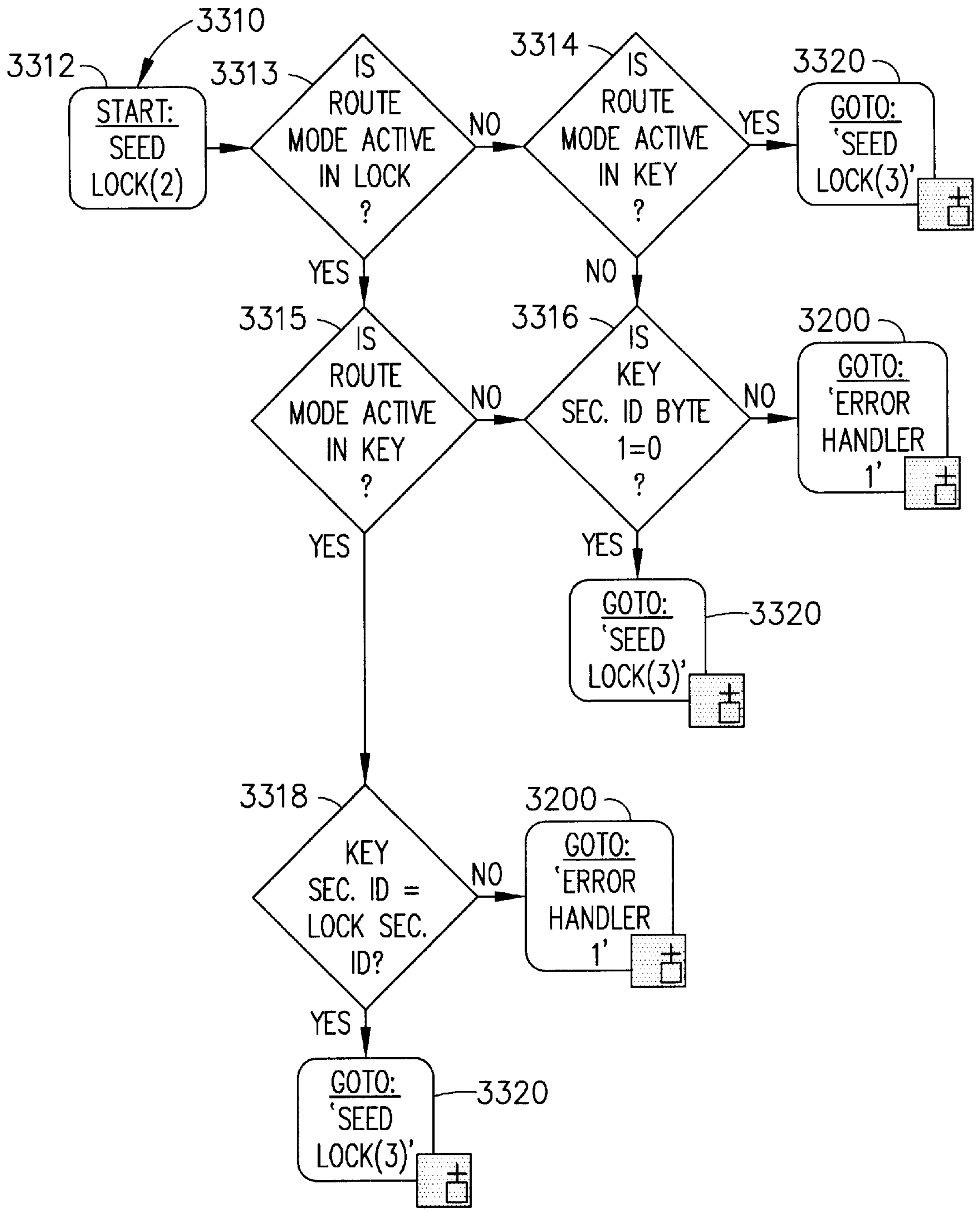

FIG. 5E shows an exemplary seed lock two subroutine 3310. This subroutine is identical to that disclosed in FIG. 5D with the exception of decision blocks 3313, 3314, 3315, and 3316. Decision block 3313 checks to see if the route mode is active in the subordinate lock 60. In decision blocks 3314 and 3315 the program checks to see if the route mode was active in the key. Decision block 3316 checks to see if the key security ID byte one is a predetermined value, for example, zero. Security byte two was checked in decision block 3306.

When the route mode is inactive in both the lock and key 30 and the key security ID byte one is not equal to the predetermined value then the program flow calls the error handler subroutine 3200. If the key security ID byte one equals the predetermined value the program flows to seed three subroutine 3320. When the route mode is active both in the subordinate lock 60 and in key 30, the program flow moves to decision block 3318 where the program checks for the key security ID being equivalent to the lock security ID. If these two values do not match, the program flow moves to the error handler subroutine 3200. When these two values do match the program continues to the seed lock three subroutine 3320.

Figure 5F:
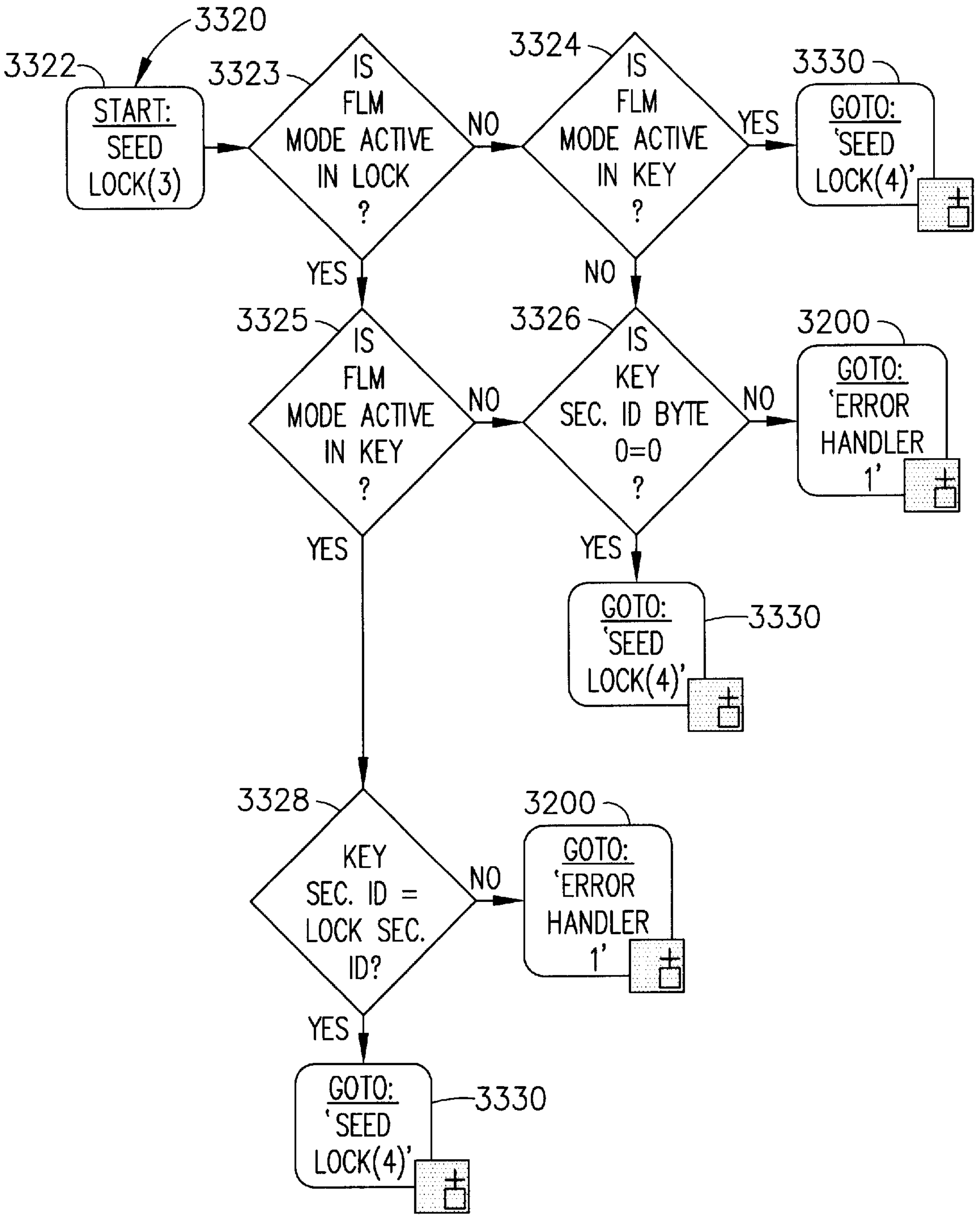

FIG. 5F illustrates an exemplary seed lock three subroutine 3320. This subroutine is similar to the prior two subroutines with the exception that the program checks for the FLM mode in both the lock and the key and checks key security ID byte zero. The seed lock three subroutine 3320 begins at terminator 3322. Thereafter, the program flow moves to decision block 3324 where the program checks to see if the FLM mode is active in the lock. Thereafter, the program flow moves to decision block 3324 or 3325 where the program checks to see if the FLM mode is active in the key. If the FLM mode is not active in either the lock or the key 30, the program flow moves to decision block 3326 where program checks to see if the key security ID byte zero equals a predetermined value, for example, zero. When this condition is false the program calls the error handler subroutine 3200 and when this condition is true the program calls the seed lock four subroutine 3330. When the FLM mode is active in both the subordinate lock 60 and the key 30, the program flow moves to decision block 3328 where program checks to see if the key security ID matches the lock's security ID. If these two values do not match the program calls the error handler subroutine 3200. When the lock security ID and key security ID match in decision block 3328 the program flow moves to the seed lock four subroutine 3330, illustrated in FIG. 5G.

Figure 5G:
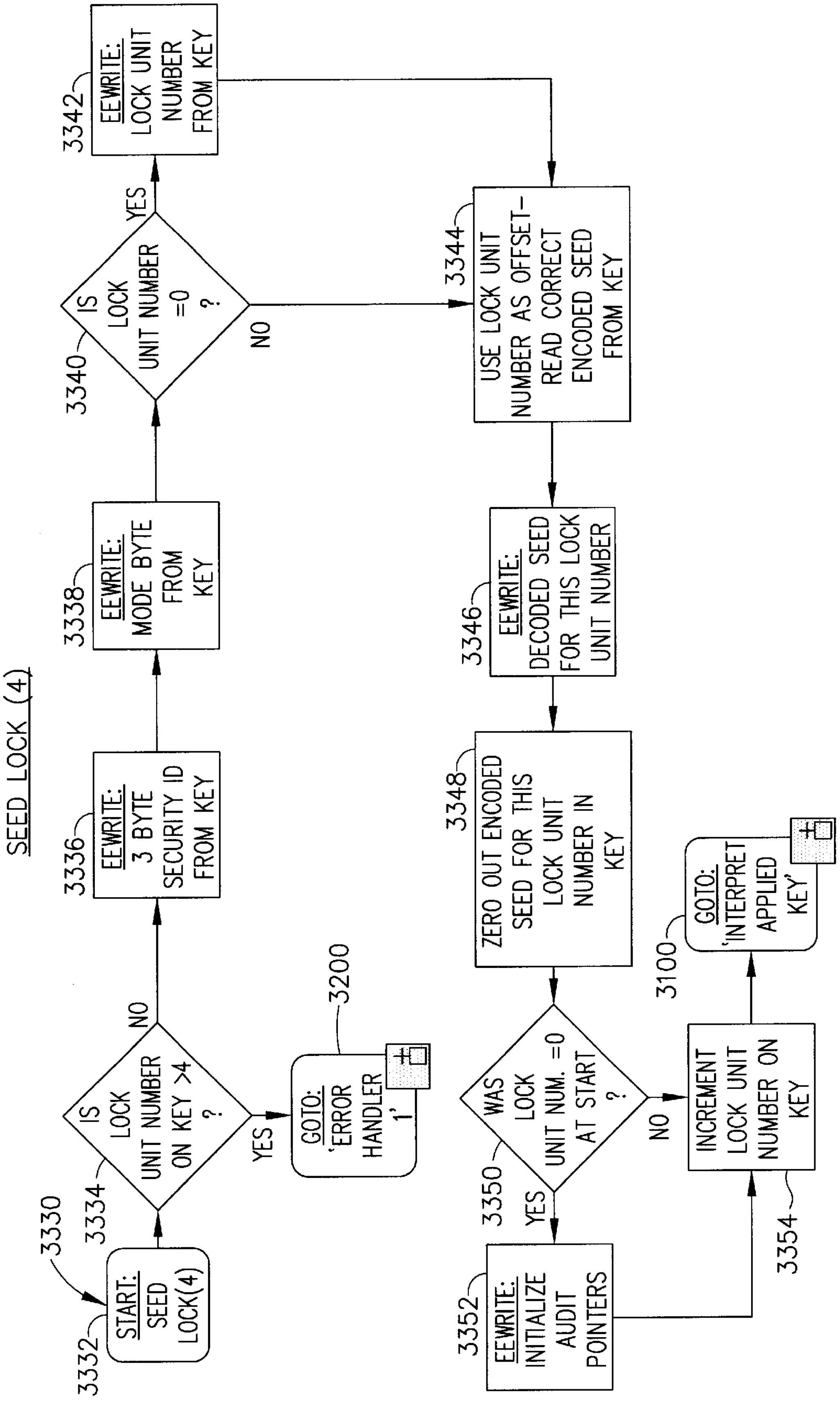

FIG. 5G illustrates an exemplary seed lock four subroutine 3330. This subroutine begins at terminator 3332. Thereafter, the program flow moves to decision block 3334 where the subordinate lock 60 checks to see if the lock unit number called by the key is greater than a predetermined number, for example, four. If the lock unit number is larger than the predetermined number, then the program flow moves to the error handler subroutine 3200. When the lock unit number on the key is within the proper range in decision block 3334, the program flow moves to block 3336 where the program writes the security ID from the key into the lock. Thereafter, in block 3338 the program writes the mode byte from the key to lock.

Next, the program in decision block 3340 checks to see if the lock unit number equals a predetermined value, fore example, zero. Typically, the subordinate lock may be set to lock unit number zero when the subordinate locks 60 has not been initialized from a particular supervisor lock 40. If the lock unit number equals zero the program flow moves to block 3342 where the lock unit number from the key may be written into the subordinate lock 60 memory. Thereafter, the program flow moves from either decision block 3340 or block 3342 is to block 3344 where the program reads the correct encoded seed from the key. In block 3346 the program may then decode the seed for the particular lock unit number and write it into the memory of subordinate lock 60.

Preferably, the program flow moves to block 3348 where the program zeros out the seed that was used in key 30. By zeroing out the value of the seed used this prevents the same seed value from inadvertently being used in more than one subordinate lock 60. Thereafter the program flow moves to decision block 3350. This decision block checks to see if the lock unit number was zero at the start of the initialization or seed process 3300. If the lock unit number was zero at the beginning of the process, the program flow moves to block 3352 where the audit trail pointers are initialized, if an audit trail is being maintained. Thereafter, the flow from decision block 3350 or block 3352 moves to block 3354 where the program increments the lock unit number on the key. Thereafter the program flow returns to the beginning of the program 3100.

Figure 5H:
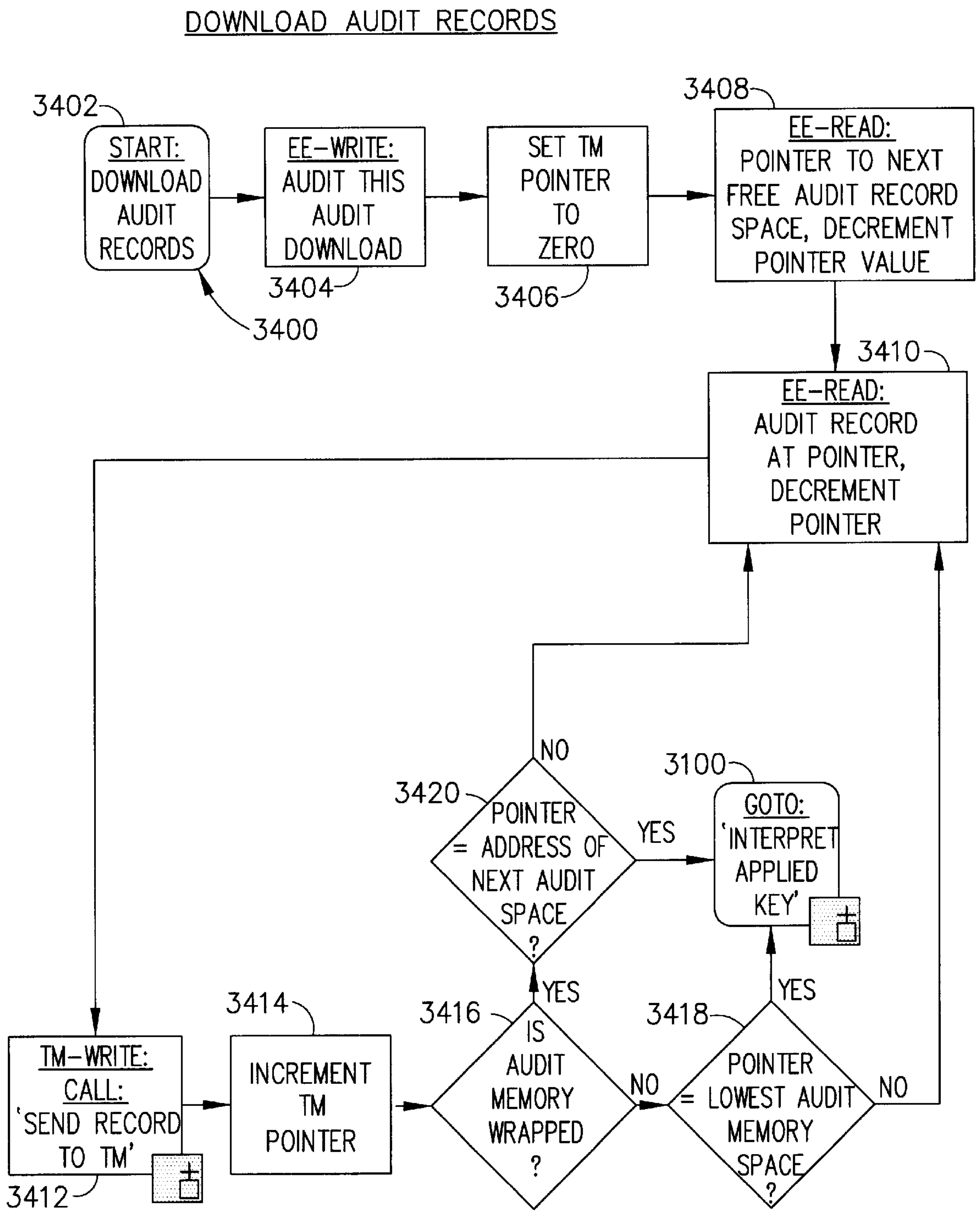

FIG. 5H illustrates an exemplary logic flow chart for the download audit record subroutine 3400. This subroutine permits the user with a key initialized for downloading audit records to retrieve all the audit records contained within a particular subordinate lock 60. The download audit records subroutine illustrated begins at terminator 3402 and continues to block 3404 where the program writes an download audit record into memory. Thereafter, in block 3406 a memory pointer is set to zero. Next, the program flow moves to block 3408 where the program reads the pointer to the next free audit record space and reduces the pointer value by one. Next the audit record at the pointer is read and the pointer reduced by one in block 3410. Then in block 3412 this record is written on to the key 30.

After writing the record the memory pointer is incremented in block 3414. Thereafter, in decision block 3416 the program checks to see if the audit memory is wrapped. An audit memory would be wrapped if all the memory space allocated for audit records was full. If the audit memory is not wrapped the program flow moves to decision block 3418 where the pointer is checked to see if the pointer indicates the lowest audit memory space. If the pointer is at the lowest memory space, then the program flow will return to the top of the main line program 3100. When the pointer is not equal to the lowest audit memory space, the program flow returns to block 3410 where the next audit record would be read in the pointer reduced by one.

When the audit memory is wrapped the program flow moves from decision block 3416 to decision block 3420 where the program checks to see if the pointer equals the address of the next free audit space. If the pointer equals the next free audit space the program would return to the main program flow block 3100. When pointer is not the same as the address as the next free audit space the program flow returns to block 3410 where the next audit record is read and the pointer reduced by one. By using the audit record download program shown above the most current records are downloaded first followed by older records.

Figure 5I:
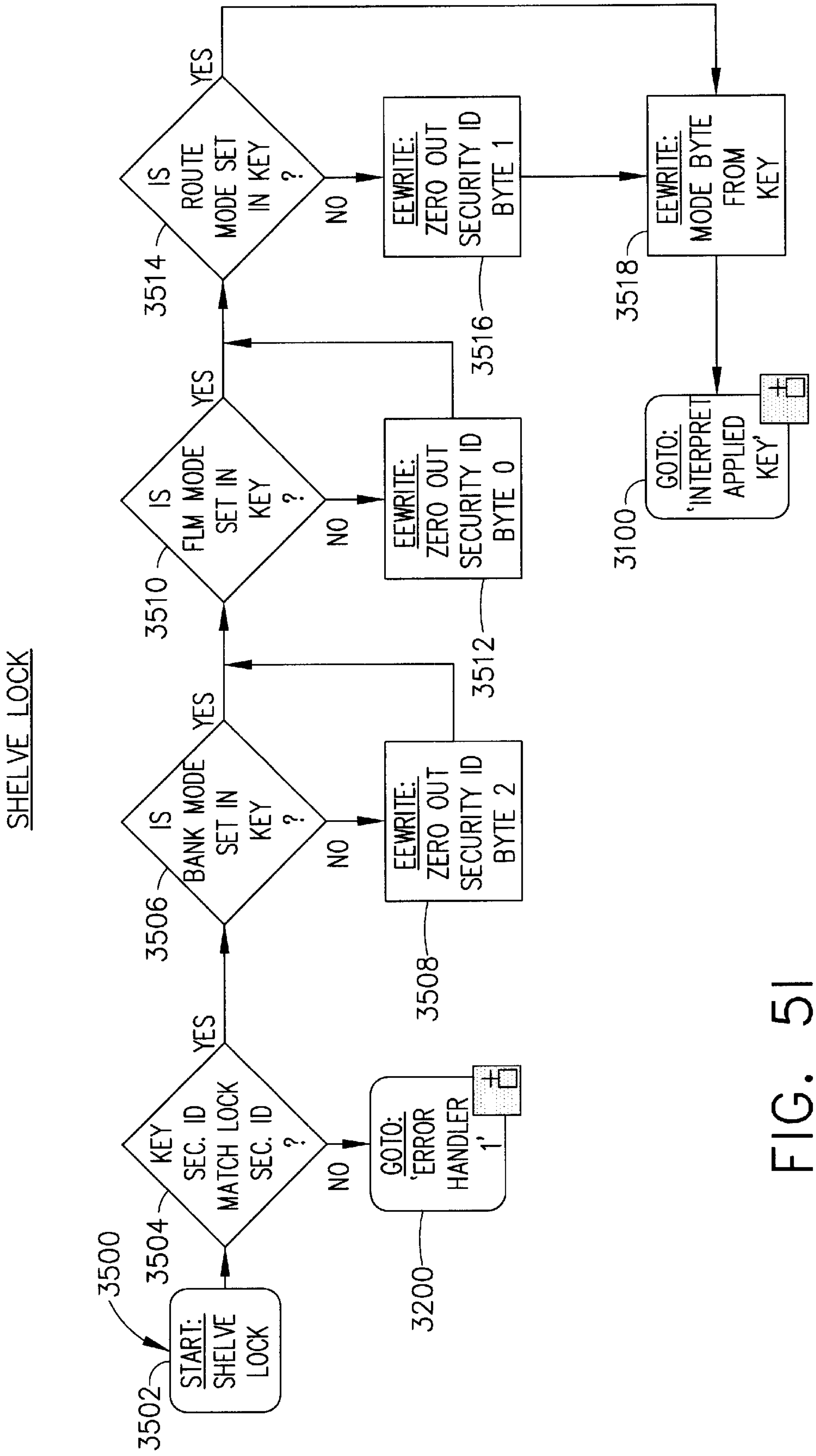

FIG. 5I illustrates an exemplary shelve lock subroutine 3500. This subroutine permits an individual subordinate lock 60 to be shelved or taken out of service. Additionally, the subroutine permits the lock user to shelve only one particular mode of the lock leaving the other modes active, if a multiple mode subordinate lock 60 was utilized. The shelve lock subroutine 3500 begins at terminator 3502 and then moves to decision block 3504 where the key security ID is checked to see if it matches the lock security ID. If these two IDs do not match the program flow moves to the error handler subroutine 3200.

When the two IDs match the program flow moves to decision block 3506 where the key 30 is checked to see if bank mode is set in the key. If the bank mode is not set in the key, then the program mode moves to block 3508 where the program zeros out the bank mode security ID byte, typically security ID byte two, in subordinate lock 60. Thereafter, the program flow from either decision block 3506 or block 3508 moves to decision block 3510 to see if the FLM mode is set in the key. If the FLM mode is not set, then the program flow moves to block 3512 which zeroes out the FLM security byte, typically security ID byte zero.

Then, the program flow from either decision block 3510 or block 3512 moves to decision block 3514 where the program checks to see if the route mode is set in the key. If the route mode is not set then the program moves to block 3516 where the security ID byte associated with the route mode is zeroed out. Typically this is security ID byte one subordinate lock 60. Thereafter, the program flow moves to block 3518 where the mode byte from the key is written into the memory of subordinate lock 60. Then, the program flow returns to the beginning of the mainline program 3100.

Figure 5J:
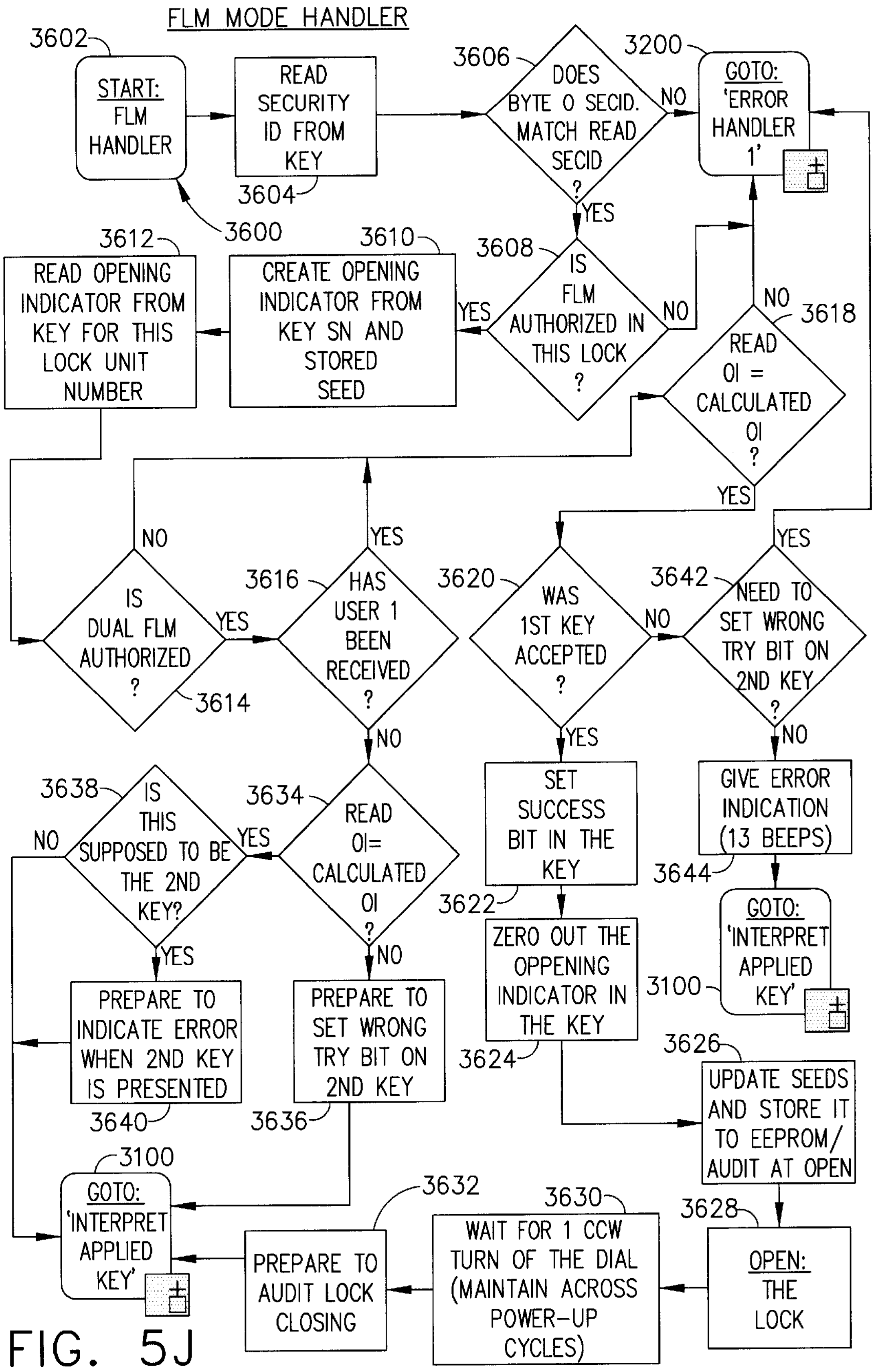

FIG. 5J illustrates an exemplary logic flowchart for the FLM handler subroutine 3600. Beginning at terminator 3602 the program flow then moves to block 3604 where the security ID is read from key 30. Thereafter, the program flow moves to decision block 3606 where the program verifies that the FLM security byte/ID in the key matches the security byte in the lock, typically for the FLM mode this will be security byte zero. If the security bytes do not match, the program flow will move to the error handler subroutine 3200. When the ID bytes match in decision block 3606, the program flow moves to decision block 3608 where the program checks to see if the FLM mode is authorized in this particular subordinate lock 60. If the FLM mode is not authorized, the program flow moves to the error handler subroutine 3200.

When the FLM mode is authorized in decision block 3608 the program flow moves to block 3610 which creates an open indicator (combination) using the seed value stored in the lock and the key serial number. Alternatively, other information on the key and in the lock may be utilized to create an opening indicator. Thereafter, the program flow moves to block 3612 where the opening indicator from the key for this particular subordinate lock 60 would be read. The program flow then moves to decision block 3614 where the program checks to see if the duel FLM mode is authorized. The duel FLM mode would require the use of two FLM keys to open subordinate lock 60.

If the lock is not in duel mode the program flow continues to decision block 3618 where the locks combination or open indicator would be compared to the read combination or open indicator from the key 30. If the read and lock open indicators/combinations do not match the program flow calls the error handler subroutine 3200. When the open indicator/combinations match the program flow moves to decision block 3620 which checks a flag associated with the duel mode. Typically the default position of this flag is the single user mode. Therefore, when the subordinate lock is in the single user mod, the program flow continues to block 3622.

Thereafter, the program flow moves to block 3622, which may set the success flag indicating that the lock has been opened. The program may then zero the open indicator and the key in block 3624 to increase the security of the lock. Program flow would then continue to block 3626 where if a one-time opening combination was used the seed value in the lock could be updated and stored and an open audit record may be written into the memory of subordinate lock 60, if an audit trail was being maintained.

Next, the lock flow is to block 3628 where the lock may be conditioned to open. Thereafter, the lock waits for the lock to be closed or for a lock close indication. Typically, the close indication would be registered in block 3630 by a one complete counter-clockwise turn of the dial. This indication may be utilized when a close audit trail is prepared or some visual and/or audible indication is given to the user to indicate that the lock is completely closed. Thereafter, the program flow may move to block 3632 which sets a flag indicating that a closed audit may need to be written. Again as in the previous block this function for block 3632 is only required if an audit trail is being maintained. Thereafter, the program flow moves back to the beginning of the mainline program 3100.

Returning now back to decision block 3614 where the program checks to see if the subordinate lock 60 is in the single or duel mode. When the subordinate lock 60 is in the duel mode the program flow moves from decision block 3614 to decision block 3616. Decision block 3616 checks to see if one key has been presented to the subordinate lock 60. If the key currently being presented is the first key the program flow moves to decision block 3634 where the program checks to see if the read open indicator/combination matches the locks calculated open indicator/combination. If the calculated and read open indicators/combinations do not match the program flow moves to block 3636 which sets a flag that will set the wrong try bit/flag on the second key. When the calculated and read open indicators/combinations match the program flows to block 3638 where the program verifies or checks to see if the first key presented (the current key) was suppose to be the second key. If the first key presented was suppose to be the first key, the program flow will move to the top of the mainline program 3100. If the first key was suppose to be the second key, then the program flow will move from decision block 3638 to block 3640 which will flag that will prepare the lock to indicate an error when the second key is presented. Thereafter, the flow returns to the top of the mainline program 3100.

Returning to decision block 3616, when the lock has seen one key, the program flow moves to decision block 3618 which compares the read and calculated open indicators/combinations as discussed above when these combinations fail to match the program flow will move to the error handler subroutine 3200. When the read and calculated open indications/combinations match the program flow moves to decision block 3620 where the program checks to see if the a flag was written from block 3620. When the flag was not set in 3620 this would indicate that the first key was accepted and the program flow would continue to block 3622 as discussed above.

However, if the first key was not accepted in decision block 3620 the program flow moves to decision block 3622 which checks for an error and the need to send the program flow to the error handler subroutine 3200. Typically the most often cause for the program taking this route would be keys 30 being presented in the incorrect order. It is desirable not to send the program to the error handler subroutine 3200 when the keys were merely presented out of order. Therefore, when the wrong try flag was set in block 3626 the program flow from decision block 3642 would be to the error handler subroutine since the first key presented did not have a match between read and calculated open indictor/combinations. However, if the error was due to the keys being presented in the wrong order the program flow may move from decision block 3642 to block 3644 where the program may give some type of audible or visible indication that there was some type of error. Typically, the error would be indicated with 13 beeps. Thereafter the program flow could move back to the top of the mainline program 3100 to permit the operators to present the keys in the proper order.

Figure 5K:
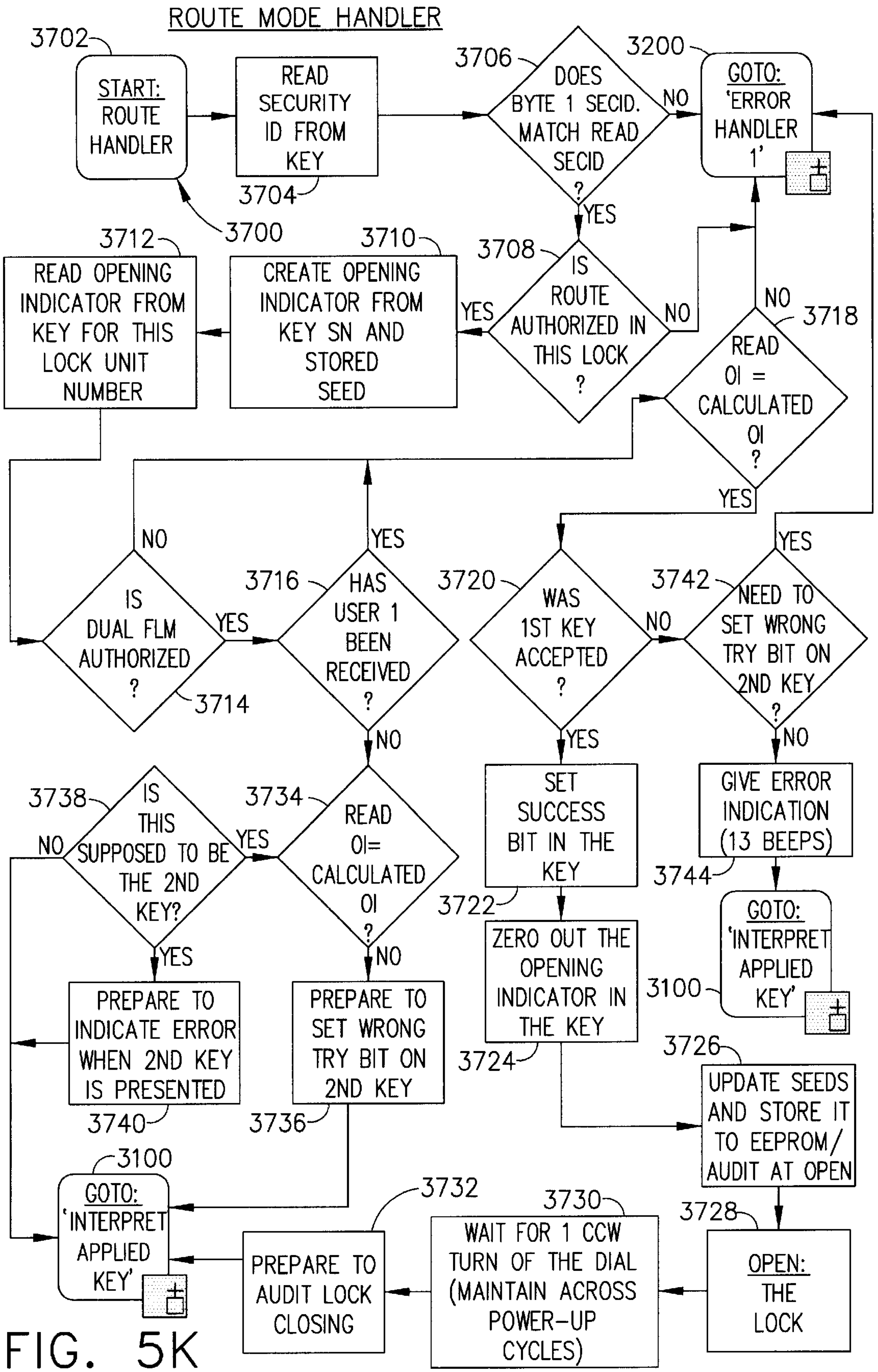

FIG. 5K illustrates an exemplary logical flow chart for the route mode handler subroutine 3700. This handler subroutine is similar to the FLM mode handler subroutine with the exception of decision blocks 3706 and 3708. In the route mode handler subroutine decision block 3706 checks to see if the security ID byte used by the route mode handler subroutine matches the matching security ID byte in the lock. Typically the route mode handler subroutine looks at byte one of the three byte security ID. Additionally, in decision block 3708 the route mode handler subroutine checks to see if the route mode is authorized in the lock. Thereafter the subroutine operates in much the same way FLM handler subroutine 3600 shown in FIG. 5J.

Figure 5L:
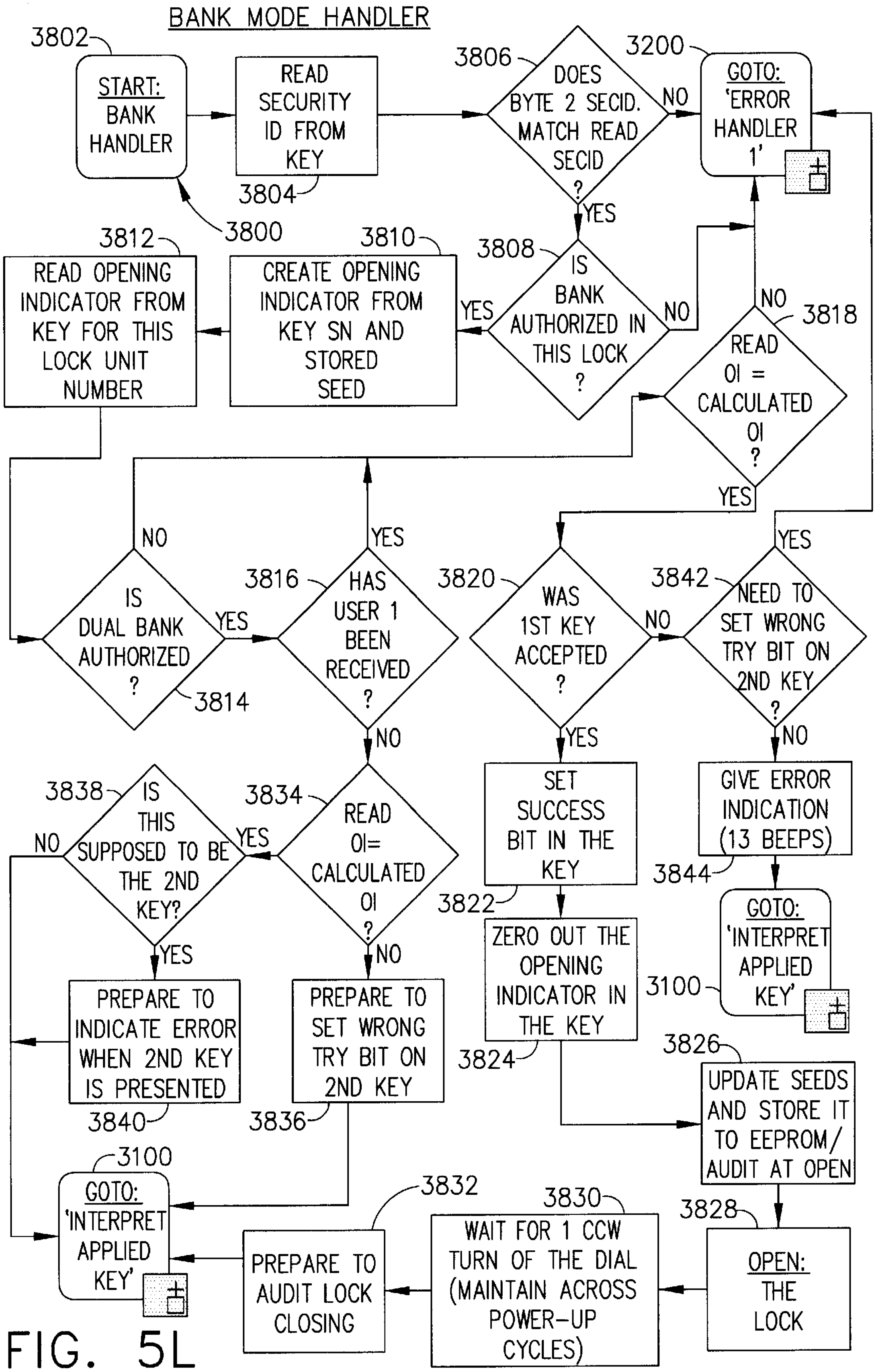

FIG. 5L illustrates an exemplary logical flowchart for the bank mode handler subroutine 3800. This subroutine is similar to the route mode handler subroutine 3700 with the exception of decision blocks 3806 and 3808. Decision block 3806 checks the security byte associated with the bank mode handler and compares the security byte associated with the bank mode handler in the lock and in the key to see if these match. Typically, byte two of the three-byte security ID will be used for the bank mode. Decision block 3808 checks to see if the bank mode is authorized in subordinate lock 60. Thereafter, the remaining portions of the bank mode handler subroutine are identical to those discussed for the route mode handler subroutine 3700 and the FLM mode handler subroutine 3600 illustrated.

Operation

FIGS. 1 and 2 illustrate the operation of the current preferred embodiment of the electronic supervisor and subordinate lock system 10. This system utilizes a key and combination control device generally indicated at 20. This device 20 can download or program an electronic key 30 with the data required to access a selected supervisor lock 40 and the data regarding which subordinate locks 60 the key holder is authorized to open. The key programming means 20 can also provide the combination for the key holder to enter into the supervisor lock 40. The process of programming key 30 and issuing the combination is indicated by arrow $\alpha$ and block 82.

After the key 30 is programmed and/or the combination issued at step $\alpha$, the key holder can open or operate supervisor lock 40 to obtain an access code to one or more subordinate locks 60, if authorized. When the key holder is ready to open/operate supervisor lock 40, the supervisor lock 40 is powered up, if required, with dial 46. The combination could be entered with keypad 42 and/or the key 30 may be presented to supervisor lock 40. One method of presenting the key 30 to supervisor lock 40 can be to touch the button 32 of key 30 to the key port 50. The step of entering the combination and presenting the key 30 is shown with arrow β and at block 83.

The entered combination and the combination obtained by the supervisor lock 40 are compared in decision block 84. If the combination entered and/or the key 30 provide the correct access code the supervisor lock 40 may download the access code(s) for the subordinate locks that the key holder is permitted to open to the key 30 at block 85. Alternatively, these codes may be displayed. After the key 30 has the codes to access any authorized subordinate lock, the key holder may open supervisor lock 40, if authorized, in block 86. The bolt 48 for supervisor lock 40 may be moved using dial 46 on the supervisor lock 40. With the bolt 48 withdrawn the container or secure area may now be entered and the key holder would have access to the subordinate locks 60 located in the container/vault secured by the supervisor lock 40. Access to subordinate locks located outside the container/vault secured by the supervisor lock 40 may not require the opening of the supervisor lock 40.

To open a subordinate lock 60, the key holder may power up the lock 60 with dial 64 if the subordinate lock 60 was a self-powered lock. When the lock 60 has power, the key holder may present the key 30 to the subordinate lock 60. One method of presenting the key 30 would be to touch the key 30 to the key port 66 of subordinate lock 60. The process of taking the key 30 containing the access code or taking the combination issued by the supervisor lock 40 to subordinate lock 60 is shown with arrow δ and block 87. Alternatively, a combination may be entered into subordinate lock 60. Then the subordinate lock 60 verifies that the key 30 is authorized access to the particular subordinate lock 60 in decision block 88. Thereafter, the subordinate lock 60 could be opened in blocks 89 and 90.

After the key holder has completed working in the space secured by the subordinate lock 60 the subordinate lock 60 would be closed. The system 10 may be set up, if required for security, audits, or for other reasons to require the key holder to obtain a close verification with the key 30 after the subordinate lock 60 is closed in block 91. The key holder then may open other authorized subordinate locks in decision block 92 or complete work inside the area secured by the supervisor lock 40 in block 93, if the supervisor lock 40 was opened.

The key holder would close the supervisor lock 40 when the key holder had completed working in the area secured by the supervisor lock 40 in block 94. The user may present the key 30, as indicated by arrow ϵ, to the supervisor lock 40 to update the seed values for the subordinate locks actually opened. These steps are indicated at blocks 95 and 96 of FIG. 2. Additionally, key 30 may be presented to obtain a close seal for the supervisor lock. A close seal may be used if a one-time-use combination was used to open and/or operate the supervisor lock 40. The code obtained with the close seal may enable the key and combination control 20 to update the seed value for the lock 40.

Additionally, it may be desirable for security reasons for the supervisor lock 40 to verify that the key 30 has a close verification for each subordinate lock 60 actually opened in decision block 97. If the key holder failed to obtain a close verification from each subordinate lock 60 opened, then it may be desirable to allow the key holder to reopen the supervisor lock 40, if supervisor lock 40 was opened, without entering a combination or by entering the original combination and obtain a close verification from one or more of the subordinate locks 60 contained within the area secured by supervisor lock 40 in block 98. Typically, if re-entry is allowed, then for security reasons, it is desirable for the key holder upon re-entry to obtain a close verification from all subordinate locks 60 contained within the area secured by supervisor lock 40 in block 99.

After closing the supervisor lock 40, if required, and presenting the key 30 a close seal could now be obtained if the key holder had properly received close verification on the desired/required subordinate locks 60 in decision block 72. If the key holder fails to obtain a close seal after re-entry at the supervisor lock 40 the supervisor lock 40 may, if desired, permit further re-entries, lock out the key holder, or lock out the key type in block 73. Typically, some level of lock out is desired so that a supervisor could have an opportunity to check on the security of the area secured by the supervisor lock 40 and subordinate lock(s) 60.

After the supervisor lock 40 is closed, if opened, and, if required, a close seal obtained in blocks 74 and 75, the key holder may return the key 30 to key issue in block 76 if the key 30 was for a single use. Alternatively, the key holder may retain the key 30 for subsequent access. If a close seal code is provided by the supervisor lock 40 the key holder may call in the close seal or return the key 30 to close out the access record and update the seed values for the supervisor lock 40, if required.

In summary, numerous benefits have been described which result from employing the concepts of the invention. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. A lock system comprising:
- a subordinate lock; and
- a supervisor lock, the supervisor lock outputs an access code, the access code permits opening the subordinate lock.

2. A supervisor and subordinate lock system, said system comprising:
- a supervisor lock;
- a subordinate lock, said subordinate residing inside the area secured by said supervisor lock; and
- a key and combination control, said control issues combinations that permit access to said supervisor and said subordinate locks.

3. A security container secured by a supervisor and subordinate lock system, said container comprising:
- a security container, said container comprising:
  - an outer security container; and
  - at least one inner security container;
- a supervisor lock, said supervisor lock securing said outer security container;
- at least one subordinate lock, each said subordinate lock residing inside said outer security container, and each subordinate lock securing each inner security container; and an key and combination control, said control issuing combinations that permit access to said supervisor and said subordinate locks.

4. A lock system comprising:

a supervisor lock, the supervisor lock comprises:

comparing means for comparing an entered supervisor code or combination with an authorized supervisor code or combination;

generating means for generating an open signal when the entered and authorized codes or combinations compare equal and the entered supervisor code or combination authorizes opening the supervisor lock;

subordinate code or combination generating means for generating and outputting a subordinate code or combination when the entered and authorized codes or combinations compare equal and the entered supervisor code or combination authorizes opening a subordinate lock; and opening means for moving a lock bolt from a closed to an open position in response to an open signal from the comparing means; and the subordinate lock comprises:

comparing means for comparing the subordinate code or combination entered with an authorized subordinate code or combination and generating an open signal when the entered and authorized subordinate codes or combinations compare equal; and opening means for moving a lock bolt from a closed to an open position in response to an open signal from the comparing means.

5. The lock system of claim 4, said system further comprising:

a key and combination control, said control issues combinations that permit opening said supervisor and/or said subordinate locks.

* * * * *